(12) United States Patent
Sheldon-Coulson et al.

(10) Patent No.: US 12,454,335 B2
(45) Date of Patent: Oct. 28, 2025

(54) METHODS AND SYSTEMS FOR REVERSIBLE COUPLING OF CONDUITS

(71) Applicant: Lone Gull Holdings, Ltd., Portland, OR (US)

(72) Inventors: Garth Alexander Sheldon-Coulson, Portland, OR (US); Brian Lee Moffat, Portland, OR (US)

(73) Assignee: Lone Gull Holdings, Ltd., Portland, OR (US)

( * ) Notice: Subject to any disclaimer, the term of this patent is extended or adjusted under 35 U.S.C. 154(b) by 0 days.

(21) Appl. No.: 19/084,583

(22) Filed: Mar. 19, 2025

(65) Prior Publication Data

US 2025/0249986 A1      Aug. 7, 2025

Related U.S. Application Data

(62) Division of application No. 18/594,655, filed on Mar. 4, 2024, now Pat. No. 12,286,198.

(60) Provisional application No. 63/450,914, filed on Mar. 8, 2023.

(51) Int. Cl.
| | |
|---|---|
| *F03B 13/26* | (2006.01) |
| *B63B 22/26* | (2006.01) |
| *B63B 27/34* | (2006.01) |

(52) U.S. Cl.
CPC ............. *B63B 27/34* (2013.01); *B63B 22/26* (2013.01); *F03B 13/264* (2013.01)

(58) Field of Classification Search
CPC ........ B63B 27/34; B63B 22/26; F03B 13/264
See application file for complete search history.

(56) References Cited

U.S. PATENT DOCUMENTS

| | | | |
|---|---|---|---|
| 12,286,198 B2 * | 4/2025 | Sheldon-Coulson | ... B63B 25/16 |
| 2023/0078347 A1 * | 3/2023 | Sheldon-Coulson | ..... C25B 1/04 |
| | | | 205/637 |

* cited by examiner

*Primary Examiner* — P. Macade Nichols
(74) *Attorney, Agent, or Firm* — Schwabe, Williamson & Wyatt, P.C.

(57) ABSTRACT

Methods and systems are provided for transient fluidic coupling via reversibly couplable conduits. In one example, a method includes directing a conduit assembly to a receiving port by releasing one or more fluid streams from the conduit assembly. The method may further include fluidly coupling an internal passage of the conduit assembly to the receiving port. The internal passage may extend from the conduit assembly and along a conduit between a pair of free-floating bodies, such as between a wave engine and a tanker ship, so as to exchange one or more fluids, such as an electrolysis reactant and an electrolysis product. The fluidic coupling may be reversible, in that the conduit assembly may be detached from the receiving port to sever the fluidic coupling. In certain examples, the detaching may be actuated by releasing one or more additional fluid streams from the conduit assembly.

10 Claims, 30 Drawing Sheets

METHODS AND SYSTEMS FOR REVERSIBLE COUPLING OF CONDUITS

CROSS-REFERENCE TO RELATED APPLICATIONS

This application is a divisional of U.S. patent application Ser. No. 18/594,655, filed Mar. 4, 2024, which claims the benefit of U.S. Provisional Application No. 63/450,914, filed on Mar. 8, 2023, the entire contents of which are hereby incorporated by reference herein.

FIELD

Embodiments of the subject matter disclosed herein relate to reversibly couplable conduits, and more particularly to reversible fluidic coupling of supply and/or intake hoses via controllable fluid streams.

BACKGROUND

There exist numerous scenarios in which a product or a resource may be transferred between a pair of free-floating bodies, such as in military, shipping, and energy capture and storage contexts. In cases where the product or the resource exists in a liquid state or a gaseous state, one option for such transfer includes transient fluidic coupling of a conduit which is operable to convey the product or the resource between the pair of free-floating bodies. For example, a wave engine may convert energy captured from oceanic waves to an energy product, e.g., hydrogen gas, to be periodically siphoned from the wave engine for storage on a tanker ship.

Even assuming that the conduit is permanently affixed to a given free-floating body, realizing the transient fluidic coupling to another free-floating body may involve significant manual effort, and significant risk to those implementing the transient fluidic couplings. As an example, positions of the (unanchored) free-floating bodies relative to one another may be continually changing. As another example, a skilled human operator may need to be present at one or both ends of the conduit to engage/disengage a coupling mechanism. It may be beneficial to increase an autonomy of such a coupling process so as to reduce on labor and time.

BRIEF DESCRIPTION OF THE DRAWINGS

Various embodiments and techniques will be described with reference to the drawings, in which.

DETAILED DESCRIPTION

Figure 1:
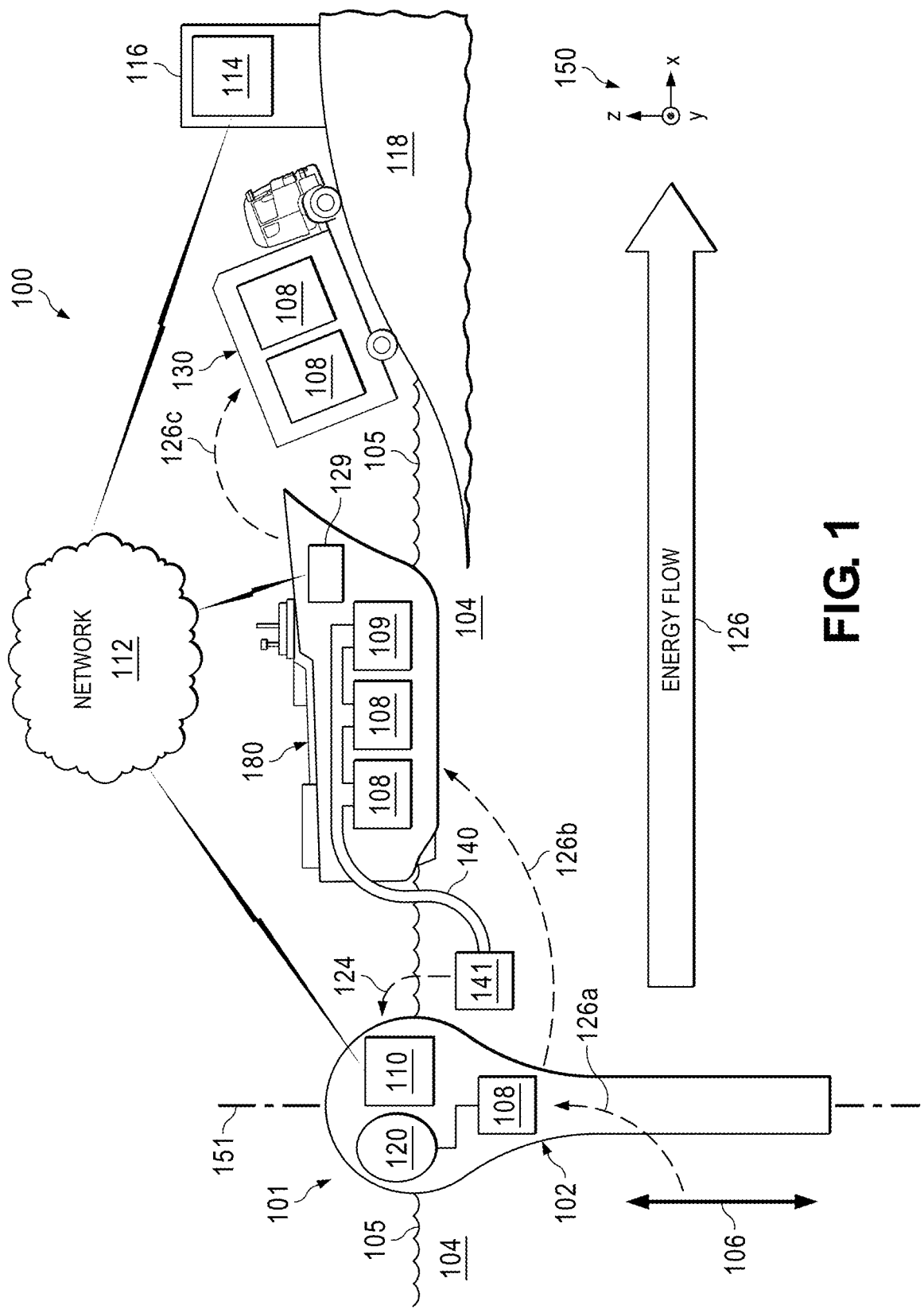
FIG. 1 shows a schematic diagram of a wave energy harvesting system, including a first free-floating body and a second free-floating body, the second free-floating body including a conduit operable to transiently fluidly couple to the first free-floating body via a conduit assembly positioned at a distal end of the conduit, in accordance with at least one embodiment.

For a fuller understanding of the nature and objects of the disclosure, reference should be made to the following detailed description, taken in connection with the accompanying drawings. The following figures, and the illustrations offered therein, in no way constitute limitations, either explicit or implicit, on the scope of the current disclosure. Various embodiments or aspects of the disclosure are described herein. In some implementations, the different embodiments are practiced separately. However, embodiments are not limited to embodiments being practiced in isolation. For example, two or more different embodiments can be combined together in order to be practiced as a single device, process, structure, or the like. The entirety of various embodiments can be combined together in some instances. In other instances, portions of a first embodiment can be combined with portions of one or more different embodiments. For example, a portion of a first embodiment can be combined with a portion of a second embodiment, or a portion of a first embodiment can be combined with a portion of a second embodiment and a portion of a third embodiment.

The embodiments illustrated and discussed in relation to the figures included herein are provided for the purpose of explaining some of the basic principles of the disclosure. However, the scope of this disclosure covers all related, potential, and/or possible, embodiments, even those differing from the idealized and/or illustrative examples presented. This disclosure covers even those embodiments which incorporate and/or utilize modem, future, and/or as of the time of this writing unknown, components, devices, systems, etc., as replacements for the functionally equivalent, analogous, and/or similar, components, devices, systems, etc., used in the embodiments illustrated and/or discussed herein for the purpose of explanation, illustration, and example.

As used herein, "fluidly coupling" may refer to a process where two components are configured to allow for the transfer of one or more fluids (e.g., gas and/or liquid) between the two components. For example, a first chamber may be fluidly coupled to a second chamber, when a gas from the first chamber is capable of flowing (either actively (e.g., through pumping) or passively (e.g., through pressure differentials)) from the first chamber to the second chamber and/or from the second chamber to the first chamber. Fluidly coupled components may be directly connected to each other. That is, there may not be any intervening components between the first component and the second component. In other instances, one or more additional intervening components (e.g., pipes, valves, chambers, reactors, etc.) may be provided between the first component and the second component so long as the one or more fluids are capable of being transferred between the first chamber and the second chamber along a path that includes the one or more intervening components. Additionally, while "components" may be fluidly coupled with each other, the concept of fluidic coupling is not limited to structures such as chambers, containers, and the like. That is, a first volume of a liquid or gas may be fluidly coupled to a second volume of a liquid or gas even if one or both of the first volume and the second volume are not confined by any specific structure. For example, a volume of fluid within a free floating body may be fluidically coupled to a generally unconfined volume (e.g., a body of water or the atmosphere surrounding the free floating body) through a pipe, tube, port, opening or other passage through a surface of the free floating body. Terms such as, for example, "fluidic coupling", "fluidically coupled", "fluidic communication", "fluidly communicating" and/or the like may have similar or the same connotation as "fluidly coupling" or "fluidly coupled" in some embodiments.

Techniques described and suggested herein include a method, the method including directing a conduit assembly to a receiving port by releasing one or more fluid streams from the conduit assembly, and fluidly coupling an internal passage of the conduit assembly to the receiving port.

In at least one embodiment, a system may include a first free-floating body including a receiving port and a second free-floating body, the second free-floating body including a conduit including an internal passage configured to be fluidly coupled to the receiving port and the second free-floating body further including a conduit assembly positioned at a distal end of the conduit, the conduit assembly including one or more fluid nozzles, the one or more fluid nozzles respectively configured to expel one or more fluid streams which may propel the conduit assembly through a surrounding environment so as to remotely direct the conduit assembly to the receiving port.

In at least one embodiment, a watercraft may include a plurality of storage tanks including a first storage tank and a second storage tank, a water pump, a conduit, the conduit including a first fluid passage fluidly coupled to the first storage tank, a second fluid passage fluidly coupled to the second storage tank, and a third fluid passage fluidly coupled to the water pump, a conduit assembly coupled to a distal end of the conduit, the conduit assembly including a plurality of jet nozzles fluidly coupled to the third fluid passage, the plurality of jet nozzles configured to expel a plurality of water streams, and a processor storing executable instructions in non-transitory memory which, if executed by the processor, may cause the watercraft to receive, from a land-based controller, an indication to direct the conduit assembly to a receiving port of a wave engine by selectively actuating at least one of the plurality of jet nozzles to expel at least one of the plurality of water streams, operate, according to the indication, the water pump to pump water to the at least one of the plurality of jet nozzles to be expelled therefrom as the at least one of the plurality of water streams, direct, according to the indication, the conduit assembly to the receiving port of the wave engine so as to fluidly couple each of the first fluid passage and the second fluid passage to the receiving port, supply an electrolysis reactant from the first storage tank to the wave engine via the first fluid passage, and siphon an electrolysis product from the wave engine to the second storage tank via the second fluid passage.

These, as well as other aspects, advantages, and alternatives will become apparent to those of ordinary skill in the art by reading the following detailed description, with reference where appropriate to the accompanying drawings. Further, it should be understood that descriptions and figures provided herein are intended to illustrate the invention by way of example only and, as such, that numerous variations are possible.

For example, the following description relates to various embodiments of systems and methods for a watercraft, device, or other floatable apparatus which is operable to transiently fluidly couple with another watercraft, device, or floatable apparatus. For instance, in a supply chain or along a shipping path, there may exist numerous points at which two otherwise independently operational free-floating watercraft floating on a surface of a body of water may be mechanically coupled to one another for a duration so as to transfer products or resources therebetween. In some cases, such products or resources may include fluids, such as liquids or gases. As such, the mechanical coupling between the free-floating watercraft may include various aspects specific to fluid transfer, e.g., secure sealing at one or more coupling locations. Specialized knowledge and/or manual effort may be utilized to achieve the mechanical coupling, such that a human operator may be positioned at one or both of the free-floating watercraft being coupled together.

An additional factor in coupling free-floating watercraft together is that each of the free-floating watercraft, being untethered to an immobile or relatively immobile location (e.g., land, a bed beneath a body of water, a larger watercraft, etc.), may not be in a single, static location. Accordingly, even when no propulsion is applied, a position of a given free-floating watercraft relative to another free-floating watercraft may be subject to dynamic, real-time adjustments as one or more ambient environmental forces (e.g., water currents, wind, oceanic or other wind-induced water waves, etc.) act upon both free-floating watercraft.

In at least one embodiment provided herein, a first free-floating body, such as a tanker ship or other storage vessel, may include a conduit and a conduit assembly positioned at a distal end of the conduit, the conduit assembly configured to semi-autonomously or autonomously mechanically couple to a second free-floating body, such as a wave engine. In an example embodiment, the conduit assembly may include one or more fluid nozzles configured to expel one or more fluid streams which may be timed and angled so as to guide the conduit assembly to a receiving port of the second free-floating body whereat the conduit assembly may be mechanically and fluidly coupled to the receiving port. Advantageously, by relying on fine-grained control of the one or more fluid streams, the conduit assembly may follow a more precise trajectory relative to certain other methods of achieving the mechanical coupling.

In an example embodiment, while the conduit assembly is mechanically and fluidly coupled to the receiving port, one or more fluids may be exchanged between the first and second free-floating bodies. For example, when the first free-floating body is the tanker ship or other storage vessel and the second free-floating body is the wave engine, the conduit may siphon an energy product (e.g., a chemical product storing captured energy) from the second free-floating body via a first passage while supplying an energy product precursor (e.g., a chemical reactant to be converted into the energy product upon capture of the energy) via a separate, second passage. As such, the energy product may be removed from the wave engine for transport (e.g., to a land-based storage facility and/or end user) and replaced with the energy product precursor such that the wave engine may continue to capture energy.

In additional or alternative embodiments, the conduit assembly may be detached from the receiving port so as to sever the mechanical and fluidic coupling. For example, the conduit assembly may expel one or more additional fluidic streams (e.g., in an opposing flow direction to the one or more fluidic streams relied upon to guide the conduit assembly to the receiving port) to generate a propulsive force which directs the conduit assembly away from the receiving port. As with initiation of the mechanical coupling, such detachment may be realized semi-autonomously or autonomously. As such, in at least one embodiment provided herein, transient fluidic coupling of two free-floating bodies may be realized in a semi-autonomous or fully autonomous manner and with a relatively high degree of precision.

Figure 2:
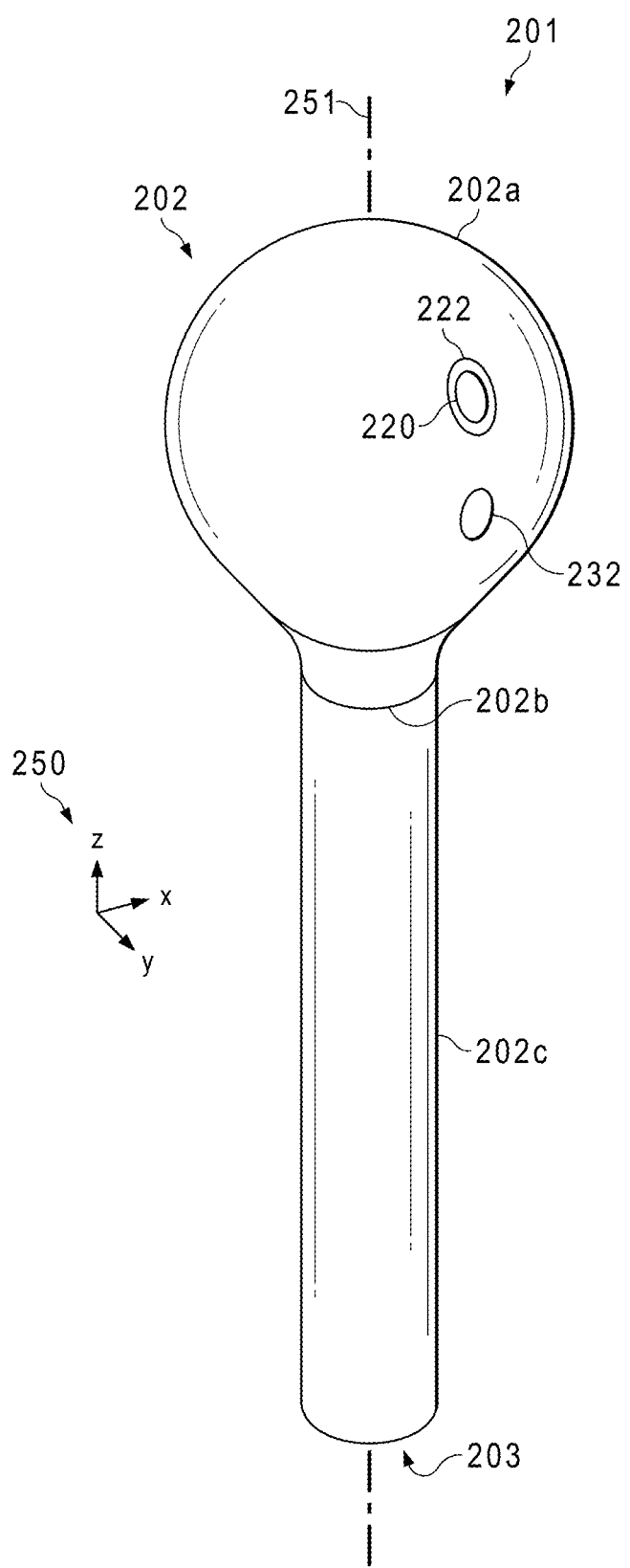
FIG. 2 shows a simplified perspective view of a wave engine, including a port for receiving a conduit assembly, in accordance with at least one embodiment.

Referring now to FIG. 1, a schematic diagram of a wave energy harvesting system 100 is shown. The wave energy harvesting system 100 may include a first free-floating body 101 and a second free-floating body 180 which may transiently fluidly couple to one another while floating on a surface 105 of a body of water 104. In an example embodiment, the first free-floating body 101 may be configured as a wave engine 101 and the second free-floating body 180 may be a storage vessel 180, such as a tanker ship 180. FIG. 2, for example, details one embodiment of a wave engine which may be included in the wave energy harvesting system 100 and which may transiently fluidly couple to a storage vessel or other free-floating body. In some embodiments, the wave engine 101 may include a receiving port 120 operable to receive a conduit assembly 141 in fluidic communication with a conduit 140 from the storage vessel 180 and thereby fluidly couple the wave engine 101 to the storage vessel 180 via the conduit 140 for transfer of one or more fluids therebetween. Exemplary methods for transferring such fluid(s) between free-floating bodies, e.g., during and/or following an energy capture operation of a wave engine, are discussed in detail below with reference to FIGS. 17-18B.

The receiving port 120 and the conduit assembly 141 may take any one or a combination of the various configurations described herein. In some embodiments, for instance, the conduit assembly 141 may include one or more fluid nozzles (not shown at FIG. 1) operable to emit one or more fluid streams to direct the conduit assembly 141 to the receiving port 120. As one example, FIGS. 3-16 present details of a wave engine and a storage vessel operable to transiently fluidly couple to one another by leveraging a conduit assembly to direct a conduit of the storage vessel to the wave engine.

A set of Cartesian coordinate axes 150 is shown in FIG. 1 for contextualizing positions of the various components of the wave energy harvesting system 100. Specifically, x-, y-, and z-axes are provided which are mutually perpendicular to one another, where the x- and z-axes define a plane of the schematic diagram shown in FIG. 1 and the y-axis is perpendicular thereto. In some embodiments, a direction of gravity may be parallel to and coincident with a negative direction of the z-axis.

Though exemplified herein in the context of wave engines, the first free-floating body 101 may be configured as any free-floating body capable of self-propulsion, e.g., by extracting energy from stored fuel, inducing a flow of pressurized water, and/or harnessing one or more ambient environmental forces, so as to translate along the surface 105 of the body of water 104. For example, the first free-floating body 101 may be a ship 101 (such as a deployment ship, a tanker ship or other storage vessel, or another transport vessel), a buoy 101, a wind turbine 101, an offshore platform 101, such as a data center, etc.

In some embodiments, the external housing 102 of the first free-floating body 101 may be formed from a sufficiently durable material so as to withstand extremes of one or more ambient environmental conditions, such as winds, water waves, ambient temperature, etc. For example, the external housing 102 may be formed from steel, aluminum, and/or other metals or alloys thereof, and/or cement, fiberglass, carbon fiber, and/or plastic.

In some embodiments, the external housing 102 may be configured as a rotationally symmetric body. Specifically, the external housing 102 may exhibit a rotational symmetry defined with respect to a central axis 151 (e.g., a vertical axis parallel with the z-axis). The rotationally symmetric body may be configured with any one of a variety of three-dimensional shapes, such as spherical, ellipsoidal, and/or polygonal shapes. For example, the rotationally symmetric body may be cylindrical or quasi-cylindrical in shape. As used herein, "quasi-cylindrical" may refer to an otherwise cylindrical shape which is modified in one or more dimensions. For example, the rotationally symmetric body may be configured in a substantially cylindrical shape at a first end (when the term "substantially" is used herein, it is meant that the recited relationship, characteristic, parameter, or value need not be realized with exact precision, but that deviations or variations known to those of skill in the art may occur to an extent that does not preclude the effect that the relationship, characteristic, parameter, or value was intended to provide) and a substantially spherical shape at an opposing second end (e.g., the opposing second end opposing the first end with respect to the z-axis). As such, the external housing 102 may be configured for substantially unencumbered rotational motion in the body of water 104.

In embodiments where the first free-floating body 101 is configured as the wave engine 101, water may pass into and through the wave engine 101 with upward and downward motion 106 (e.g., in a positive direction of the z-axis and the negative direction of the z-axis, respectively) of water waves. As described in greater detail below with reference to FIG. 2, the upward and downward motion 106 may induce the water passing into and through the wave engine 101, energy from which may be captured and converted to an energy product 108 (as indicated by a dashed arrow 126a). The energy product 108, for example, may include one or more of an electrolysis product or other fuel, such as H2 gas, HCl, etc., removed carbon, minerals, or an executed computational algorithm, such as a proof-of-work mechanism for a cryptocurrency.

In some embodiments, the first free-floating body 101 may include a first onboard controller or other computing device 110 and/or the second free-floating body 180 may include a second onboard controller or other computing device 129, the first and second onboard controllers 110, 129 each including non-transitory memory on which executable instructions may be stored. The executable instructions may be executed by one or more processors of the first and second onboard controllers 110, 129 to respectively perform various functionalities of the first and second free-floating bodies 101, 180. Accordingly, the executable instructions may include various routines for operation, propulsion, maintenance, tracking, and testing of the first and second free-floating bodies 101, 180. The first and second onboard controllers 110, 129 may be communicably coupled to various components (e.g., valves, power supplies, etc.) of the first and second free-floating bodies 101, 180 to command actuation and use thereof (wired and/or wireless communication paths between the first and second onboard controllers 110, 129 and the various components are omitted from FIG. 1 for clarity). For instance, the first onboard controller 110 may command actuation of one or more first coupling elements annularly distributed on the receiving port 120 and the second onboard controller 129 may command actuation of one or more second coupling elements annularly distributed on the conduit assembly 141 so as to selectively engage and disengage the one or more first coupling elements with one or more second coupling elements (first and second coupling elements not shown at FIG. 1).

In certain embodiments, the first and second onboard controllers 110, 129 may be communicably coupled to a remote controller or computing device 114 via a wireless network 112. The various controllers 110, 114, 129 may be configured in a substantially similar manner to one another, excepting, in some examples, one or more modifications or differences for a given use case. For example, the remote controller 114 may be positioned so as to be accessible to an operator of the wave energy harvesting system 100, e.g., on a ship or in a physical structure 116 on land 118 (as illustrated in FIG. 1). As such, even when one or both of the first and second free-floating bodies 101, 180 are not geographically located within a national or subnational jurisdiction, the one or both of the first and second free-floating bodies 101, 180 may nevertheless be in continuous (e.g., substantially uninterrupted) or periodic communication with the remote controller 114 which may be geographically located within a national or subnational jurisdiction (e.g., on the land 118).

In some embodiments, because the remote controller 114 may be configured for use by the operator, the remote controller 114 may include a user interface at which the operator may enter commands or otherwise modify operation of the wave energy harvesting system 100. The user interface may include various components for facilitating operator use of the wave energy harvesting system 100 and for receiving operator inputs (e.g., requests to direct the conduit assembly 141 to the receiving port 120), such as one or more displays, input devices (e.g., keyboards, touchscreens, computer mice, depressible buttons, mechanical switches, other mechanical actuators, etc.), lights, etc. In additional or alternative embodiments, one or both of the first and second onboard controllers 110, 129 may be configured with the user interface as described hereinabove.

An overall energy flow 126 of the wave energy harvesting system 100 is schematically depicted in FIG. 1, in which energy captured at the first free-floating body 101 from water induced therethrough by the upward and downward motion 106 of the water waves (as indicated by the dashed arrow 126a) may be converted to the energy product 108 and transferred to the second free-floating body 180 (as indicated by a dashed arrow 126b) and then transferred from the second free-floating body 180 to a land-based vehicle 130 (as indicated by a dashed arrow 126c) to be transported to a storage facility and/or an end user for consumption. For example, in some embodiments, the wave energy harvesting system 100 may include a plurality of nodes including a plurality of first free-floating bodies 101, one or more second free-floating bodies 180 to transport a plurality of energy products 108 from the plurality of first free-floating bodies 101 to the land 118, and one or more land-based vehicles 130 to transport the plurality of energy products 108 from the one or more second free-floating bodies 180 to the storage facility and/or the end user.

In an example embodiment, the energy product 108 may be a fluid (e.g., a liquid or a gas) which is transferred from the first free-floating body 101 to the second free-floating body 180 via the conduit 140, the conduit 140 being configured to transiently fluidly couple an internal reservoir of the second free-floating body 180 to an internal reservoir of the first free-floating body 101 via one or more internal passages extending at least a length of the conduit 140 (internal reservoirs and internal passage(s) not shown at FIG. 1). In certain embodiments, the conduit 140 may include a plurality of internal passages, each of which may convey a different fluid between the first and second free-floating bodies 101, 180. As an example, the conduit 140 may include a first internal passage configured to supply an energy product precursor 109 (e.g., an electrolysis reactant, such as deionized water) from the second free-floating body 180 to the first free-floating body 101 so as to replace the energy product 108 being transferred to the second free-floating body 180. Accordingly, in such an example, the conduit 140 may further include a second internal passage configured to siphon the energy product 108 (e.g., an electrolysis product, such as hydrogen gas) from the first free-floating body 101 to the second free-floating body 180. As such, the overall energy flow 126 may be maintained by periodically (e.g., once per week) replenishing a capacity of the first free-floating body 101 to convert captured energy into a chemical energy product.

In some embodiments, to transiently fluidly couple the conduit 140 to the receiving port 120, the conduit assembly 141 may include one or more fluid nozzles (not shown at FIG. 1) configured to adjust a position of the conduit assembly 141 in three-dimensional space. Specifically, in certain embodiments, the one or more fluid nozzles may adjust the position of the conduit assembly 141 by ejecting, expelling, or otherwise releasing one or more fluid streams from the one or more fluid nozzles according to one or more continuously adjustable parameters. For instance, the one or more continuously adjustable parameters may include, for each fluid nozzle of the one or more fluid nozzles, one or more of a power of a fluid being pumped therethrough, a valve opening, or a port angle, such that one or more specified fluid nozzles may be selectively operated, e.g., based on a received request indicating one or more of a thrust of at least one fluid stream of the one or more fluid streams, a timing of the at least one fluid stream, a duration of each of the at least one fluid stream, or an angle of the at least one fluid stream. In some embodiments, the one or more continuously adjustable parameters may be dynamically adjusted responsive to sensor data, meteorological data, previous and current trajectories, etc., allowing controlled adjustments to the position of the conduit assembly 141 so as to direct the conduit assembly 141 to a specified location (e.g., the receiving port 120, as indicated by a dashed arrow 124). As a result of controllably adjusting the one or more fluid streams, the conduit assembly 141 may be directed to the specified location while avoiding tangles, knots, kinks, etc. in the conduit 140.

For example, a change in relative positioning of the first and second free-floating bodies 101, 180 along the surface 105 of the body of water 104 may be detected and accounted for by dynamically adjusting the one or more continuously adjustable parameters of the one or more fluid nozzles of the conduit assembly 141. In an additional or alternative example, the one or more continuously adjustable parameters may be adjusted responsive to receiving, e.g., from the remote controller 114, an indication to adjust the position of the conduit assembly 141 (e.g., to selectively engage or disengage the conduit assembly 141 to or from the receiving port 120).

In some embodiments, the adjustments to the position of the conduit assembly 141 may be executed based on a manual operator input, e.g., at the user interface of the remote controller 114. In additional or alternative embodiments, the adjustments to the position of the conduit assembly 141 may be automatically adjusted, e.g., based on feedback from one or more sensors and/or data received via the wireless network 112. As an example, one or both of the first and second free-floating bodies 101, 180 may include an accelerometer (e.g., an inertial measurement unit; not shown) configured to gather changes in local positional data, e.g., resulting from water wave motions. As an additional or alternative example, one or both of the first and second free-floating bodies 101, 180 may include a global positioning system (not shown) configured to gather geographic positional data. As an additional or alternative example, one or both of the first and second free-floating bodies 101, 180 may include a wind speed sensor (not shown) configured to measure wind speed. As an additional or alternative example, such data (e.g., the positional data and/or the wind speed) may be received via the wireless network 112, in addition to other data such as meteorological data (e.g., water wave height, direction of water wave propagation, water wave period, weather, etc.). In some embodiments, directions and magnitudes of applied forces may be inferred based on the feedback from the one or more sensors and/or the data received via the wireless network 112, such that specific operational parameters (e.g., the one or more continuously adjustable parameters) may be adjusted responsive such that changes in individual applied forces may be accounted for with specificity.

Referring now to FIG. 2, a simplified perspective view of a wave engine 201 is shown. In an example embodiment, and as shown in FIG. 2, the wave engine 201 may include an external or exterior housing 202 having therethrough a receiving port 220 and a coupling structure 222 surrounding the receiving port 220, the coupling structure 222 configured to reversibly and securely mechanically couple a conduit (not shown at FIG. 2) to the external housing 202 so as to be in fluidic communication with an interior of the external housing 202 via the receiving port 220. In such an embodiment, upon mechanical coupling to the external housing 202, the conduit may be in fluidic communication with a storage tank (not shown at FIG. 2) enclosed or otherwise housed within the external housing 202 such that one or more fluids may be supplied to and/or siphoned from the storage tank. In some embodiments, the wave engine 201 may be positioned in a wave energy harvesting system, such as the wave energy harvesting system 100 described in detail above with reference to FIG. 1, and the one or more fluids being supplied to and/or siphoned from the storage tank may include an energy product precursor (e.g., an electrolysis reactant) and an energy product (e.g., an electrolysis product). Accordingly, in one example, the wave engine 201 may replace the first free-floating body 101 of the wave energy harvesting system 100 of FIG. 1. Moreover, in such an example, the wave engine 201 may be assembled and configured similarly to the first free-floating body 101 of FIG. 1 and may operate in a substantially similar manner in practice. Accordingly, excepting minor configurational differences, the description of the first free-floating body 101 provided above with reference to FIG. 1 may be additionally applied to the wave engine 201 depicted in FIG. 2 in some embodiments. In certain embodiments, additional components and/or functionalities may be included in the wave engine 201 which were not described in detail above with reference to FIG. 1 and which may additionally be applied to the first free-floating body 101 depicted in FIG. 1.

To indicate suitability for substitution in certain non-limiting embodiments, similar reference indicators have been applied to elements which may be interchangeable with one another. For example, elements depicted in FIG. 2 may be labeled with the same numbers for the "tens" and "ones" positions as those elements in FIG. 1 which may be interchangeable in such examples, but may utilize a "2" in the "hundreds" position instead of a "1" (e.g., the external housing 202 of the wave engine 201 of FIG. 2 and the external housing 102 of the free-floating body 101 of FIG. 1 may be interchangeable in certain non-limiting embodiments). As such, in certain embodiments, description of any such interchangeable elements described hereinabove may substitute or supplement description provided below with reference to FIG. 2. Alphabetical indicators (e.g., "a" in "202a") may, in some examples, identify subcomponents included as a part of another component (e.g., "202a" may identify a subcomponent of "202").

A set of Cartesian coordinate axes 250 is shown in FIG. 2 for contextualizing positions of the various components of the wave engine 201. Specifically, x-, y-, and z-axes are provided which are mutually perpendicular to one another. In some embodiments, a direction of gravity may be parallel to and coincident with a negative direction of the z-axis.

In some embodiments, the wave engine 201 may freely float (e.g., float untethered to land, a seafloor, a lakebed, another floating body, etc.) on a surface of a body of water (not shown at FIG. 2). Specifically, buoyancy of the wave engine 201 may be assisted, at least in part, by gas captured and enclosed or otherwise housed within an upper hull enclosure or buoy 202a of the external housing 202. In an example embodiment, the upper hull enclosure 202a may be at least partially hollow [e.g., the upper hull enclosure 202a may include the storage tank and an internal reservoir enclosed or otherwise housed therein (not shown at FIG. 2)] so as to be filled with the captured gas. The captured gas may include, for example, air and/or another gas, such as hydrogen and/or nitrogen, supplied at a manufacturing location or a deployment location. Additionally, or alternatively, the air and/or another gas may enter the upper hull enclosure 202a from a surrounding, ambient environment. Additionally, or alternatively, the captured gas may be generated via a conversion process occurring within the wave engine 201, wherein the conversion process may convert energy captured by the wave engine 201 to the energy product.

In an example embodiment, the captured gas within the upper hull enclosure 202a may be compressed therein so as to exhibit a gas pressure greater than a pressure of the surrounding ambient environment (e.g., atmospheric pressure at the surface of the body of water on which the wave engine 201 floats). In some embodiments, the captured gas may be compressed, at least in part, by water that has entered the external housing 202 via a lower aperture 203. More specifically, the external housing 202 may include a lower inertial water tube or pipe 202c fluidly coupled to each of the lower aperture 203 and the upper hull enclosure 202a through which the water that has entered the external housing 202 may pass and enter into the upper hull enclosure 202a. In some embodiments, the external housing 202 may include a hull enclosure 202a with a diameter that is approximately 20 meters or smaller, approximately, 10 meters or smaller, or approximately 1 meter or smaller. Though, larger diameters may also be used. A length of the pipe 202c may be approximately 100 meters or less, approximately 50 meters or less, approximately 20 meters or less, or approximately 1 meter or less. Though, larger lengths may also be used in some embodiments. More generally, a length of the pipe 202c may be related to a diameter of the hull enclosure 202a by a ratio of (pipe length:hull diameter) that is 0.5:1 or greater, 1:1 or greater, 2:1 or greater, 5:1 or greater, or 10:1 or greater. Though, smaller ratios may also be used in some embodiments.

In certain embodiments, the water that has entered the external housing 202 may be injected, propelled, or otherwise induced through the lower aperture 203 as a result of water wave motion, whereby entering water may rise and fall, e.g., proportionate with or otherwise responsive to the water wave motion. Additionally, or alternatively, the captured gas may be compressed, at least in part, by the energy product precursor which is convertible, via the conversion process, to the energy product.

In some embodiments, the external housing 202 may include an annular collar 202b which mechanically couples the lower inertial water tube 202c to the upper hull enclosure 202a. Specifically, the annular collar 202b may rigidly affix the lower inertial water tube 202c to the upper hull enclosure 202a so as to provide overall structural reinforcement of the external housing 202. As shown in FIG. 2, the annular collar 202b may be configured in a curvaceous and concave shape, e.g., an approximately frustoconical shape, so as to form, along with the upper hull enclosure 202a (e.g., which may be configured in an approximately spherical shape, an asymmetrical shape, a cuboidal shape, a pyramidal shape, a frustoconical shape, or any other suitable three-dimensional shape) and the lower inertial water tube 202c (e.g., which may be configured in an approximately cylindrical shape), a substantially continuous outer surface of the external housing 202.

In some embodiments, the water that has entered the external housing 202 may be released into the surrounding ambient environment via one or more upper apertures 232 fluidly coupled to the internal reservoir enclosed within the upper hull enclosure 202a such that a pressure and/or a flow of the water through the external housing 202 may be maintained and/or adjusted and/or the wave engine 201 may be propelled by inducing a localized current within the body of water, e.g., along a negative direction of the y-axis. Specifically, the one or more upper apertures 232 may be respectively fluidly coupled to the internal reservoir via one or more exit passages (not shown at FIG. 2), each of the one or more exit passages housing a turbine configured to capture energy via water exiting the internal reservoir (e.g., the turbine may be configured to adjust a torque thereof dynamically responsive to a pressure of the exiting water). The one or more upper apertures 232 may be positioned on the upper hull enclosure 202a as shown in FIG. 2, or, in additional or alternative embodiments, the one or more upper apertures 232 may be positioned elsewhere on the external housing 202, such as on the annular collar 202b. Though one upper aperture 232 is visible in FIG. 2, in additional or alternative embodiments, a plurality of upper apertures 232 may be included, each of the plurality of upper apertures 232 fluidly coupled to the internal reservoir. In such embodiments, the plurality of upper apertures 232 may be positioned on the external housing 202 substantially adjacent to one another (e.g., on a same side of a plane including the central axis 251) or substantially distant from one another (e.g., on opposite sides of a plane including the central axis 251 and parallel to a plane defined by the y- and z-axes). In an example embodiment, a pair of upper apertures 232 may be positioned on opposite sides of the external housing 202 from one another (e.g., along the y-axis and on opposite sides of a plane parallel to a plane formed by the x- and z-axes). Moreover, though the one or more upper apertures 232 is shown positioned on the external housing 202 on a lower portion of the upper hull enclosure 202*a* (e.g., below a bisecting plane parallel to a plane formed by the x- and y-axes), in other examples, the one or more upper apertures 232 may instead be positioned on an upper portion of the upper hull enclosure 202*a* (e.g., above the bisecting plane parallel to the plane formed by the x- and y-axes).

In some embodiments, the captured energy may be leveraged to convert the energy product precursor to the energy product via the conversion process and thereby store the captured energy within the energy product. As an example, the conversion process may be a chemical conversion process which converts one or more chemical reactants to one or more chemical products. In such an example, the one or more chemical reactants may include the energy product precursor and the one or more chemical products may include the energy product. In specific cases wherein the chemical conversion process is an electrolysis reaction, the energy product precursor may be an electrolysis reactant, such as deionized water, and the energy product may be an electrolysis product, such as hydrogen gas.

In some embodiments, the energy product precursor may be stored in a same volume with the energy product. In an example embodiment, each of the energy product precursor and the energy product may be stored without a physical barrier in the storage tank. Such a configuration may be utilized, for example, when the energy product precursor is a liquid (e.g., deionized water) and the energy product is a gas (e.g., hydrogen gas), the (gaseous) energy product being stored in a first portion of the storage tank above a second portion of the storage tank storing the (liquid) energy product precursor, the first and second portions being fluidly continuous with one another and (nominally) separated by a gas-liquid interface between the energy product and the energy product precursor.

In some embodiments, the storage tank may be fluidly coupled to the receiving port 220 via one or more receiving passages (not shown at FIG. 2). In an example embodiment, a first receiving passage of the one or more receiving passages may extend to the first portion of the storage tank storing the energy product and a second receiving passage of the one or more receiving passages may extend to the second portion of the storage tank storing the energy product precursor. Accordingly, when the conduit is fluidly coupled to the receiving port 220, one or more internal passages of the conduit may be respectively fluidly coupled to the one or more receiving passages fluidly coupling the storage tank to the receiving port 220.

In some embodiments, the receiving port 220 may be positioned on the upper hull enclosure 202*a* as shown in FIG. 2, or, in additional or alternative embodiments, the receiving port 220 may be positioned elsewhere on the external housing 202, below the surface of a body of water, such as on the annular collar 202*b*. Moreover, though the receiving port 220 is shown positioned on the external housing 202 on the upper portion of the upper hull enclosure 202*a* (e.g., above the bisecting plane parallel to the plane formed by the x- and y-axes), in other examples, the receiving port 220 may instead be positioned on the lower portion of the upper hull enclosure 202*a* (e.g., below the bisecting plane parallel to the plane formed by the x- and y-axes).

In some embodiments, and as shown in FIG. 2, the coupling structure 222 may surround the receiving port 220. Accordingly, in such embodiments, the coupling structure 222 may be annular so as to receive the conduit and mechanically couple the conduit to the wave engine 201. In an example embodiment, the coupling structure 222 may include one or more coupling elements (not shown at FIG. 2) configured to reversibly mate with one or more corresponding coupling elements positioned at an end of the conduit. As such, the coupling structure 222 may be configured to securely mechanically and fluidly couple the conduit to the receiving port 220.

Though only one receiving port 220 and only one coupling structure 222 are shown in FIG. 2, in other embodiments, a plurality of receiving ports 220 and a plurality of coupling structures 222 respectively surrounding the plurality of receiving ports 220 may be positioned on the external housing 202 to fluidly couple to multiple conduits conveying the same fluids (e.g., the energy product precursor and the energy product) or variously conveying different fluids to the interior of the external housing 202.

Figure 3:
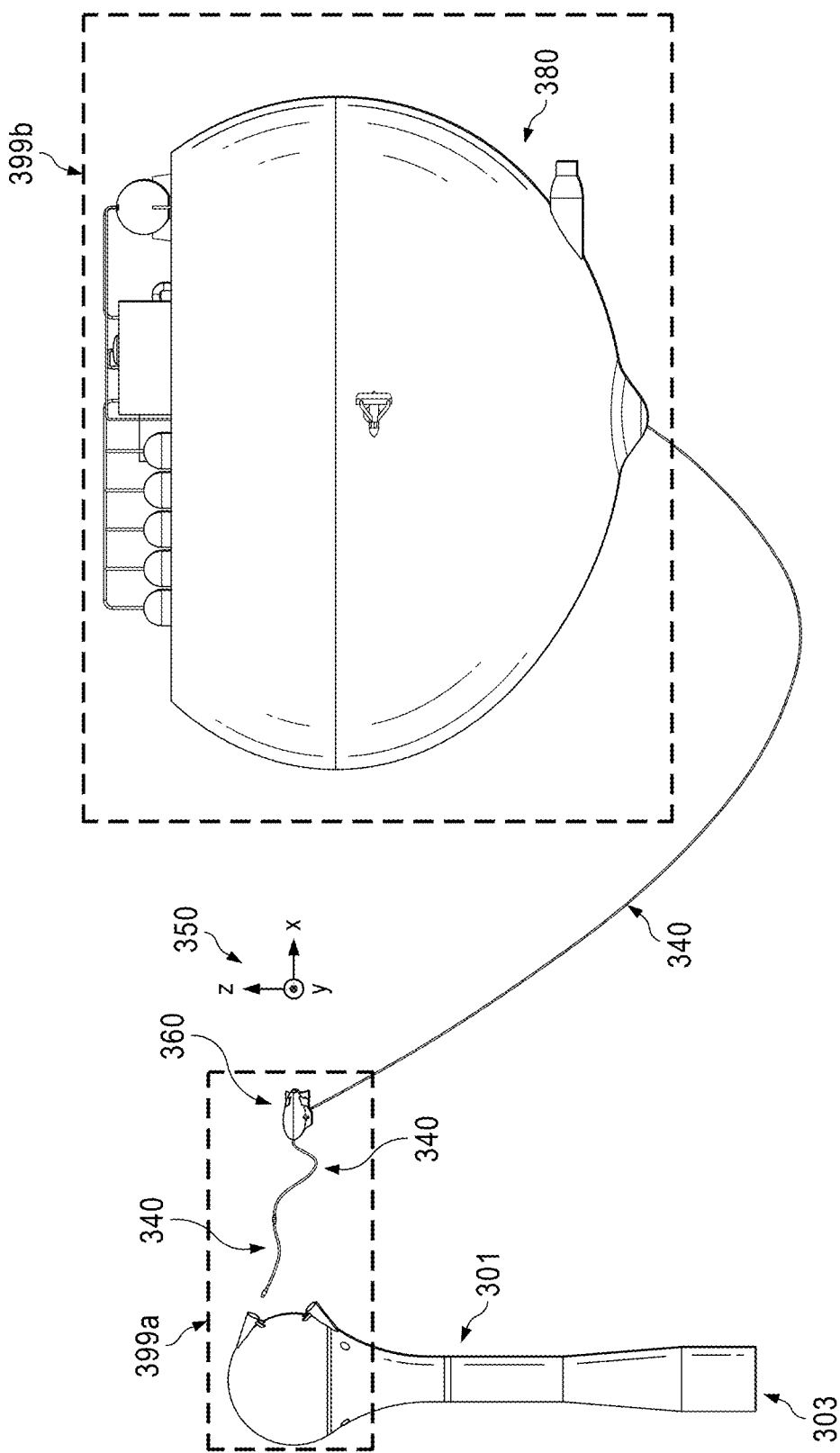
FIG. 3 shows a side view of a wave engine and a tanker ship, the tanker ship including a conduit operable to transiently fluidly couple to the wave engine, in accordance with at least one embodiment.
Figure 4:
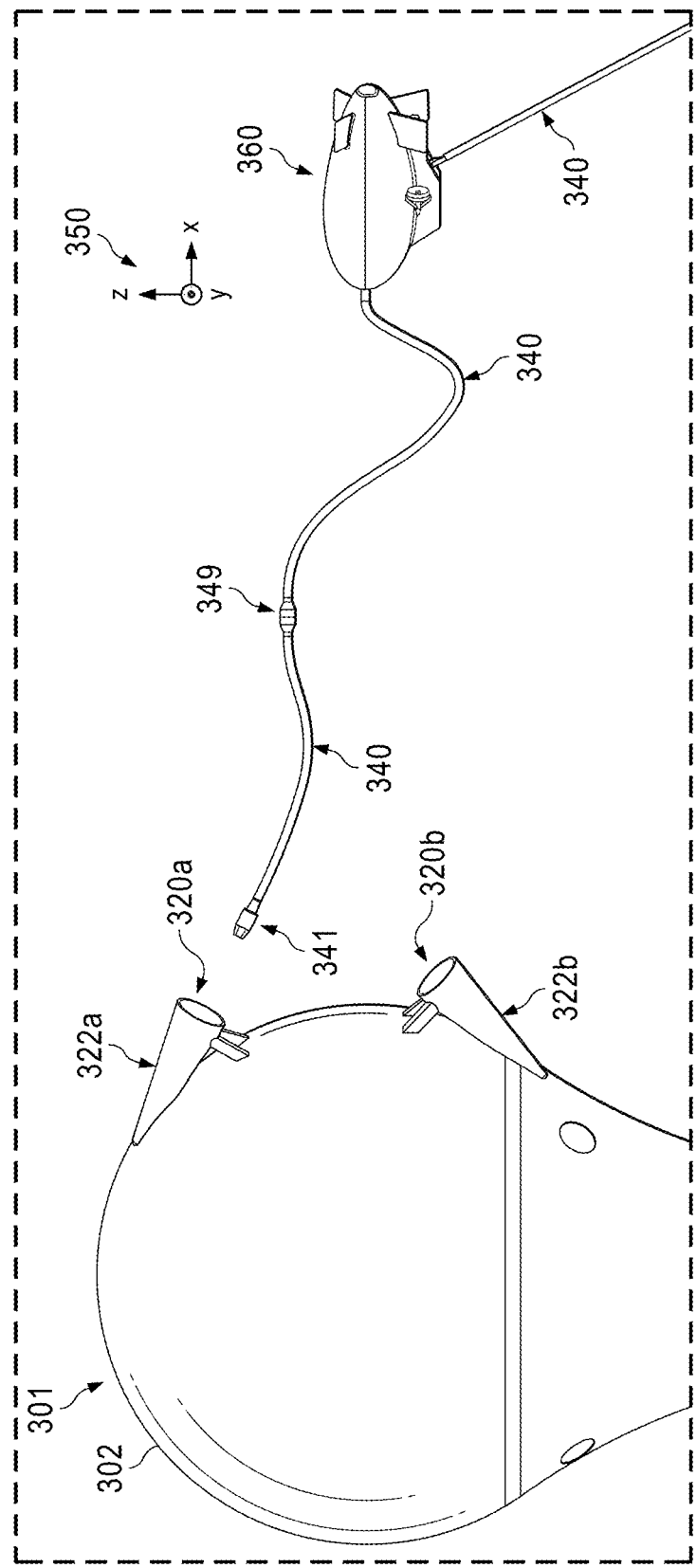
FIG. 4 shows an inset view of the side view of FIG. 3, including the wave engine, a conduit assembly, an intermediate lifting assembly, and an intermediate pump assembly, in accordance with at least one embodiment.
Figure 5:
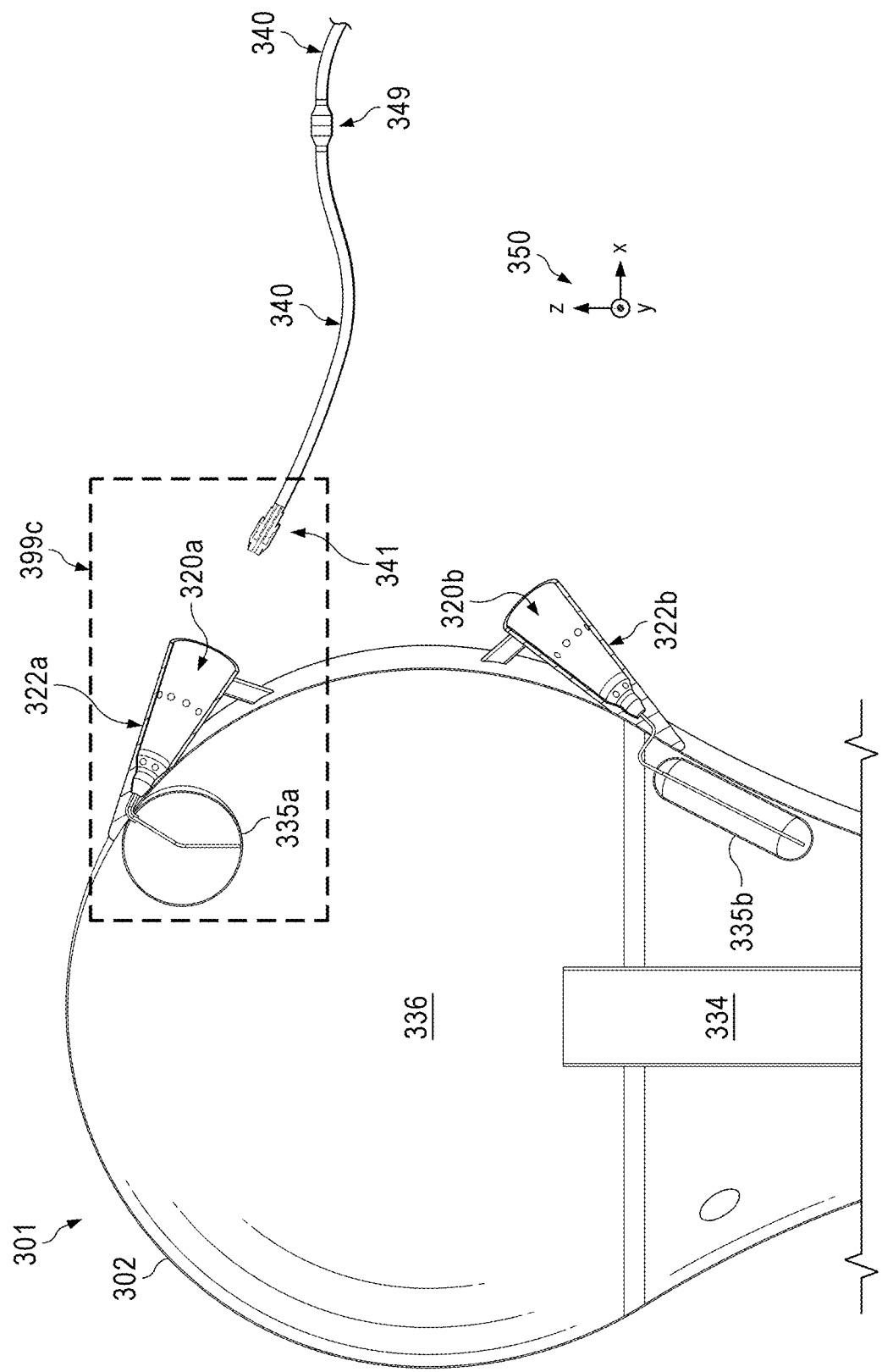
FIG. 5 shows a cross-sectional side view of the wave engine and the conduit assembly of FIG. 3, in accordance with at least one embodiment.
Figure 6:
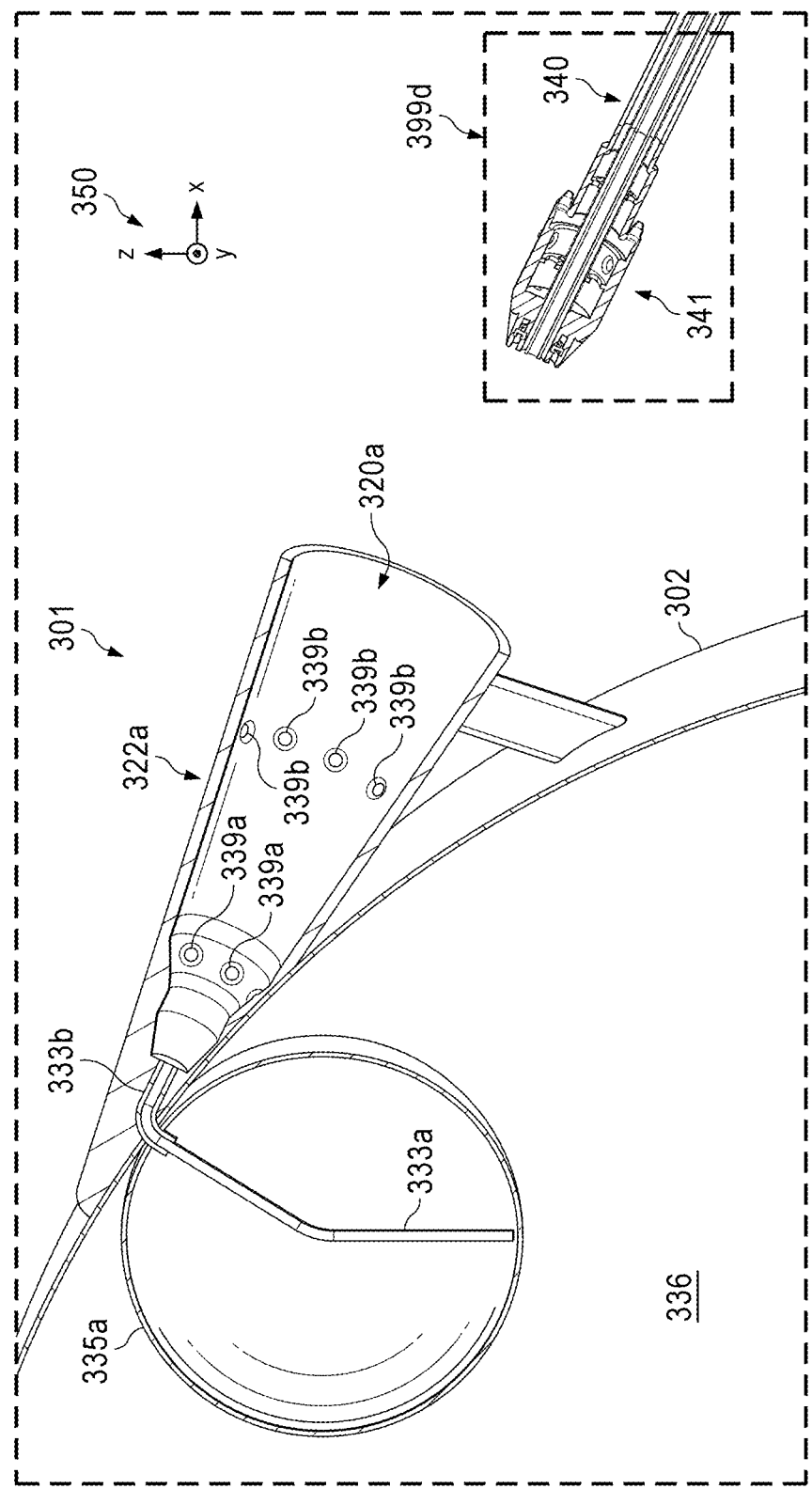
FIG. 6 shows an inset view of the cross-sectional side view of FIG. 5, including a receiving port of the wave engine and the conduit assembly, in accordance with at least one embodiment.
Figure 7:
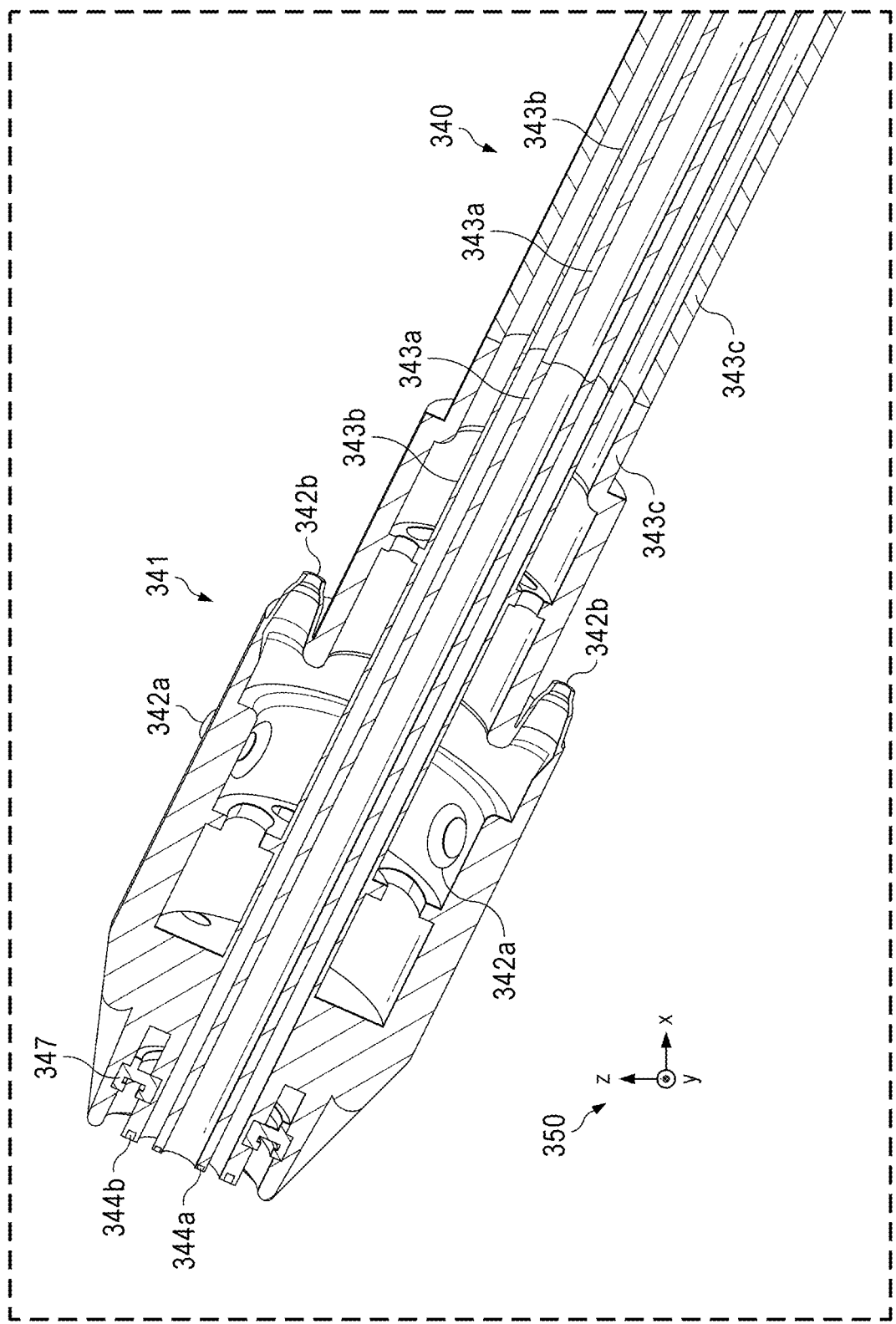
FIG. 7 shows an inset view of the inset view of FIG. 6, including the conduit assembly, in accordance with at least one embodiment.
Figure 8:
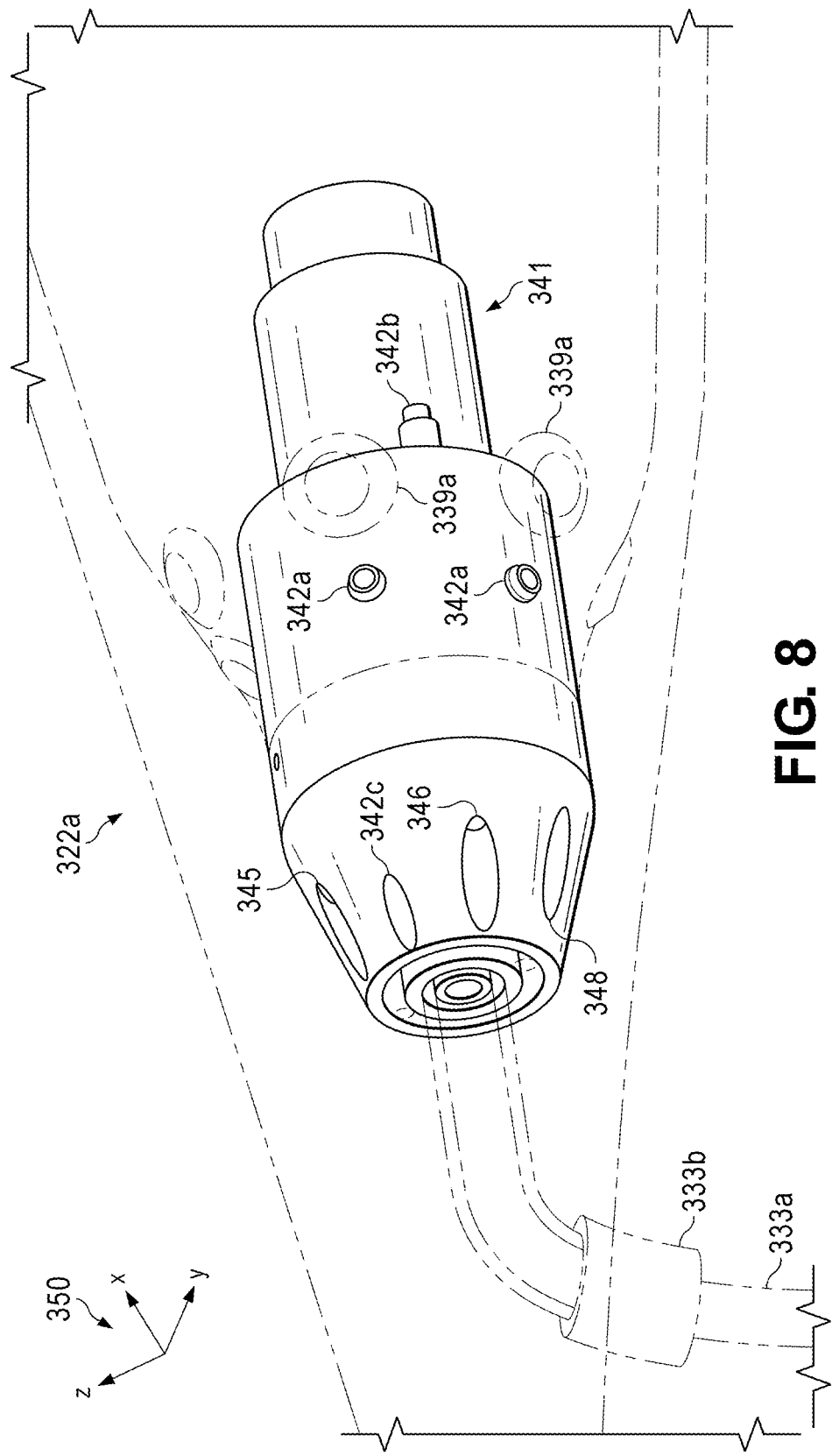
FIG. 8 shows a partially transparent perspective view of a coupling structure of the wave engine of FIG. 3 engaged with the conduit assembly of FIG. 3, in accordance with at least one embodiment.
Figure 9:
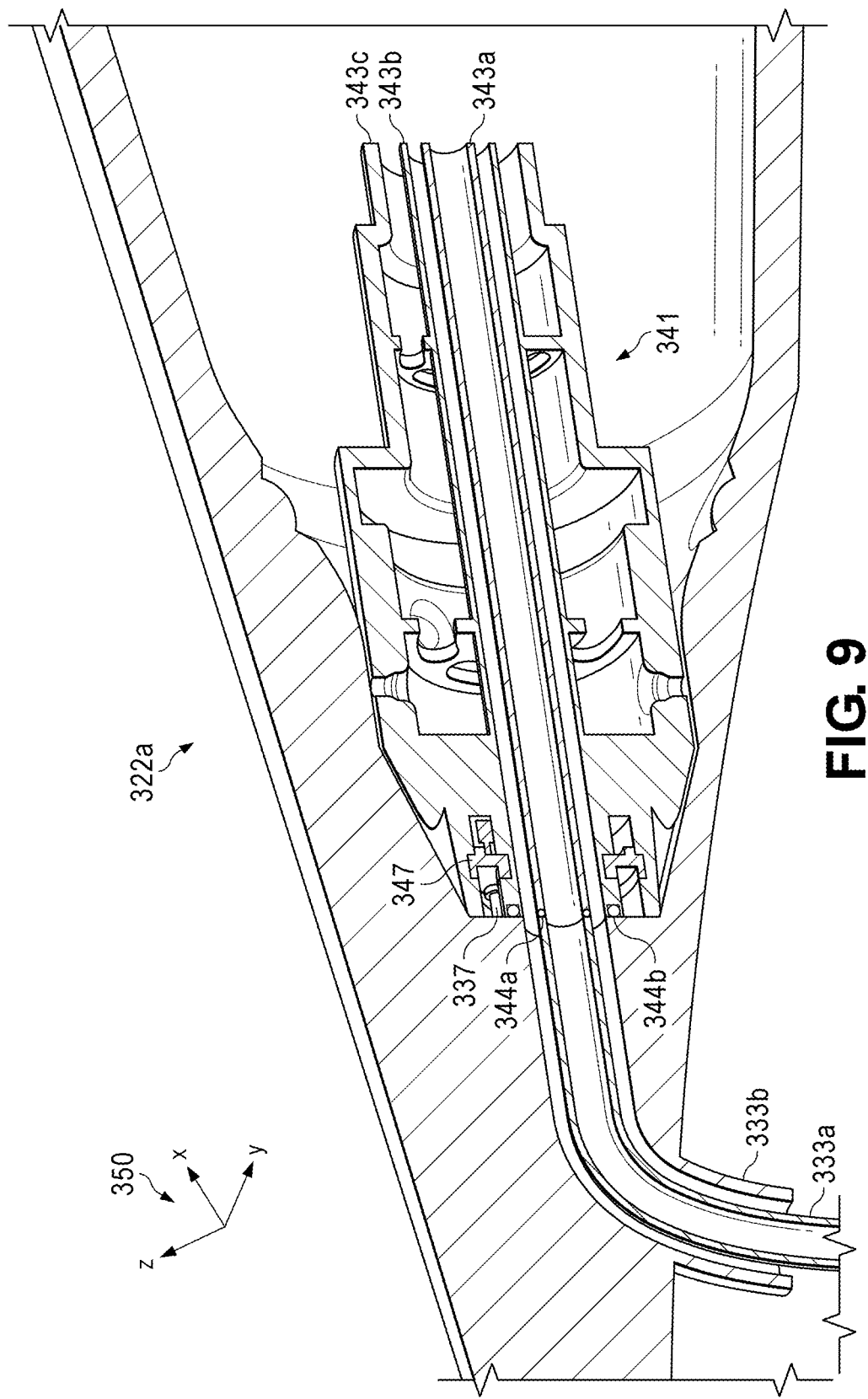
FIG. 9 shows a cross-sectional perspective view of the coupling structure of the wave engine of FIG. 3 engaged with the conduit assembly of FIG. 3, in accordance with at least one embodiment.
Figure 10:
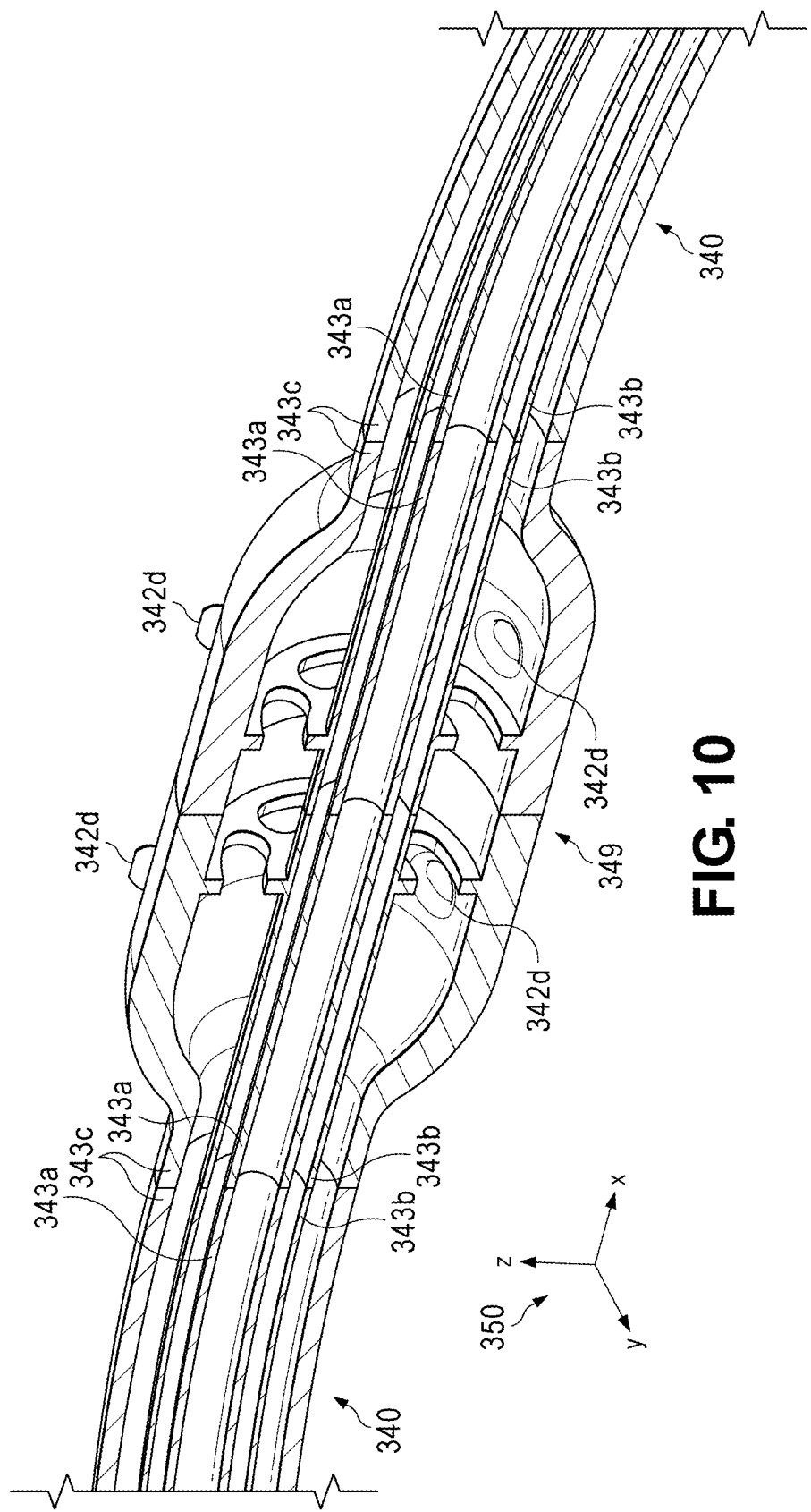
FIG. 10 shows a cross-sectional perspective view of the intermediate lifting assembly of FIG. 4, in accordance with at least one embodiment.
Figure 11:
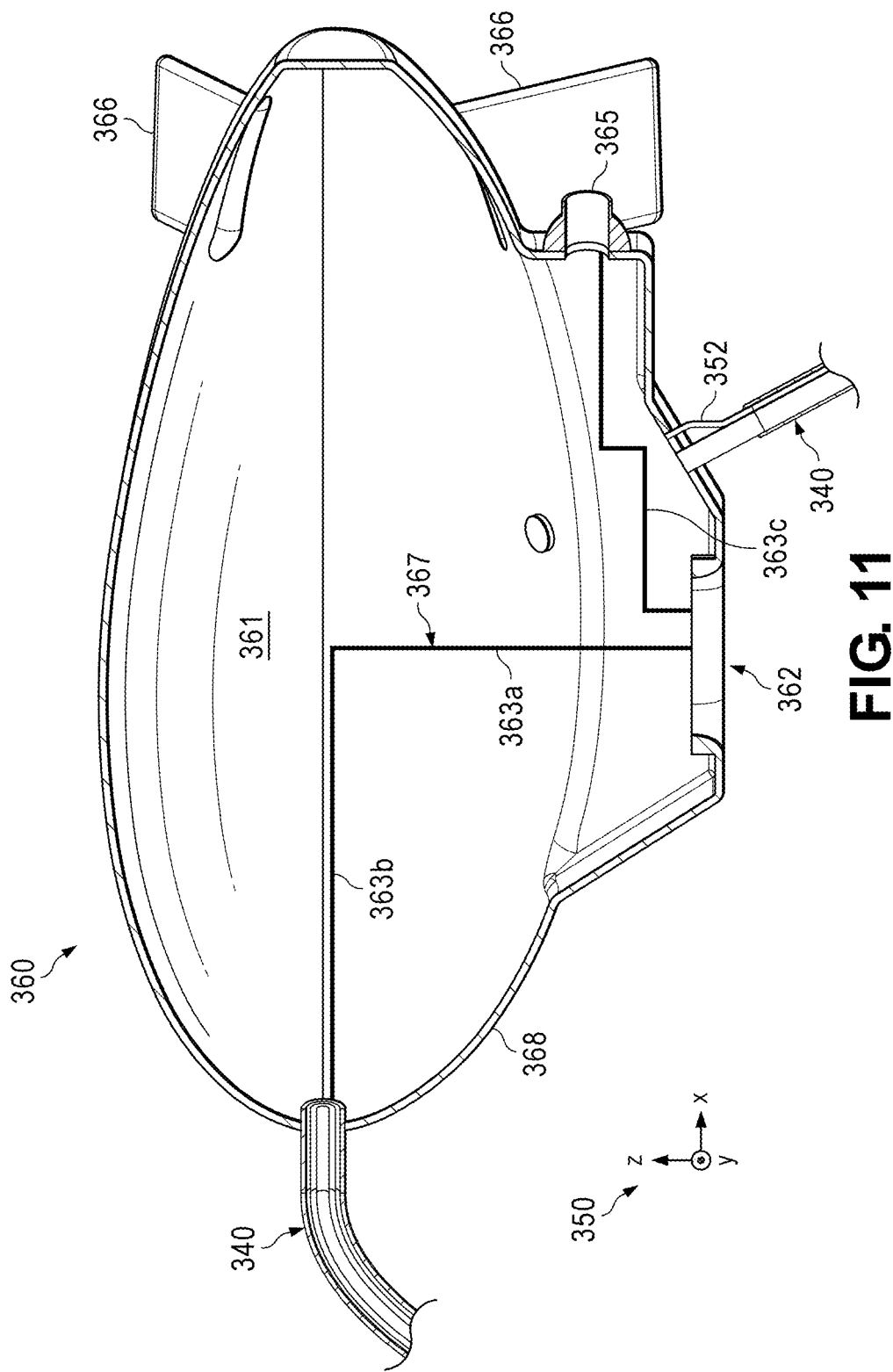
FIG. 11 shows a cross-sectional side view of the intermediate pump assembly of FIG. 4, in accordance with at least one embodiment.
Figure 12:
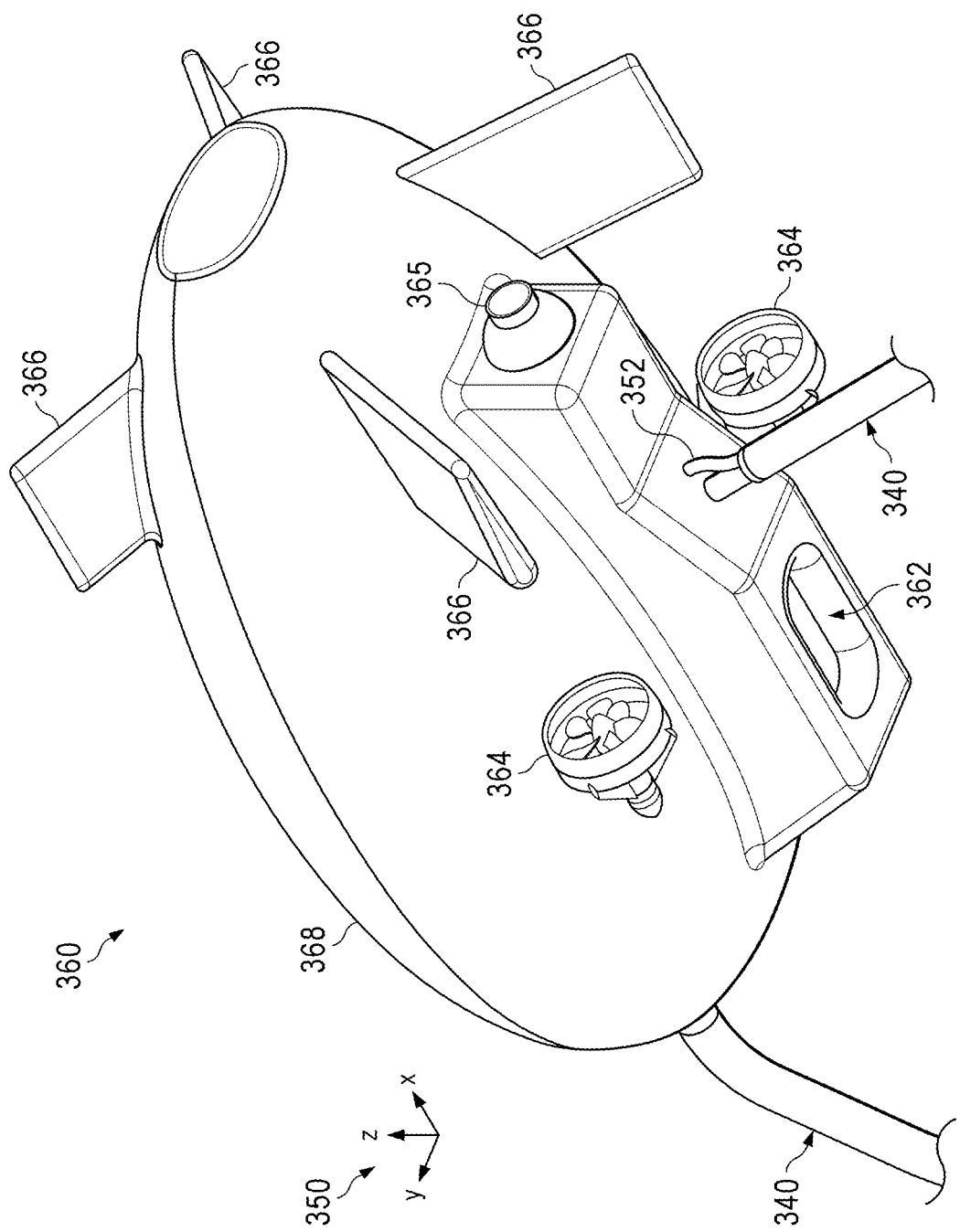
FIG. 12 shows a perspective view of the intermediate pump assembly of FIG. 4, in accordance with at least one embodiment.
Figure 13:
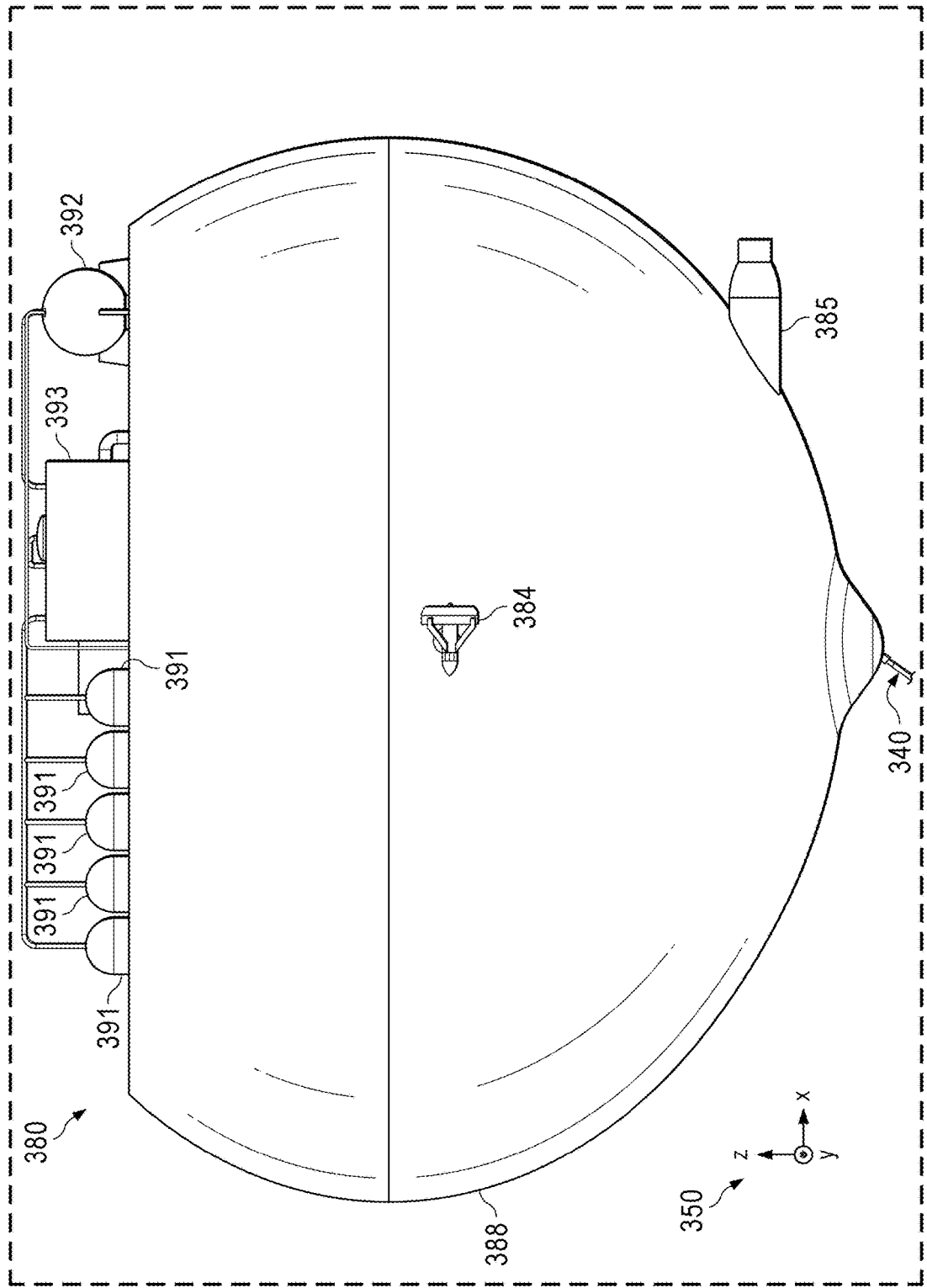
FIG. 13 shows an inset view of the side view of FIG. 3, including the tanker ship, in accordance with at least one embodiment.
Figure 14:
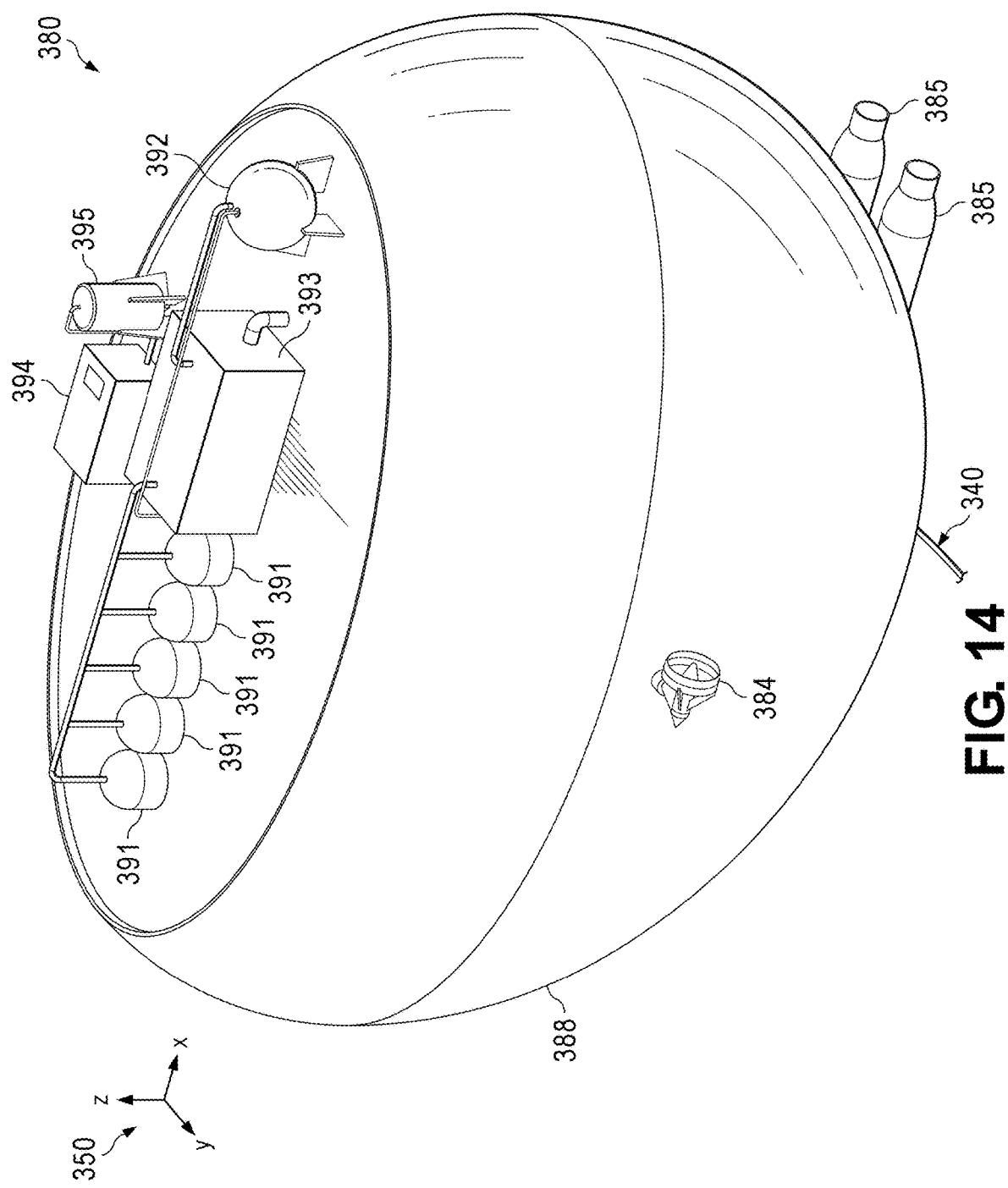
FIG. 14 shows a perspective view of the tanker ship of FIG. 3, in accordance with at least one embodiment.
Figure 15:
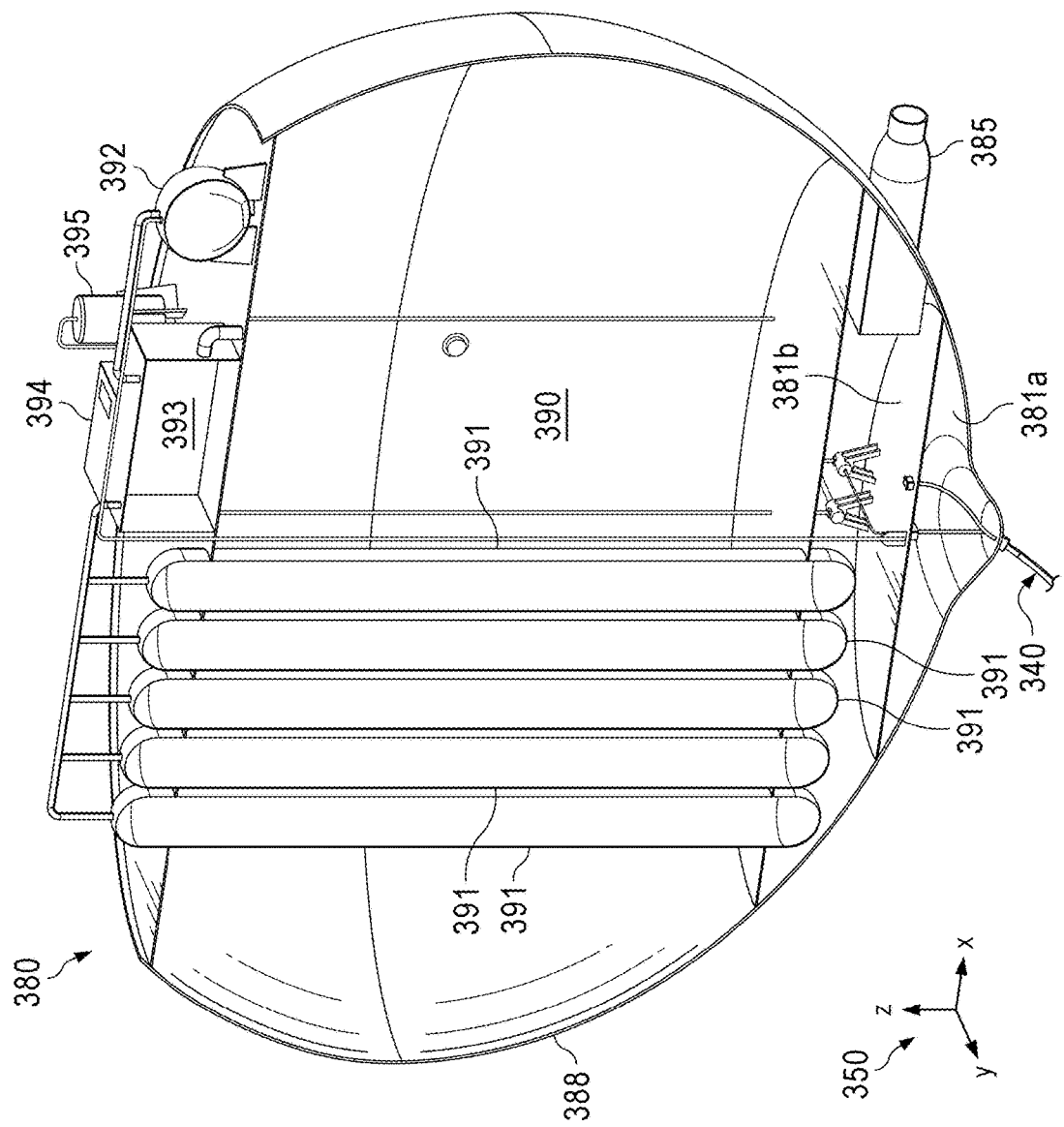
FIG. 15 shows a cross-sectional perspective view of the tanker ship of FIG. 3, in accordance with at least one embodiment.
Figure 16:
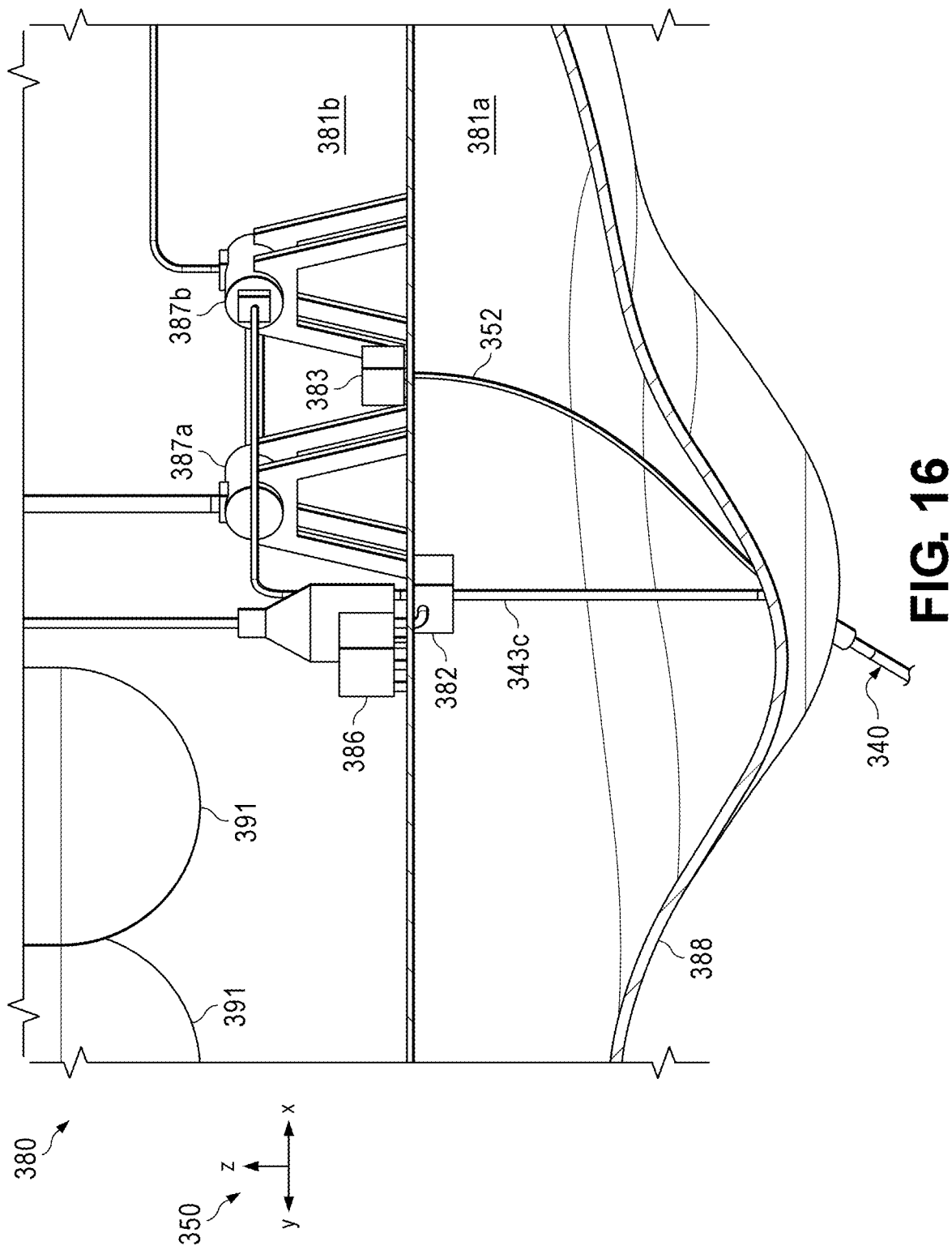
FIG. 16 shows a cross-sectional perspective view of a portion of the tanker ship of FIG. 3, in accordance with at least one embodiment.

Referring now to FIGS. 3-16, various views of a wave engine 301, a tanker ship 380, and individual components of each are depicted. A side view of the wave engine 301 positioned to receive a conduit 340 from the tanker ship 380, the conduit 340 operable to transiently fluidly couple to the wave engine 301, is shown in FIG. 3. An inset view of a dashed box 399*a* of FIG. 3 is shown in FIG. 4, the inset view of FIG. 4 magnifying aspects of the wave engine 301, a conduit assembly 341 operable transiently fluidly couple the conduit 340 to the wave engine 301, an intermediate lifting assembly 349 operable to support suspension of the conduit 340 within a surrounding environment, and an intermediate pump assembly 360 operable to supply pressurized water to each of the conduit assembly 341 and the intermediate lifting assembly 349. A cross-sectional side view of the wave engine 301 and the conduit assembly 341 is shown in FIG. 5. An inset view of a dashed box 399*c* of FIG. 5 is shown in FIG. 6, the inset view of FIG. 6 magnifying aspects of a receiving port 320*a* of the wave engine 301. An inset view of a dashed box 399*d* of FIG. 6 is shown in FIG. 7, the inset view of FIG. 7 magnifying aspects of the conduit assembly 341. A partially transparent perspective view and a cross-sectional perspective view of a coupling structure 322*a* of the wave engine 301 engaged with the conduit assembly 341 are shown in FIGS. 8 and 9, respectively, the coupling structure 322*a* being depicted in partial transparency in FIG. 8 so as to illustrate aspects of the engagement of the conduit assembly 341. A cross-sectional perspective view of the intermediate lifting assembly 349 is shown in FIG. 10. A cross-sectional side view and a perspective view of the intermediate pump assembly 360 are shown in FIGS. 11 and 12, respectively. An inset view of a dashed box 399*b* of FIG. 3 is shown in FIG. 13, the inset view of FIG. 13 magnifying aspects of the tanker ship 380. A perspective view and a cross-sectional perspective view of the tanker ship 380 are shown in FIGS. 14 and 15, respectively. A cross-sectional perspective view of a portion of the tanker ship 380 illustrating aspects of fluid transport within the tanker ship 380 is shown in FIG. 16. The various cross-sectional views of FIGS. 5-7, 9-11, 15, and 16 are each taken parallel to a plane of the side view of FIG. 3. Hereinbelow, description of FIGS. 3-16 is concatenated and each of FIGS. 3-16 may be referred to interchangeably where relevant. For example, reference may be made to one or more specific figures when one or more of FIGS. 3-16 illustrate a given component or aspect of the wave engine 301 or the tanker ship 380 with at least some particularity. Moreover, one or more components of the tanker ship 380, such as the conduit 340, the conduit assembly 341, the intermediate lifting assembly 349, and/or the intermediate pump assembly 360, may not be depicted within an exterior or external housing 388 of the tanker ship 380, but are nevertheless considered as component(s) of the tanker ship 380 in certain embodiments.

In some embodiments, the wave engine 301 and the tanker ship 380 may be positioned in a wave energy harvesting system, such as the wave energy harvesting system 100 described in detail above with reference to FIG. 1. As such, in one example, the wave engine 301 may replace the first free-floating body 101 of the wave energy harvesting system 100 of FIG. 1 and the tanker ship 380 may replace the second free-floating body 180 of the wave energy harvesting system 100. Moreover, in such an example, the wave engine 301 and the tanker ship 380 may be respectively assembled and configured similarly to the first and second free-floating bodies 101, 180 of FIG. 1 and may respectively operate in a substantially similar manner in practice. Additionally, or alternatively, the wave engine 301 may be assembled and configured similarly to the wave engine 201 of FIG. 2 and may operate in a substantially similar manner in practice. Accordingly, excepting minor configurational differences, the description of the first free-floating body 101 provided above with reference to FIG. 1 and/or the description of the wave engine 201 provided above with reference to FIG. 2 may be additionally applied to the wave engine 301 depicted in FIGS. 3-16 in some embodiments and the description of the description of the second free-floating body 180 provided above with reference to FIG. 1 may be additionally applied to the tanker ship 380 depicted in FIGS. 3-16 in such embodiments. In certain embodiments, additional components and/or functionalities may be included in the wave engine 301 and/or the tanker ship 380 which were not described in detail above with reference to FIGS. 1 and 2 and which may additionally be applied to the first and/or second free-floating bodies 180 depicted in FIG. 1 or the wave engine 201 depicted in FIG. 2. Similarly, additional components and/or functionalities which are described in detail with reference to a subset of the embodiments depicted in FIGS. 3-16 may be additionally applied to remaining embodiments depicted in FIGS. 3-16.

To indicate suitability for substitution in certain non-limiting embodiments, similar reference indicators have been applied to elements which may be interchangeable with one another. For example, elements depicted in FIGS. 3-16 may be labeled with the same numbers for the "tens" and "ones" positions as those elements in FIGS. 1 and 2 which may be interchangeable in such examples, but may utilize a "3" in the "hundreds" position instead of a "1" or a "2" (e.g., the external housing 302 of the wave engine 301 of FIGS. 3-16 and the external housing 102 of the first free-floating body 101 of FIG. 1 may be interchangeable in certain non-limiting embodiments). As such, in certain embodiments, description of any such interchangeable elements described hereinabove may substitute or supplement description provided below with reference to FIGS. 3-16. In other examples, such alphabetical indicators may indicate a relationship between two elements which are nonequivalent in some configurational aspect (e.g., size, relative positioning, orientation, etc.) but substantially alike otherwise (e.g., "342a," "342b," "342c," and "342d," as described hereinbelow).

A set of Cartesian coordinate axes 350 is shown in FIGS. 3-16 for contextualizing positions of the various components of the wave engine 301 and the tanker ship 380 and for comparing between the various views of FIGS. 3-16. Specifically, x-, y-, and z-axes are provided which are mutually perpendicular to one another, where the x- and z-axes are parallel to a plane of each of the side, inset, and cross-sectional side views of FIGS. 3-7, 11, and 13 and the y-axis is perpendicular thereto (a plane of the cross-sectional perspective view of FIG. 16 is parallel to the z-axis but not parallel to the x-axis and thus a positive direction of each of the x- and y-axes project out of the plane of the cross-sectional perspective view FIG. 16 at nonzero angle). In some embodiments, a direction of gravity may be parallel to and coincident with a negative direction of the z-axis.

In some embodiments, the wave engine 301 may be configured to permit water to pass therethrough, e.g., induced by water wave motion within the body of water, so as to power one or more turbines (not shown at FIGS. 3-16) positioned within the external housing 302. In an example embodiment, water may enter the external housing 302 via a lower aperture 303 and ultimately exit the external housing 302 via one or more upper apertures (not shown at FIGS. 3-16). As such, the lower aperture 303 may be fluidly coupled to the one or more upper apertures, e.g., via a series of fluidly coupled passages, reservoirs, and other chambers having the one or more turbines positioned therein. In an example embodiment, water may continuously pass (e.g., absent transient stoppages to a flow thereof) through the wave engine 301 during operation thereof.

For example, water entering the lower aperture 303 may subsequently pass through an internal passage 334 and into an internal reservoir 336, the internal passage 334 being fluidly coupled to each of the lower aperture 303 and the internal reservoir 336. As shown in FIG. 5, the internal reservoir 336 may be enclosed or otherwise housed within the external housing 302. In an example embodiment, the internal reservoir 336 may be configured to maintain buoyancy of the external housing 302 (and thereby the wave engine 301) relative to a surface of the body of water, e.g., by capturing and storing gas from an ambient environment, from an external gas supply, and/or as a product from an energy conversion process. In some embodiments, water within the internal reservoir 336 may be directed to one or more turbine assemblies (not shown at FIGS. 3-16) fluidly coupled to the internal reservoir 336. In such embodiments, each of the one or more turbine assemblies may include an exit passage fluidly coupled to a corresponding one of the one or more upper apertures through which the water within the internal reservoir 336 may flow so as to power a turbine housed within the exit passage and then be released from within the external housing 302 via the corresponding one of the one or more upper apertures.

In some embodiments, the energy conversion process may be an electrolysis reaction which converts an electrolysis reactant, such as deionized water, to an electrolysis product, such as hydrogen gas. In certain embodiments, one or more storage tanks, such as a storage tank 335a may be enclosed or otherwise housed within the external housing 302. The storage tank 335a may store at least a portion of the electrolysis reactant and at least a portion of the electrolysis product. In certain embodiments, the electrolysis reactant and the electrolysis product may remain separated within the storage tank 335a based on physicochemical properties of each of the electrolysis reactant and the electrolysis product. For example, the electrolysis reactant may be a liquid (e.g., deionized water) and the electrolysis product may be a gas (e.g., hydrogen gas), the electrolysis reactant being separated from the electrolysis product by a gas-liquid interface.

In such embodiments, a first receiving passage 333a and a second receiving passage 333b may reversibly fluidly couple the storage tank 335a to a surrounding environment [e.g., via one or more valves (not shown at FIGS. 3-16) of the receiving port 320a fluidly coupling the storage tank 335a to the surrounding environment when configured in an open configuration and severing the fluid coupling when configured in a closed configuration]. In certain embodiments, and as shown in FIG. 6, the first receiving passage 333a may fluidly couple to a lower portion of the storage tank 335a and the second receiving passage 333b may fluidly couple to an upper portion of the storage tank 335a. In an example embodiment, the first and second receiving passages 333a, 333b may coaxially extend from the receiving port 320a to the storage tank 335a, with the second receiving passage 333b surrounding the first receiving passage 333a for a portion of a length of the first receiving passage 333a and the first receiving passage 333a extending beyond an end of the second receiving passage 333b for a remaining portion of the length of the first receiving passage 333a such that the first receiving passage 333a exclusively opens into the lower portion of the storage tank 335a and the second receiving passage 333b exclusively opens into the upper portion of the storage tank 335a. As such, during certain operating modes of the wave engine 301, the first receiving passage 333a may be configured to supply the electrolysis reactant to the storage tank 335a (e.g., so as to replenish the electrolysis reactant for the electrolysis reaction) and the second receiving passage 333b may be configured to siphon the electrolysis product from the storage tank 335a (e.g., so as to remove the electrolysis product for storage).

In some embodiments, when the conduit 340 is fluidly coupled to the storage tank 335a, the conduit 340 may convey the electrolysis reactant from a reactant reservoir 395 of the tanker ship 380 to the storage tank 335a via a first internal fluid passage 343a. In additional or alternative embodiments, when the conduit 340 is fluidly coupled to the storage tank 335a, the conduit 340 may convey the electrolysis product from the storage tank 335a to a product reservoir 392 of the tanker ship 380 via a second internal fluid passage 343b. As described in greater detail hereinbelow, in certain embodiments, the first and second internal fluid passages 343a, 343b may coaxially extend along the conduit 340 at least along a length thereof. In an embodiment, the conduit 340 may comprise any suitable materials that enable a fluidic seal in order to transport fluids (e.g., liquids, gasses, etc.) along a length of the conduit 340. In an embodiment, the first internal fluid passage, the second internal fluid passage, and any other fluid passages, housings, claddings, coatings, etc. may include materials suitable for fluid transmission within a marine environment. In some embodiments, the conduit 340 may comprise metallic materials, such as flexible tubing made from stainless steel, galvanized metals, or plastic coated metals. Conduit 340 materials may also comprise polymeric tubes (e.g., nylon, polyester, polypropylene, etc.) or composite tubes (e.g., carbon fiber, aramid fiber, etc.).

In some embodiments, the conduit assembly 341 may be positioned at and coupled to a distal end of the conduit 340, the distal end being opposite to a proximal end of the conduit 340 coupled to an external or exterior housing 388 of the tanker ship 380. In an example embodiment, the conduit assembly 341 may include a plurality of fluid nozzles 342a, 342b, 342c, the plurality of fluid nozzles 342a, 342b, 342c annularly distributed on the conduit assembly 341 and configured to respectively expel a plurality of fluid streams which propels the conduit assembly 341 through the surrounding environment so as to remotely direct the conduit assembly 341 to the receiving port 320a. In certain embodiments, and as shown at FIGS. 7 and 8, the plurality of fluid nozzles 342a, 342b, 342c may include a plurality of side fluid nozzles 342a configured to direct fluid streams perpendicular to fluid flow along the first and second internal fluid passages 343a, 343b within the conduit assembly 341, a plurality of rear fluid nozzles 342b configured to direct fluid streams parallel to the fluid flow along the first and second internal fluid passages 343a, 343b within the conduit assembly 341, and a plurality of front fluid nozzles 342c configured to direct fluid streams parallel to the fluid flow along the first and second internal fluid passages 343a, 343b within the conduit assembly 341 and opposite to a flow direction of the fluid streams directed by the plurality of rear fluid nozzles 342b.

In some embodiments, the plurality of fluid nozzles 342a, 342b, 342c may be fluidly coupled to a third internal fluid passage 343c which may coaxially extend with the first and second internal passages 343a, 343b at least along a length of the conduit 340. In an example embodiment, and as described in greater detail hereinbelow, the third internal fluid passage 343c may supply a fluid to the plurality of fluid nozzles 342a, 342b, 342c to feed the plurality of fluid streams. For instance, since the surrounding environment may include a body of water on which the wave engine 301 and the tanker ship 380 float, the fluid may be water and the plurality of fluid nozzles 342a, 342b, 342c may be configured as a plurality of water jet nozzles 342a, 342b, 342c. In additional or alternative embodiments, a plurality of side fluid nozzles 342d of the intermediate lifting assembly 349 may be fluidly coupled to the third internal fluid passage 343c so as to expel a plurality of auxiliary fluid streams. In an example embodiment, the plurality of side fluid nozzles 342d may be assembled and configured similarly to the plurality of side fluid nozzles 342a and may operate in a substantially similar manner in practice.

In some embodiments, the plurality of fluid streams may be selectively expelled from the plurality of fluid nozzles 342a, 342b, 342c so as to direct the conduit assembly 341 to a predetermined location with a relatively high degree of precision. In an example embodiment, a position of the conduit assembly 341 in three-dimensional space may be adjusted via corresponding adjustments to one or more of a thrust of at least one fluid stream of the plurality of fluid streams, a timing of the at least one fluid stream, a duration of the at least one fluid stream, or an angle of the at least one fluid stream. For instance, when the conduit assembly 341 is commanded (e.g., according to a request received from a remote land-based controller) to move from a first position to a second position, a sequence of instructions may be executed by a controller of the tanker ship 380 (e.g., a pump controller 383) to ensure that each of one or more of the plurality of fluid nozzles 342a, 342b, 342c is operated at predetermined start and end times with a predetermined thrust profile (which may be, e.g., substantially static or continually changing). In certain examples, all of the plurality of fluid nozzles 342a, 342b, 342c may be actuated so as to move the conduit assembly 341 from the first position to the second position. In other examples, only a subset of the plurality of fluid nozzles 342a, 342b, 342c may be actuated so as to move the conduit assembly 341 from the first position to the second position (e.g., in certain non-limiting examples wherein the conduit assembly 341 is commanded to move in a given direction, a subset of fluid nozzles 342a, 342b, 342c operable to expel fluid stream(s) towards the given direction may not be actuated).

In an example embodiment, the conduit assembly 341 may be directed, via one or more fluid streams being expelled from the plurality of fluid nozzles 342a, 342b, 342c from the first position, which may be within the surrounding environment, to the second position, which may be within the coupling structure 322a, e.g., within the receiving port 320a. Specifically, in such an embodiment, the conduit assembly 341 may be guided from a position at or near the tanker ship 380 towards the receiving port 320a of the coupling structure 322a, e.g., when the wave engine 301 is floating on the body of water at a distance from the tanker ship 380 less than the length of the conduit 340.

In some embodiments, the coupling structure 322a may be configured as an at least partially hollowed cone or frustum, with a (largest) base being open so as to receive the conduit assembly 341. In an example embodiment, and as shown in FIG. 6, the receiving port 320a may be configured as a hollowed-out portion within the coupling structure 322a. In such an embodiment, at least one end of the receiving port 320a may be fit so as to flushly receive the conduit assembly 341 (e.g., the receiving port 320a may be clearance fit to the conduit assembly 341).

In some embodiments, one or more guidance lights, such as one or more first guidance lights 339a and/or one or more second guidance lights 339b, may be annularly distributed on the receiving port 320a (e.g., within the coupling structure 322a). In some embodiments, one or more guidance lights, may be positioned upon the conduit 340 and/or upon the conduit assembly 341. Specifically, and as shown at FIG. 6, the one or more second guidance lights 339b may be positioned closer to a receiving opening of the receiving port 320a than the one or more first guidance lights 339a (e.g., the one or more second guidance lights 339b may be positioned closer to the base of the partially hollowed cone of the coupling structure 322a than the one or more first guidance lights 339a). In an example embodiment, the one or more first guidance lights 339a and the one or more second guidance lights 339b may be independently actuatable or actuatable in subsets so as to enhance visibility of the receiving port 320a, e.g., to one or more cameras 345 of the conduit assembly 341 (see FIG. 8). In some embodiments equipped with guidance lights, the respective guidance lights are illuminated continuously during a coupling operation. In some embodiments equipped with guidance lights, the respective guidance lights are illuminated in a manner, pattern, and/or sequence, that facilitates a manual or automated coupling of the respective conduit assembly and receiving port. In such an embodiment, each of the one or more cameras may be a visual or optical camera configured to receive images (optionally illuminated by the one or more first guidance lights 339a and/or the one or more second guidance lights 339b) from which a current position of the receiving port 320a may be determined. In additional or alternative embodiments, and as shown in FIG. 8, the conduit assembly 341 may include one or more hydrophones 346 configured to emit and receive audio signals from which the current position of the receiving port 320a may be determined.

In some embodiments, the coupling structure 322a may include one or more first coupling elements annularly distributed on the receiving port 320a (e.g., within the coupling structure 322a). Correspondingly, in such embodiments, one or more second coupling elements may be annularly distributed on the conduit assembly 341, the one or more second coupling elements configured to be reversibly mated to the one or more first coupling elements, respectively. As an example, and as shown in FIG. 9, the one or more first coupling elements may include a first mechanical latching element 337 and the one or more second coupling elements may include a second mechanical latching element 347, the second mechanical latching element 347 reversibly mateable to the first mechanical latching element 337 via a mechanical latching mechanism (e.g., the first mechanical latching element 337 may include a protrusion which is transition fit to a recess of the second mechanical latching element 347). As an additional or alternative example, the conduit assembly 341 may include one or more electromagnets 348, each of the one or more electromagnets 348 actuatable to reversibly couple to the receiving port 320a via magnetic attraction. In one such example, the one or more second coupling elements may include the one or more electromagnets 348 and the one or more first coupling elements may include one or more receptors (e.g., one or more ferromagnetic surfaces, one or more additional electromagnets, etc.; not shown at FIGS. 3-16) for respectively magnetically coupling to the one or more electromagnets 348. In another such example, the coupling structure 322a may be a receptor itself, e.g., formed from a ferromagnetic material. In certain embodiments, each of the one or more electromagnets 348 may be independently actuatable via command(s) received from the controller of the tanker ship 380.

In some embodiments, and as shown in FIG. 9, the first and second internal fluid passages 343a, 343b may be respectively fluidly coupled to the first and second receiving passages 333a, 333b via mating of the one or more second coupling elements to the one or more first coupling elements, e.g., upon mechanical coupling of the conduit assembly 341 to the receiving port 320a. In certain embodiments, ends of the first and second internal fluid passages 343a, 343b may respectively include first and second O-ring seals 344a, 344b (see FIGS. 7 and 9) to prevent fluid leaks at interfaces with the receiving port 320a upon mechanical coupling thereto.

In some embodiments, and as shown in FIGS. 3-9, the receiving port 320a may be recessed within the coupling structure 322a such that the coupling structure 322a is configured to receive the conduit assembly 341 therein. In other embodiments, a receiving protrusion may be positioned on the external housing 302, the receiving port 320a positioned at a distal end of the receiving protrusion, and the conduit assembly 341 may include a recess (not shown at FIGS. 3-16) configured to receive the receiving protrusion therein. In such embodiments, the receiving port 320a may be configured as a valve-actuated opening without any surrounding recess when positioned at the distal end of the receiving protrusion.

The above discussion references the coupling structure 322a, which is positioned on an upper portion of the external housing 302 (e.g., above a bisecting plane parallel to a plane formed by the x- and y-axes), so as to be exposed to air when the wave engine 301 is floating on the surface of the body of water. In additional or alternative embodiments, a coupling structure 322b may be positioned on a lower portion of the external housing 302 (e.g., below the bisecting plane parallel to the plane formed by the x- and y-axes), so as to be submerged within the body of water when the wave engine 301 is floating on the surface of the body of water. The coupling structures 322a, 322b may be configured in a substantially similar manner to one another (e.g., the coupling structures 322a, 322b may include respective receiving ports 320a, 320b respectively fluidly coupled to storage tanks 335a, 335b), excepting, in some examples, one or more modifications or differences arising from relative positioning on the external housing 302. As an example, the plurality of fluid streams may be expelled from the plurality of fluid nozzles 342a, 342b, 342c with greater thrust when the conduit assembly 341 is being directed to a coupling structure above the surface of the body of water (e.g., the coupling structure 322a) than when the conduit assembly 341 is being directed to a coupling structure below the surface of the body of water (e.g., the coupling structure 322b). As another example, a greater number of guidance lights (e.g., the first and second guidance lights 339a, 339b) may be provided at the coupling structure 322b than at the coupling structure 322a. Other modification may be made in certain embodiments, e.g., based on less biofouling occurring at the conduit assembly 322a than at the conduit assembly 322b, less ice accumulation occurring at the conduit assembly 322b than at the conduit assembly 322a, etc.

In some embodiments, the tanker ship 380 may include the intermediate lifting assembly 349 interposed along the conduit 340 between the proximal end of the conduit 340 and the distal end of the conduit 340. In an example embodiment, the intermediate lifting assembly 349 may be configured to expel one or more auxiliary fluid streams, e.g., via a corresponding one or more of the plurality of side fluid nozzles 342d, to support suspension of the conduit 340 within the surrounding environment. In such an embodiment, fewer fluid streams and/or fluid streams having less thrust may be expelled from the conduit assembly 341 when the conduit 340 is at least partially suspended in the surrounding environment via the intermediate lifting assembly 349.

In some embodiments, the tanker ship 380 may include the intermediate pump assembly 360 interposed along the conduit 340 between the proximal end of the conduit 340 and the distal end of the conduit 340. In certain embodiments, and as shown in FIG. 11, the intermediate pump assembly 360 may include a lower aperture 362 and an internal reservoir 361 fluidly coupled to the surrounding environment via the lower aperture 362. In an example embodiment, water may enter the lower aperture 362 may subsequently pass into the internal reservoir 361. As shown in FIG. 11, the internal reservoir 361 may be enclosed or otherwise housed within an external or exterior housing 368 of the intermediate pump assembly 360. In some embodiments, the internal reservoir 361 may be configured to maintain buoyancy of the external housing 368 (and thereby the intermediate pump assembly 360) within the body of water, e.g., by capturing and storing gas from an ambient environment and/or an external gas supply.

In some embodiments, and as shown in FIG. 11, the intermediate pump assembly 360 may include a fluid pump 367 configured to induce fluid (e.g., water) along the conduit 340, the fluid to be expelled as the various fluid streams described hereinabove (e.g., via the various fluid nozzles 342a, 342b, 342c, 342d). In an example embodiment, at least some of the water entering the lower aperture 362 may subsequently pass through the fluid pump 367 (e.g., via a first pump passage 363a fluidly coupling the fluid pump 367 to the lower aperture 362) and into the third internal fluid passage 343c (e.g., via a second pump passage 363b fluidly coupling the third internal fluid passage 343c to the fluid pump 367). In some embodiments, the fluid pump 367 may be conductively coupled to one or more components within the external housing 388 of the tanker ship 380 (e.g., one or more power supplies, one or more controllers such as the pump controller 383, etc.) via an electrical line 352 (connection of the electrical line 352 to the fluid pump 367 not shown at FIGS. 3-16). In such embodiments, the electrical line 352 may power the fluid pump 367 and/or transmit data (e.g., a command to actuate the fluid pump 367) to the fluid pump 367. In some embodiments, though not shown at FIGS. 3-16, the electrical line 352 may extend along the length of the conduit 340, e.g., so as to be conductively coupled to one or more additional components, such as the various fluid nozzles 342a, 342b, 342c, 342d, the one or more electromagnets 348, the one or more cameras 345, the one or more hydrophones 346, etc., such that the one or more additional components may be powered and/or receive commands or other data.

In some embodiments, and as shown in FIGS. 11 and 12, the intermediate pump assembly 360 may include one or more propulsors configured to support suspension and/or propulsion of the intermediate pump assembly 360 within the surrounding environment. In an example embodiment, the one or more propulsors may include one or more outboard propellers 364 (e.g., propellers positioned external to the external housing 368) configured to propel one or more first local flows of water within the body of water. For instance, and as shown in FIG. 12, the one or more outboard propellers 364 may be configured as a pair of outboard propellers 364 positioned on opposite sides of the external housing 368. In an additional or alternative embodiment, the one or more propulsors may include one or more fluid jet nozzles 365 configured to propel one or more (relatively highly pressurized) second local flows of water within the body of water. In certain embodiments, the one or more fluid jet nozzles 365 may be configured as a single fluid jet nozzle 365 fluidly coupled to the lower aperture 362 via an auxiliary fluid passage 363c so as to receive at least a portion of the water entering into the external housing 368 via the lower aperture 362. In some embodiments, though not shown at FIGS. 3-16, the electrical line 352 may be conductively coupled to the one or more propulsors, such that the electrical line 352 may provide power to the one or more propulsors and/or transmit data (e.g., commands to actuate and operate the one or more propulsors) to the one or more propulsors. In additional or alternative embodiments, the intermediate pump assembly 360 may include one or more fins or rudders 366 configured to stabilize the intermediate pump assembly 360 during suspension and/or propulsion thereof. For instance, and as shown in FIG. 12, the one or more fins or rudders 366 may be configured as four fins 366 protruding from and annularly distributed on the external housing 368.

In some embodiments, the external housing 388 may enclose or otherwise house one or more components configured for fluid exchange and/or such component(s) may be positioned external to the external housing 388 and secured thereto, each component of the one or more components fluidly coupled to each other component of the one or more components. In an example embodiment, and as shown in FIGS. 13-16, the conduit 340 may extend within the external housing 388 through a first compartment 381a to a breakout enclosure 382 in a second compartment 382b, whereby the fluids conveyed by the conduit 340 may be variously directed therefrom and thereto. For example, the electrolysis product may enter the breakout enclosure 382 via the second internal fluid passage 343b of the conduit 340, and the breakout enclosure 382 may direct the electrolysis product to a compressor/pump assembly 386. The compressor/pump assembly 386 may pump the electrolysis product to the product reservoir 392 for storage. From the product reservoir 392, the electrolysis product, which may be a methanol precursor such as hydrogen gas, may be flowed to a reactor 393 to be combined with an additional methanol precursor, such as carbon dioxide, delivered to the reactor 393 from a plurality of precursor storage tanks 391. Methanol generated by the reactor 393 by combining the electrolysis product with the additional methanol precursor may be flowed into an internal reservoir 390 for storage. The second compartment 381b may include a first fluid pump 387a fluidly coupled to the surrounding environment and configured to pump water from the body of water to a distillation unit 394. The distillation unit 394 may be configured to distill the water pumped from the first fluid pump 387a to produce distilled and deionized water for use as the electrolysis reactant. The electrolysis reactant (e.g., the distilled and deionized water) may be transferred to the reactant reservoir 395 for storage. From the reactant reservoir 395, the electrolysis reactant may be pumped to the breakout enclosure 382 via a second fluid pump 387b. The breakout enclosure 382 may direct the electrolysis reactant to the first internal fluid passage 343a to be conveyed to the wave engine 301 via the conduit 340. In some embodiments, the pump controller 383, which may be housed within the second compartment 381b, may execute instructions to actuate and operate one or more of the fluid pump 367, the compressor/pump assembly 386, the first fluid pump 387a, or the second fluid pump 387b.

In some embodiments, and as shown in FIGS. 13-15, the tanker ship 380 may include one or more propulsors configured to support suspension and/or propulsion of the tanker ship 380 within the surrounding environment. In an example embodiment, the one or more propulsors may include one or more outboard propellers 384 (e.g., propellers positioned external to the external housing 388) configured to propel one or more first local flows of water within the body of water. For instance, the one or more outboard propellers 384 may be configured as a pair of outboard propellers 384 positioned on opposite sides of the external housing 388. In an additional or alternative embodiment, the one or more propulsors may include one or more fluid jet nozzles 385 configured to propel one or more (relatively highly pressurized) second local flows of water within the body of water. In certain embodiments, the one or more fluid jet nozzles 385 may be configured as a pair of fluid jet nozzles 385 configured to receive water from the surrounding environment (e.g., via the first fluid pump 387a; fluidic coupling not shown at FIGS. 3-16).

In some embodiments, and as shown in FIG. 16, the electrical line 352 may extend from the conduit 340 and into the external housing 388, whereby the electrical line 352 may be conductively coupled to the pump controller 383. Though not shown at FIGS. 3-16, in some embodiments, additional electrical lines may be conductively coupled to the pump controller 383 and to various other components of the tanker ship 380 configured to operate under electrical power received from the additional electrical lines and/or receive data transmitted via the additional electrical lines, such as one or more of the one or more outboard propellers 384, the one or more fluid jet nozzles 385, the compressor/pump assembly 386, the first fluid pump 387a, the second fluid pump 387b, or the reactor 393.

Figure 17:
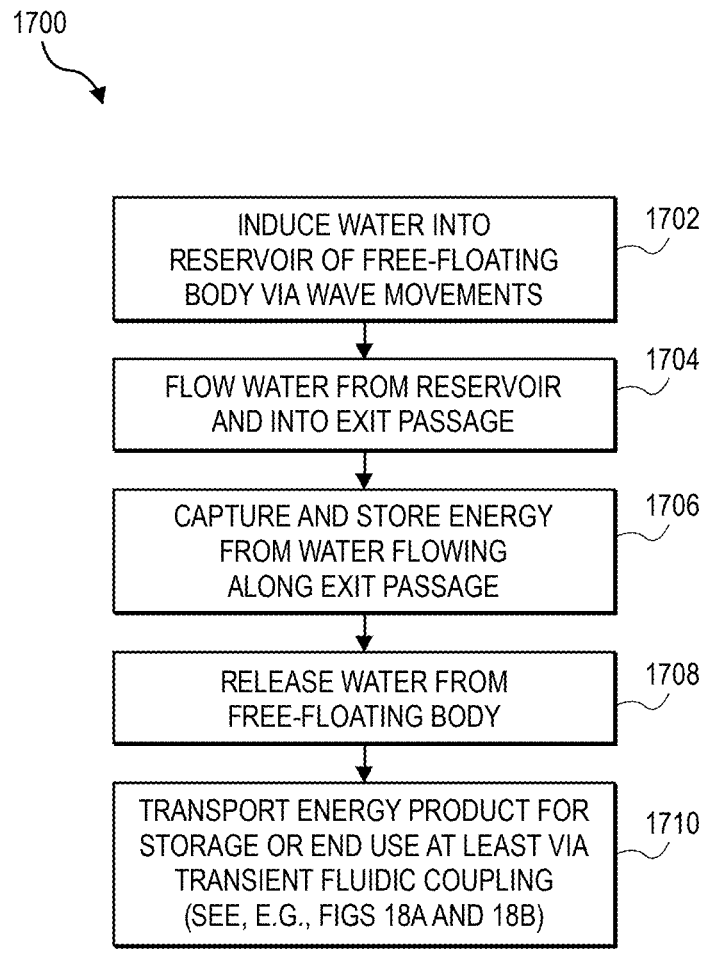
FIG. 17 shows a block diagram of a method for utilizing a free-floating body to capture energy from wave movements in a body of water, in accordance with at least one embodiment.

Referring now to FIG. 17, a block diagram of a method 1700 for utilizing a free-floating body, such as any of the wave engines variously described in detail above with reference to FIGS. 1-16, to capture energy from wave movements in a body of water is shown. In an example embodiment, water may pass through the free-floating body, induced and pressurized, at least in part, by the wave movements, exiting via one or more apertures in the free-floating body. In some embodiments, the water exiting the free-floating body may drive conversion of an energy product precursor into an energy product via the captured energy. In additional or alternative embodiments, and as described in greater detail below with reference to FIGS. 18A and 18B, the energy product may be siphoned off from the free-floating body and replaced with the energy product precursor via a conduit transiently fluidly coupling the free-floating body to another free-floating body.

In some embodiments, the method 1700, or a portion thereof, may be implemented as executable instructions stored in non-transitory memory of a computing device, such as a controller communicably coupled to one or more actuators of the free-floating body. However, embodiments of methods for utilizing free-floating bodies to capture energy from water wave movements are not limited to the below description of the method 1700. For instance, in certain embodiments, additional or alternative sequences of steps may be implemented, e.g., as executable instructions on such a computing device, where individual steps discussed with reference to the method 1700 may be added, removed, substituted, modified, or interchanged.

At block 1702, the method 1700 may include inducing water into a reservoir of the free-floating body via water wave movements. Specifically, a first aperture may permit oscillatory water wave movements to induce water into a fluid passage housed within the free-floating body and fluidly coupled to the reservoir, such that the reservoir may receive the induced water.

At block 1704, the method 1700 may include flowing the water from the reservoir into an exit passage of the free-floating body. Specifically, the exit passage may fluidly couple the reservoir to a second aperture of the free-floating body.

At block 1706, the method 1700 may include capturing and storing energy from the water flowing along the exit passage. Specifically, as the water flows through the exit passage and toward the second aperture, the flowing water may drive an energy conversion process, e.g., by powering a generator included in the free-floating body via rotation of an inboard turbine, to harness the energy of the water wave movements to convert the energy product precursor into the energy product.

At block 1708, the method 1700 may include releasing the water from the free-floating body. Specifically, as the water passes through the exit passage, the water may be pressurized, e.g., via a shape of the exit passage and/or by gas pressure of a captured gas enclosed within the free-floating body, so as to force the water through the second aperture.

At block 1710, the method 1700 may include transporting the energy product for storage or end use at least via a transient fluidic coupling of the free-floating body to another free-floating body. Specifically, a supply chain may be established in which a transport or chain of transports (e.g., one or more tanker ships, land-based vehicles, etc.) may transport the energy product for storage in a watercraft or land-based storage facility or to an end user for consumption. As an example of at least one step along the supply chain, and as described in detail below with reference to FIGS. 18A and 18B, the transient fluidic coupling may be established so as to exchange the energy product with the energy product precursor.

Figure 18A:
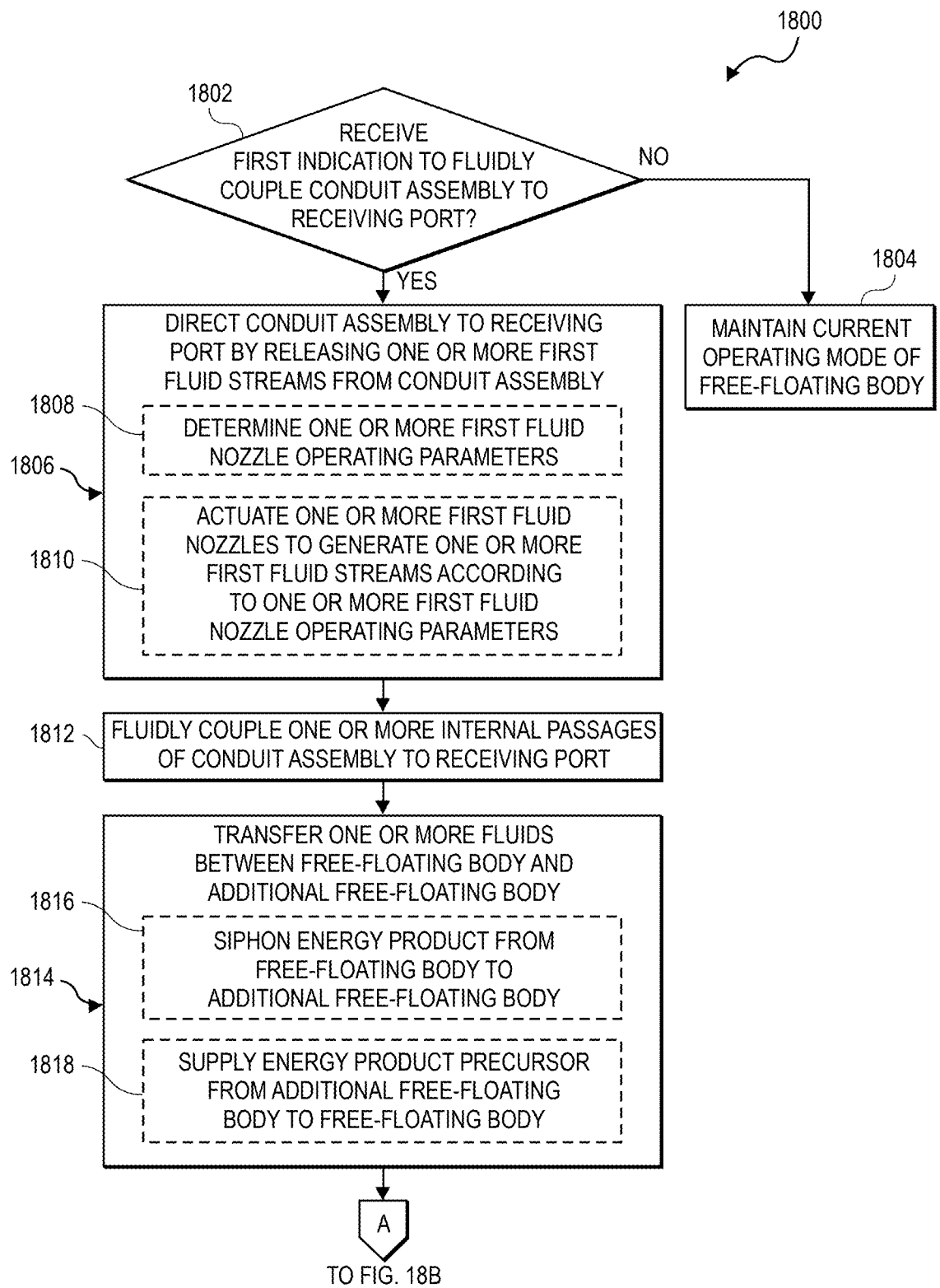
FIGS. 18A and 18B show block diagrams of a method for transiently fluidly coupling a pair of free-floating bodies floating on a surface of a body of water, in accordance with at least one embodiment.
Figure 18B:
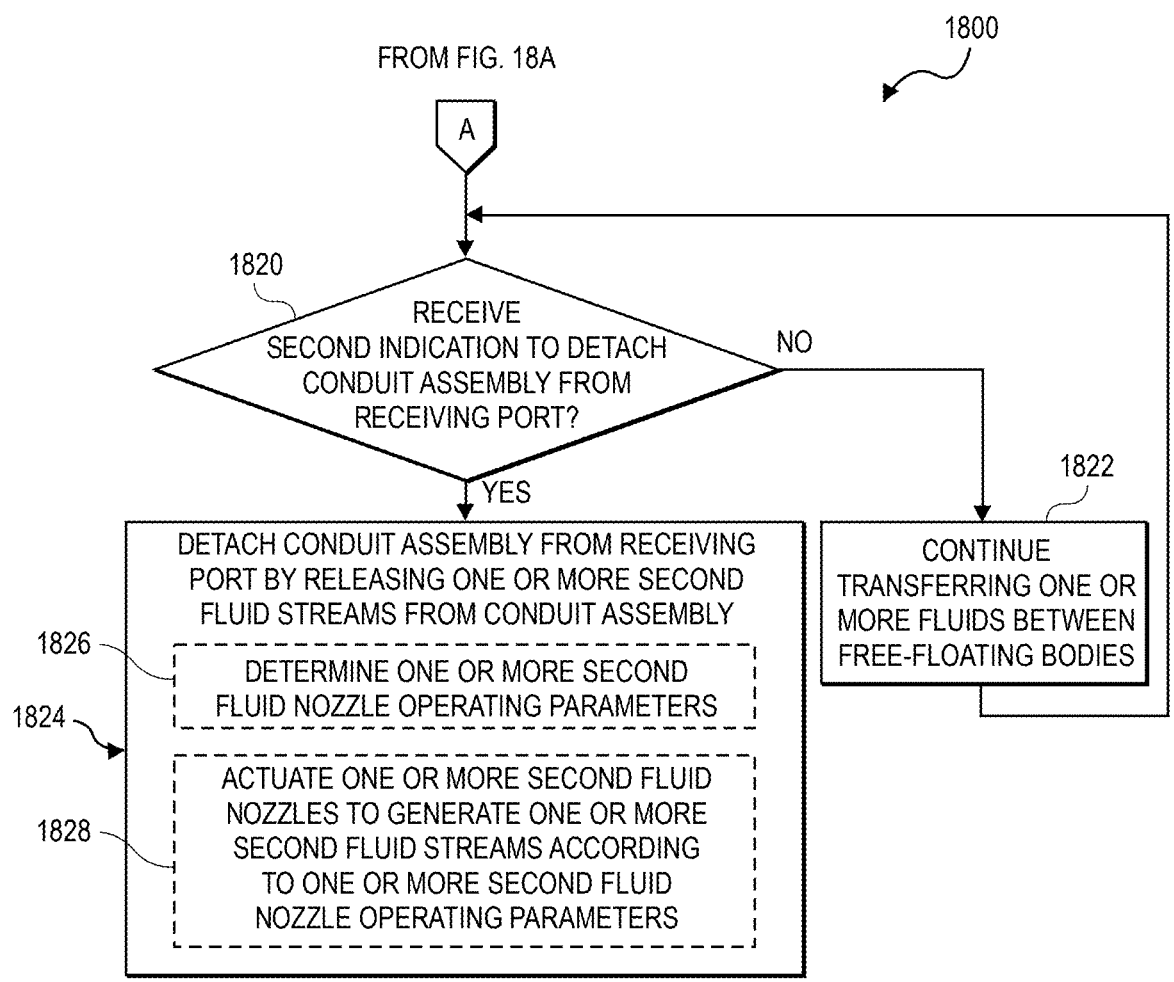

Referring now to FIGS. 18A and 18B, a block diagram of a method 1800 for transiently fluidly coupling a pair of free-floating bodies, such as any pair of the free-floating bodies, wave engines, and/or tanker ships various described in detail above with reference to FIGS. 1-16, floating on a surface of a body of water is shown. In an example embodiment, the free-floating body may be transiently fluidly coupled to an additional free-floating body via a conduit of the additional free-floating body. In such an embodiment, a conduit assembly may be positioned at an end of the conduit, the conduit assembly operable to direct the end of the conduit to a receiving port of the free-floating body. In one embodiment, the method 1800 is performed as part of the method 1700 of FIG. 17, such as at the block 1710.

In some embodiments, the method 1800, or a portion thereof, may be implemented as executable instructions stored in non-transitory memory of a computing device, such as a controller communicably coupled to one or more actuators of the free-floating body. However, embodiments of methods for transiently fluidly coupling free-floating bodies are not limited to the below description of the method 1800. For instance, in certain embodiments, additional or alternative sequences of steps may be implemented, e.g., as executable instructions on such a computing device, where individual steps discussed with reference to the method 1800 may be added, removed, substituted, modified, or interchanged. As an example, blocks 1808 and 1810 are represented in dashing to indicate that alternative implementations of block 1806 (of which the blocks 1808 and 1810 are subblocks indicating a non-limiting embodiment of the block 1806) are possible in some embodiments. As another example, blocks 1816 and 1818 are represented in dashing to indicate that alternative implementations of block 1814 (of which the blocks 1816 and 1818 are subblocks indicating a non-limiting embodiment of the block 1814) are possible in some embodiments. As yet another example, blocks 1826 and 1828 are represented in dashing to indicate that alternative implementations of block 1824 (of which the blocks 1826 and 1828 are subblocks indicating a non-limiting embodiment of the block 1814) are possible in some embodiments.

Referring now to FIG. 18A, at block 1802, the method 1800 may include determining whether a first indication to fluidly couple the conduit assembly to the receiving port has been received. As an example, the first indication may be received responsive to determining that an amount of an energy product stored in the free-floating body is greater than or equal to a first threshold amount. As another example, the first indication may be received responsive to determining that an amount of an energy product precursor stored in the free-floating body is less than or equal to a second threshold amount. In certain embodiments, the first indication may be received from a remote land-based controller.

If the first indication to fluidly couple the conduit assembly to the receiving port has not been received, the method 1800 may proceed to block 1804, where the method 1800 may include maintaining a current operating mode of the free-floating body. In such an example, the transient fluidic coupling may not be established.

If the first indication to fluidly couple the conduit assembly to the receiving port has been received, the method 1800 may proceed to the block 1806, where the method 1800 may include directing the conduit assembly to the receiving port by releasing one or more fluid streams from the conduit assembly. In an example embodiment, at the block 1808, one or more first fluid nozzle operating parameters may be determined. For example, the one or more first fluid nozzle operating parameters may include one or more continuously adjustable parameters such as a power of a fluid being pumped through one or more first fluid nozzles of the conduit assembly, a valve opening of the one or more first fluid nozzles, and/or a port angle of the one or more first fluid nozzles. At the block 1810, the one or more first fluid nozzles may be actuated so as to generate one or more first fluid streams according to the one or more first fluid nozzle operating parameters. In an example embodiment, the one or more first fluid nozzles may be actuated to induce a first fluid flow in a first direction. For instance, the one or more first fluid nozzles may be selectively operated so as to adjust one or more of a thrust of at least one first fluid stream of the one or more first fluid streams, a timing of the at least one first fluid stream, a duration of each of the at least one first fluid stream, or an angle of the at least one first fluid stream. In one example, adjusting the thrust of the at least one first fluid stream may include, responsive to the at least one first fluid stream being released above the surface of the body of water, adjusting the thrust of the at least one first fluid stream to a first value, and, responsive to the at least one first fluid stream being released below the surface of the body of water, adjusting the thrust of the at least one first fluid stream to a second value less than the first value.

At block 1812, the method 1800 may include fluidly coupling one or more internal passages of the conduit assembly to the receiving port. In some embodiments, the fluidic coupling may be sealed and secured by reversibly mating one or more first coupling elements of the free-floating body to one or more second coupling elements of the additional free-floating body, respectively.

At the block 1814, the method 1800 may include transferring one or more fluids between the free-floating body and the additional free-floating body, e.g., via the one or more internal passages. In an example embodiment, the one or more internal passages may be configured as a composite, coaxial internal passage including a first passage and a second passage coaxial with the first passage. In such an embodiment, a first fluid, such as the energy product, of the one or more fluids may flow through the first passage and a second fluid, such as the energy product precursor, of the one or more fluids may flow through the second passage. For example, at the block 1816, the energy product may be siphoned, via the first passage, from the receiving port of the free-floating body to the additional free-floating body. At the block 1818, the energy product precursor may be supplied, via the second passage, from the additional free-floating body to the receiving port of the free-floating body. In some embodiments, the blocks 1816 and 1818 may be performed substantially simultaneously.

Continuing now to FIG. 18B, at block 1820, the method 1800 may include determining whether a second indication to detach the conduit assembly from the receiving port has been received. As an example, the second indication may be received responsive to determining that the amount of the energy product stored in the free-floating body is less than a third threshold amount, the third threshold amount being less than or equal to the first threshold amount. As another example, the second indication may be received responsive to determining that the amount of the energy product precursor stored in the free-floating body is greater than a fourth threshold amount, the fourth threshold amount being greater than or equal to the second threshold amount. In certain embodiments, the second indication may be received from the remote land-based controller.

If second indication to detach the conduit assembly from the receiving port has not been received, the method 1800 may proceed to block 1822, where the method 1800 may include continuing transfer of the one or more fluids between the free-floating body and the additional free-floating body. In an example embodiment, the method 1800 may continue transferring the one or more fluids between the free-floating body and the additional free-floating body until the second indication is determined to have been received at the block 1820.

If the second indication to detach the conduit assembly from the receiving port has been received, the method 1800 may proceed to the block 1824, where the method 1800 may include detaching the conduit assembly from the receiving port by releasing one or more second fluid streams from the conduit assembly, e.g., such that the internal passage is no longer fluidly coupled to the receiving port. In an example embodiment, at the block 1826, one or more second fluid nozzle operating parameters may be determined. For example, the one or more second fluid nozzle operating parameters may include one or more continuously adjustable parameters such as a power of a fluid being pumped through one or more second fluid nozzles of the conduit assembly, a valve opening of the one or more second fluid nozzles, and/or a port angle of the one or more second fluid nozzles. At the block 1828, the one or more second fluid nozzles may be actuated so as to generate one or more second fluid streams according to the one or more second fluid nozzle operating parameters. In an example embodiment, the one or more second fluid nozzles may be actuated to induce a second fluid flow in a second direction (e.g., opposite to the first direction of the first fluid flow induced at the block 1810). For instance, the one or more second fluid nozzles may be selectively operated so as to adjust one or more of a thrust of at least one second fluid stream of the one or more second fluid streams, a timing of the at least one second fluid stream, a duration of each of the at least one second fluid stream, or an angle of the at least one second fluid stream. In one example, adjusting the thrust of the at least one second fluid stream may include, responsive to the at least one second fluid stream being released above the surface of the body of water, adjusting the thrust of the at least one second fluid stream to a third value, and, responsive to the at least one second fluid stream being released below the surface of the body of water, adjusting the thrust of the at least one second fluid stream to a fourth value less than the third value.

In additional, alternative, or otherwise modified embodiments to those described in detail above with reference to FIGS. 1-18B, one or more components of the wave engine may be added, removed, substituted, modified, or interchanged to adapt the wave engine for a given use case. Certain embodiments, for example, may represent combinations of embodiments described herein. As an example, at least one modification to the embodiments of FIGS. 3-16 may omit the intermediate pumping assembly 360 and the fluid pump 367 may instead be enclosed within the external housing 388 (in such embodiments, the conduit 340 may include a variable diameter along the length of the conduit 340, with the diameter of the conduit 340 decreasing from the proximal end of the conduit 340 to the distal end of the conduit 340, e.g., to account for pumping losses). Further, though various embodiments described herein are discussed with reference to wave engines including cylindrical bodies, the various embodiments, with or without modification, may be applicable to other free-floating watercraft, devices, or apparatuses. Such free-floating watercraft, devices, or apparatuses may vary in shape, size, and functionality, and may include, without limitation, ships associated with one or more wave engines, tanker ships or other transports, deployment ships, buoys, data centers, etc.

Figure 19:
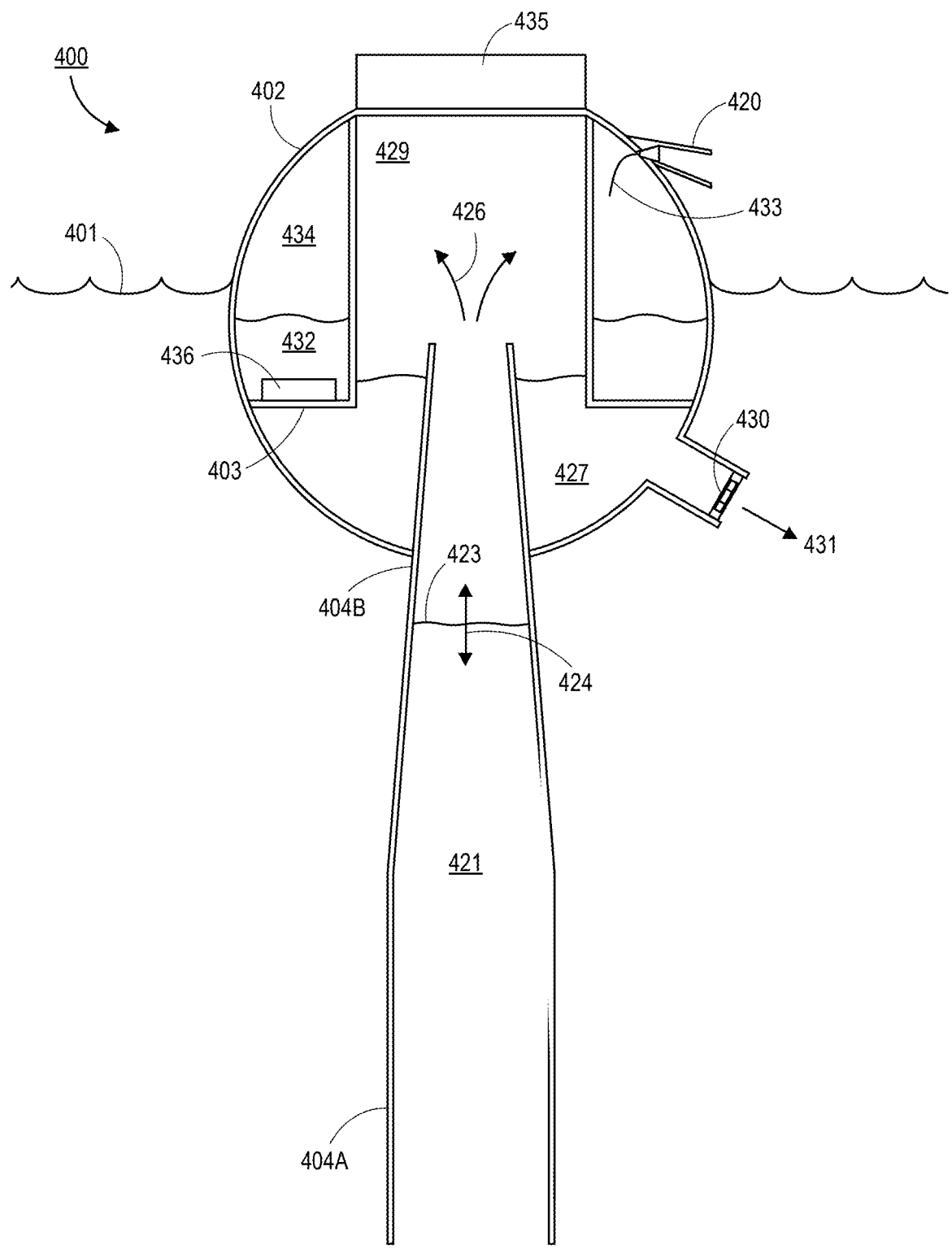
FIG. 19 shows a cross-sectional view of a wave energy harvesting system with a receiving port for coupling with a conduit, in accordance with at least one embodiment.

FIG. 19 illustrates a cross-sectional view of a wave energy harvesting system 400, in accordance with an embodiment. The wave energy harvesting system 400 floats adjacent to an upper surface 401 of a body of water over which waves pass. The wave energy harvesting system 400 may include a buoyant chamber 402 with an interior volume 429. The interior volume 429 may be partially filled with water 427. Gasses (e.g., oxygen, hydrogen, air, or the like) may fill additional portions of the interior volume 429. Internal structures may also be provided within the buoyant chamber 402. For example, baffles, walls, sub-chambers, doors, or the like may be provided within the chamber 402. The internal structures may be used to control flow or movement of water 427 within the chamber 402, provide housing for different gas species, or the like.

The chamber 402 may be axially symmetric in some instances. For example, in FIG. 19, the chamber 402 is a spherical segment with a substantially horizontal top surface. In other instances, the chamber 402 may be a spherical cap, or any other type of axially symmetric shape. Though, the chamber 402 may be non-axially symmetric in other instances. For example, the chamber 402 may have a keel or hull shape similar to that of a floating vessel (e.g., a boat or ship). Openings, ports, or the like may also be provided through the walls of the chamber 402 in order to access materials and/or substances within the chamber 402, to provide control of pressure within the chamber 402, and/or the like.

A tube 404 may be coupled to the chamber 402. The tube 404 may have an open bottom that is in fluid communication with the water 401 surrounding the wave energy harvesting system 400. The tube 404 may pass through a wall of the chamber 402 and pass into the interior volume 429. An opening at the top of the tube 404 is fluidically coupled to the interior of the chamber 402. The tube 404 may have a constant diameter through its length. In other instances, the tube 404 may have a non-uniform diameter through its length. For example, the tube 404 may have a first portion 404A with a constant diameter and a second constricted portion 404B where the diameter is reduced. The tube 404 may be cylindrical or have any other shaped cross-section.

As shown, water 421 may reside in the tube 404 with a free surface 423. As indicated by the double arrow 424 across the free surface 423, the level of the oscillates up and down in response to oscillation of the wave energy harvesting system 400. Oscillation is driven by interaction with waves that pass along the surface of the body of water 401. The confined water 421 within the tube 404 may acquire momentum during oscillation of the wave energy harvesting system 400. At some points in time, the free surface 423 rises above the top opening of the tube 404 and is expelled (as indicated by arrows 426) into the interior volume 429 of the chamber 402. The water from the tube 404 maintains a level of water 427 within the chamber 402.

In order to generate energy, water 427 from the interior of the chamber 402 is expelled out a pipe. As water 427 passes through the pipe, an energy generation device 430 is engaged. The energy generation device 430 may comprise a hydropower turbine, such as a reaction turbine (e.g., a propeller turbine, a bulb turbine, a straflo turbine, a tube turbine, a Kaplan turbine, a Francis turbine, or a kinetic turbine) or an impulse turbine (e.g., a Pelton turbine, or a cross-flow turbine). In some instances, a single turbine is used for the energy generation device 430, and in other instances, multiple turbines arranged in series are used for the energy generation device 430. While a single energy generation device 430 is shown in the wave energy harvesting system 400, embodiments may include a plurality of energy generation devices 430.

The energy generation device 430 may be coupled to an electrical generator (not shown). The energy generation device provides rotational energy which is converted into electrical energy by the electrical generator. The electrical energy may be stored (e.g., in a battery) or consumed for one or more purposes, which will be described in greater detail herein. While an electrical generator is one option, other generator types may also be used. For example, generators described herein may include any generator, alternator, other mechanism, device, and/or component that converts energy from one form into another. In some instances, one or more of the energy generation systems may be replaced with a magnetohydrodynamic (MHD) generator, which generates electricity directly from a flow of liquid without the need for connection with a turbine and associated rotating shaft. That is, a combination of a turbine connected to a generator by a shaft can be replaced, in some instances and with an appropriate choice of working fluid, with a MHD generator.

As noted above, wave energy harvesting system 400 may generate significant amounts of energy that needs to be stored or used in a constructive manner. In some instances, energy generated from wave energy harvesting system 400 may be stored in a battery. The battery may provide an accessible energy source in order to run one or more electrical components integrated into the wave energy harvesting system 400. Alternatively (or in addition), wave energy harvesting system 400 may provide a material conversion process in order to "store" energy in a more transportable form. For example, energy generated by wave energy harvesting system 400 can be stored in the form of an energy product, such as those described in greater detail herein.

In the case of the energy product being hydrogen gas, an electrolyzer 436 may be provided on the wave energy harvesting system 400. The electrolyzer 436 may be fluidly coupled to a water source, such as water 432 within a chamber 403. Water 432 may be deionized, filtered, distilled, and/or otherwise purified. Water 432 may be provided to the wave energy harvesting system 400 as a precursor material. For example, the water 432 may be provided to the wave energy harvesting system 400 through a conduit (not shown) similar to any of the conduits described in greater detail herein. Energy generated by the wave energy harvesting system 400 may be consumed by the electrolyzer 436 to convert water into oxygen and hydrogen. The hydrogen gas may be stored in the internal volume 434 of the chamber 403, or any other confined space associated with the wave energy harvesting system 400. The oxygen gas may be vented to atmosphere. After hydrogen gas is produced, the gas may be collected (i.e., removed or offloaded from the wave energy harvesting system 400) periodically be an external vessel, ship, air-ship, submersible, drone, or any other vehicle through the use of a conduit (not shown) similar to any of the conduits described in greater detail herein.

In an embodiment, conduits that are coupled to a second free-floating body (e.g., a storage vessel, a transport ship, or the like) may be transiently coupled to the wave energy harvesting system 400 through a receiving port 420. The receiving port 420 may include a frustoconical receiving portion in order to receive and couple with a conduit assembly (not shown). The conduit assembly may be similar to any of the conduit assemblies described in greater detail herein. In an embodiment, the conduit assembly may be operable to transport an end of a conduit to the receiving port 420. The receiving port 420 in FIG. 19 is provided above the surface of the wafer 401. In other embodiments, the receiving port 420 may be below a surface of the water 401. In an embodiment, a pipe 433 or the like may be inserted into the chamber 403 through the receiving port 420. The pipe 433 may include one or more channels for delivering fluids and/or siphoning fluids from the chamber 403. For example, water 432 may be delivered to the chamber 403 through the pipe 433 and/or hydrogen may be siphoned from the chamber 403 through the pipe 433.

Wave energy harvesting system 400 may be an autonomous device with the ability to move and/or navigate in a controlled manner about the body of water. Propulsion of the wave energy harvesting system 400 may be driven through one or more different mechanisms. In one instance, the expelled water 431 out of the pipe provides a propulsive force that can move the wave energy harvesting system 400. The wave energy harvesting system 400 can be steered through control of the force of the expelled water 431 and/or the direction of the expelled water 431. In some instances, one or more rudders (not shown) can be coupled to the wave energy harvesting system 400 in order to provide directional control, rotational control, and/or the like.

In some embodiments, propulsion of the wave energy harvesting system 400 may be provided through one or more active propulsion devices. For example, propellers or the like may be used in some instances. Energy to drive the active propulsion devices may be obtained through the energy generation of the wave energy harvesting system 400, or from batteries that were charged through the wave-energy generation of the wave energy harvesting system 400. In other instances, hydrogen or other gasses generated on the wave energy harvesting system 400 can be consumed (e.g., through the use of a fuel cell) in order to power active propulsion devices.

The wave energy harvesting system 400 may include an enclosure 435 that is provided on the chamber 402. The enclosure 435 may be a water proof chamber for securing one or more electrical components. For example, a computing system, a positioning system, and/or a communications system may be provided in the enclosure 435. The computing system may provide one or more processors and associated hardware and/or software that enables control of the wave energy harvesting system 400. For example, the computing system may control power generation, such as by controlling flow rates of water to the energy generation device 430. The positioning system may include a GPS, a compass, an accelerometer, a gyroscope, or any other suitable navigational system. The positioning system may control propulsion and steering systems in order to navigate the wave energy harvesting system 400. The communications system may include an antenna, a receiver, and associated circuitry, hardware, and/or software. The communications system may provide a communication link to external systems, other waver-energy generation systems, or the like. The systems described in the enclosure 435 on the wave energy harvesting system 400 are exemplary in nature, and it is to be appreciated that many different systems, control apparatuses, and/or the like may be provided in the enclosure 435.

As described herein, the energy products produced by the wave energy harvesting system 400 may be subsequently delivered to shore (or near shore) for use, storage, or the like. The energy product may be transported to shore through one or more vessels. In some instances, the energy product is transported to shore without further modification. For example, a hydrogen gas may be generated by the wave energy harvesting system 400, and the hydrogen gas is transported to shore. In other instances, the energy product may be used to generate a different energy product. For example, the energy product may be a precursor that is used in the generation of an alternative energy product (e.g., an energy product that has a higher energy density). In one example, a hydrogen energy product may be converted into methanol or ammonia through a chemical reaction with one or more other precursor gasses. This additional conversion may occur at the wave energy harvesting system 400 or during transport of the energy product to shore.

Figure 20:
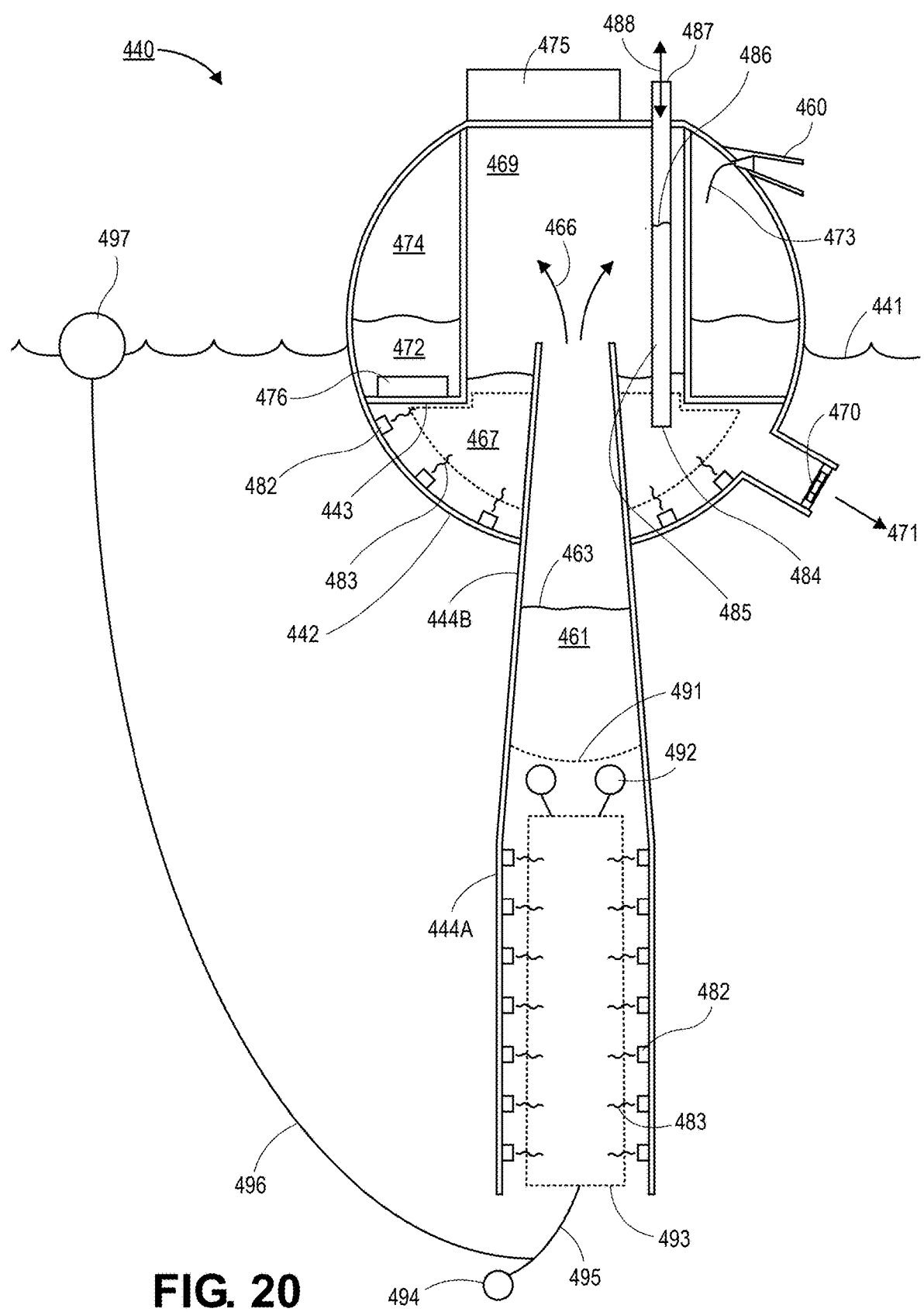
FIG. 20 shows a cross-sectional view of a wave energy harvesting system with a receiving port for coupling with a conduit, in accordance with at least one embodiment.

FIG. 20 illustrates a cross-sectional view of the wave energy harvesting system 440, in accordance with an embodiment. The wave energy harvesting system 440 may be similar to the wave energy harvesting system 400 described above, with the exception of the energy product that is being generated or produced by the wave energy harvesting system 440. For example, wave energy harvesting system 440 may include a buoyant chamber 442 coupled to an injection tube 444A/444B. Water 461 within the tube 444 oscillates so that the surface 463 raises and lowers within the tube 444. In some instances water 461 may flow out 466 of the tube 444 into the interior 469 of the chamber 442 in order to fill water 467 in the chamber 442. Water 467 in the chamber 442 can be expelled through energy generation device 470 and exit 471 the wave energy harvesting system 440 in order to generate energy.

In an embodiment, conduits that are coupled to a second free-floating body (e.g., a storage vessel, a transport ship, or the like) may be transiently coupled to the wave energy harvesting system 440 through a receiving port 460. The receiving port 460 may include a frustoconical receiving portion in order to receive and couple with a conduit assembly (not shown). The conduit assembly may be similar to any of the conduit assemblies described in greater detail herein. In an embodiment, the conduit assembly may be operable to transport an end of a conduit to the receiving port 460. The receiving port 460 in FIG. 20 is provided above the surface of the wafer 441. In other embodiments, the receiving port 460 may be below a surface of the water 441. In an embodiment, a pipe 473 or the like may be inserted into the chamber 443 through the receiving port 460. The pipe 473 may include one or more channels for delivering fluids and/or siphoning fluids from the chamber 443. For example, water 472 may be delivered to the chamber 443 through the pipe 473 and/or hydrogen may be siphoned from the chamber 443 through the pipe 473.

However, instead of producing a gas as an energy product (or only gas), the wave energy harvesting system 440 may produce a biological product. The biological product may comprise one or more of marine algae (e.g., micro-alae and/or macro-algae), seaweed, other marine plants, fish, krill, or other marine organisms. More specifically, electrical power generated through the operation of an energy generation device 470 can be used to power lights 482, lamps, thermal devices (e.g., heaters), and/or the like. For example, lights 482 may be light emitting diode (LED) lights or any other suitable source for generating electromagnetic radiation 483. The electromagnetic radiation 483 can be consumed by the biological product within the wave energy harvesting system 440 in order to induce growth of the biological product.

As shown in FIG. 20, the lights 482 may be arranged, attached, or otherwise coupled to interior surfaces of the chamber 442. Additionally, lights 482 may be provided along sidewalls of the injection tube 444. While shown as being coupled directly to interior wall surfaces, other embodiments may comprise suspending lights 482 within an interior volume of the chamber 442. The lights 482 in FIG. 20 are all shown as being submerged in water 467 or 461. Though, in other embodiments, lights 482 may be provided above the surface of the water 467 within the chamber 442.

In one instance, designed to promote the growth of biological products (e.g., algae and/or other marine based plant life), an approximately circular net 481 spans, and/or is adjacent to, an approximately flow-normal and/or horizontal cross-section of the water reservoir, adjacent to the surface of the water 467. Net 481 entrains the biological product within the lower portion of the water 467 thereby tending to reduce, if not prevent, the outflow and/or loss of that macroalgae through the energy generation device 470. In other embodiments, other structures (e.g. a sieve, catchment, mesh, or grating) are positioned in the path of water flow to the energy generation device 430 in order to prevent outflow or loss of biological products.

Periodically, biological products may be removed from the water 467 by a ship, platform, or other vessel. A ship may insert a suction tube into and through an access tube 485. Once inserted into and through access tube 485, an inserted suction tube can be positioned near the bottom of the embodiment's reservoir of water 467 and suck out a portion of the biological product therein. A complementary access tube (not shown), and/or a complementary channel within a single access suction tube 485, can return water to the reservoir while biological products, are being removed from the reservoir of water 467, thereby maintaining and/or preserving the original level of the water 467 in the reservoir.

The access tube 485 allows algae, water, nutrients, and/or other materials, to be added to, and/or withdrawn from, the reservoir of water 467 when that reservoir is otherwise sealed inside the chamber 442. Because the access tube is open to the atmosphere (as indicated by arrow 488) at its upper mouth 487, and open to the water and biological product in the water 467 at its lower mouth 484, water 467 from the reservoir is free to rise up within the algae access tube 485. Because of the pressure of the air trapped within the air pocket 469 of the interior of the chamber 442, and the corresponding pressure of the water 467, the surface 486 of the water within the access tube 485 tends to rise to a height above the surface of the water 467 within the reservoir whose head pressure approximately corresponds to the pressure of the air within hollow chamber 442.

In addition to growing biological products, especially macroalgae, within the water 467 reservoir inside the hollow chamber 442, biological products, especially macroalgae, may be grown inside the embodiment's injection tube 404. An upper barrier net 491 spanning an upper portion, and/or at an upper position, of the injection tube 444 prevents at least a portion of the algae within the injection tube 444 from too closely approaching the upper constricted portion of the injection tube 444 which, if not prevented, could potentially clog the injection tube 404 at that location.

Macroalgae or other biological products are grown within a net enclosure and/or containment bag 493 that forms a porous bag entraining most, if not all, of the biological products. An upper end of the algae containment bag 493 is pulled upward by a float 492, tending to position the upper end of the bag proximate to the lower side of the barrier net 491. The biological product within the containment bag 493 are encouraged to grow through the embodiment's provision of light, e.g. 483, emitted by lamps, e.g. 482, positioned along the interior wall and/or surface of the injection tube 444.

A lower end of the containment bag 493 is pulled downward by a weight 494 connected to the bag by a tether, chain, rope, linkage, and/or cable 495. Also connected to the weight 494, and therethrough to the containment bag 493, is a tether, chain, rope, linkage, and/or cable 496 an upper end of which is connected to a float 497 that tends to float at the surface 441 of the body of water on which the wave energy harvesting system 440 floats.

Periodically, biological products may be removed from the wave energy harvesting system's 440 injection tube 444 by a ship or other vessel. A ship may attach a secondary cable to cable 496 and then lower a secondary weight to increase the total weight tending to pull the algae containment bag 493 down and out of the injection tube 444. After the containment bag 493 has been pulled down and become free of the injection tube 444, the containment bag 493 may be pulled up by the secondary cable and therewith lifted onto and/or into the ship where its biological products may be harvested. The same containment bag 493 that was removed may be reinserted into the injection tube 444 using the same second cable, using an underwater autonomous vehicle, and/or using another method, mechanism, and/or system. If the same containment bag 493 is reinserted into the embodiment's inertial water tube 444, it will tend to be so reinserted after most, but not all, of its entrained biological product has been harvested and/or removed. By leaving a portion of the biological product in the containment bag 493, the residual biological product can grow and give rise to another harvest. If a "new" second containment bag 493 is inserted into the embodiment's injection tube 444 to replace the removed containment bag 493, then it is advantageous to first "seed" that containment bag 493 with biologic stock so that a new crop of a preferred species of algae can be grown.

The scope of the present disclosure includes a complementary ship to periodically harvest the biological products grown within the embodiment, as well as the facilities on a shore, floating platform, and/or other ship where the harvested algae are processed and/or stored, as well as a method for harvesting biological products wherein: a wave energy converter of a type herein disclosed is deployed on a body of water; electrical energy produced by said wave energy converter operating in waves is used to power LEDs, or other lamps, or other sources of light emissions, that are mounted on, within, inside, or outside, of said wave energy converter, and/or LEDs, or other lamps, or other sources of light emissions, that are suspended from walls, surfaces, and/or structural members, within, inside, or outside, of said wave energy converted; biological products are permitted to grow in an enclosure, cavity, or vicinity of said wave energy converter using light from said lamps as a source of metabolic energy; said biological products (or products or byproducts produced therefrom, e.g. algal oil, fish oil, etc.) is transferred to a ship or other floating vessel; said ship or floating vessel transfers said biological products (or products or byproducts produced therefrom, e.g. algal oil, fish oil, etc.) to a shore facility for processing and/or storage.

The aquaculture configuration embodiment illustrated in FIG. 20 may also include fish within either or both of the water 467 reservoir and/or the algal containment bag 493. If one or more species of fish that are able to eat and/or consume the type(s) of algae being grown within the embodiment are selected and included within the respective growth areas prior to each growth cycle, then a portion of those fish may be harvested along with whatever algae remains uneaten. The scope of the present disclosure includes a method for harvesting fish wherein: a wave energy converter of a type herein disclosed is deployed on a body of water; electrical energy produced by said wave energy converter is used to power LEDs, or other lamps, or other sources of light emissions, that are mounted on, within, inside, or outside, of said wave energy converter, as well as LEDs, or other lamps, or other sources of light emissions, that are suspended from walls, surfaces, and/or structural members, within, inside, or outside, of said wave energy converter; algae are permitted to grow in an enclosure, cavity, or vicinity of said wave energy converter using light from said lamps as a source of metabolic energy; fish or other marine organisms are permitted to grow in an enclosure, cavity, or vicinity of said wave energy converter, feeding, at least in part, on said algae as a source of metabolic energy; said fish or other marine organisms are transferred to a ship or other floating vessel; said ship or floating vessel transfers said fish and/or other marine organisms (or products or byproducts produced therefrom, e.g. fish meal or fish oil) to a shore facility for processing and/or storage.

The scope of the present disclosure includes, but is not limited to, the growth and/or harvesting of any and every kind of microalgae, macroalgae, fish, crustacean. Fish that do not eat the varieties of algae grown may nonetheless receive nutrition, e.g. plankton and phytoplankton, from the water that is regularly introduced to the reservoir of water 467 and injection tube 444 as a result of wave action. In addition to introducing potentially nutrient-rich water from outside the embodiment into the water 467 reservoir and injection tube 444 as a result of wave action, the embodiment also tends to remove waste-containing and/or nutrient-depleted, water from the water 467 reservoir and injection tube 444 as a result of the same water cycle (i.e. water enters tube 444, and therefrom enters the water 467 reservoir, and thereafter flows out of the water reservoir through the energy generation device 470.

The scope of the present disclosure includes embodiments utilizing water reservoir lamps and/or inertial water tube lamps emitting light of any single wavelength, any range of wavelengths, and/or any combinations of wavelengths or ranges of wavelengths.

The scope of the present disclosure includes embodiments in which lamps are attached to the inner surface of the upper portion of the hollow chamber 442, i.e. within the air pocket 469. The scope of the present disclosure includes embodiments in which lamps are attached to the outer surfaces of the hollow chamber 442 and/or injection tube 444 thereby encouraging biological product growth, and the establishment of communities of fish or other marine life, outside the wave energy harvesting system 440, but in the vicinity of the wave energy harvesting system 440.

In addition to the generation of biological energy products, energy products such as hydrogen gas can be produced by an electrolyzer 476 on the wave energy harvesting system 440. The electrolyzer 476 may be fluidly coupled to a water source, such as water 472 within a chamber 443. Water 472 may be deionized, filtered, and/or otherwise purified. Water 472 may be provided to the wave energy harvesting system 440 as a precursor material. Energy generated by the wave energy harvesting system 440 may be consumed by the electrolyzer 476 to convert water into oxygen and hydrogen. The hydrogen gas may be stored in the internal volume 474 of the chamber 443, or any other confined space associated with the wave energy harvesting system 440. The oxygen gas may be vented to atmosphere. After hydrogen gas is produced, the gas may be collected (i.e., removed or offloaded from the wave energy harvesting system 440) periodically be an external vessel, ship, air-ship, submersible, drone, or any other vehicle.

Figure 21:
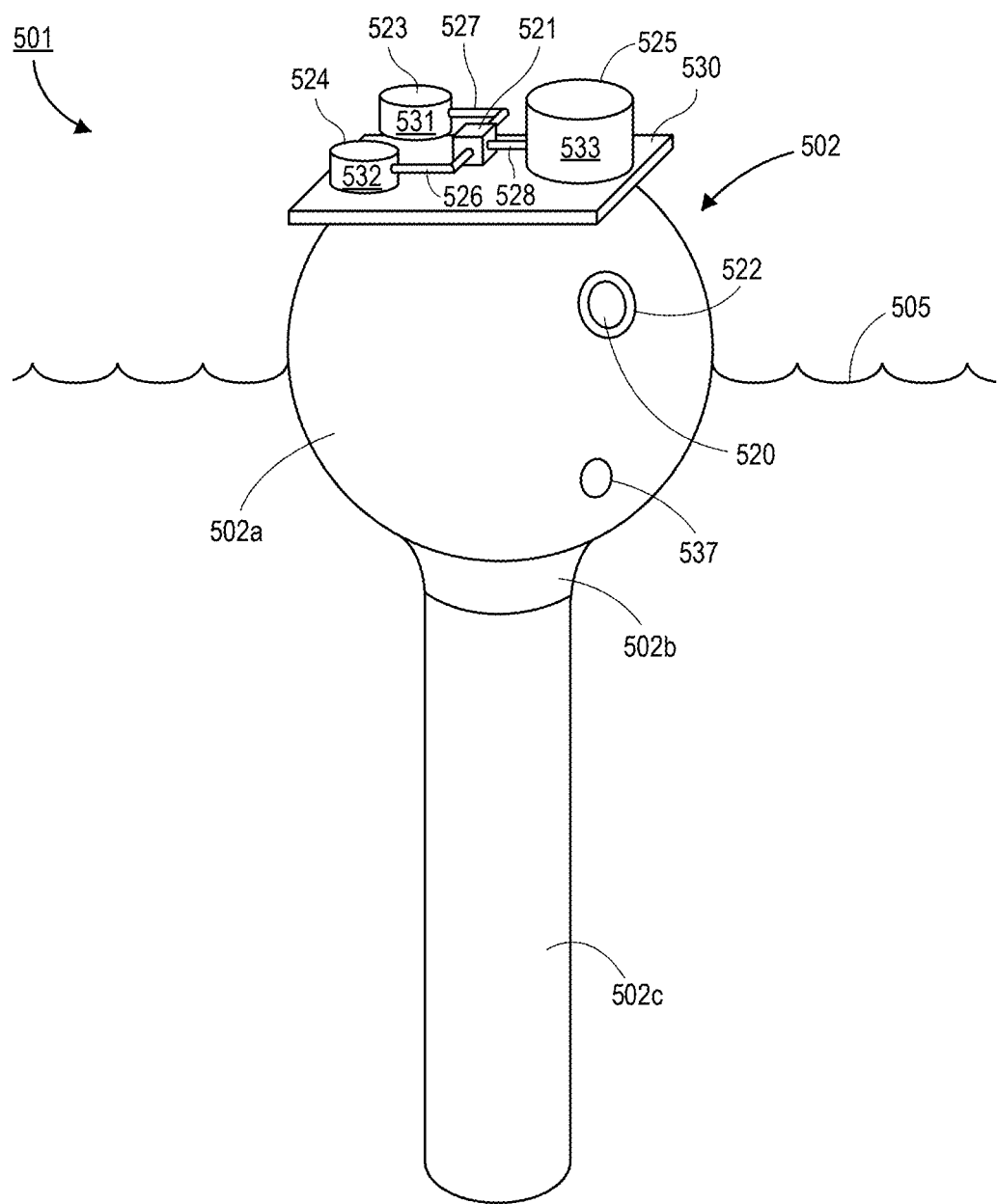
FIG. 21 shows a perspective view of a wave energy harvesting system with a receiving port and a chemical processing system, in accordance with at least one embodiment.

Referring now to FIG. 21 a side perspective view of an wave energy harvesting system 501 with a receiving port 520 and coupling structure 522 for fluidic coupling with a conduit is shown, in accordance with an embodiment. In an embodiment, the wave energy harvesting system 501 may further comprise an integrated processing plant on a platform 530. The wave energy harvesting system 501 floats adjacent to an upper surface 505 of a body of water over which waves tend to pass. The wave energy harvesting system 501 comprises a housing 502. In an embodiment, the housing 502 comprises a buoyant chamber 502a, and a tube 502c that is coupled to the chamber 502a by an annular collar 502b. An aperture 537 may be provided through the chamber 502a for allowing water to exit the chamber 502a (e.g., for energy generation purposes, navigational purposes, or the like).

In an embodiment, the receiving port 520 and the coupling structure 522 may be similar to any of the receiving ports and coupling structures described in greater detail herein. For example, the receiving port 520 and coupling structure 522 may be configured to receive a conduit assembly that is attached to a conduit (both not shown). In an embodiment, the receiving port 520 may be above the water 505 or below the water 505. While a single receiving port 520 is shown, it is to be appreciated that any number of receiving ports may be provided, in accordance with an embodiment.

As described in other embodiments, an energy product 531 may be generated by way of conversion of wave energy into electrical power. In some embodiments, the energy product 531 may be a gas or other fluid, such as hydrogen gas. The energy product 531 may be stored in a first storage container 523. Wave energy harvesting system 501 depicts the first storage container 523 for the energy product 531 being on the platform 530. Though other implementations may include the first storage container 523 being integrated into the hollow chamber 502a, being external to the wave energy harvesting system 501 (e.g., being attached or otherwise coupled to an external surface of the wave energy harvesting system 501), or positioned in the approximate area of the wave energy harvesting system 501 (e.g., on a second floating platform that is at least temporarily coupled to the wave energy harvesting system 501).

In an embodiment, the energy product 531 in the first storage container 523 may be used as a precursor for a chemical reaction. In an additional embodiment, a second precursor 532 may be stored in a second storage container 524. In the instance of a chemical reaction to convert hydrogen gas into methanol, the second precursor 532 may comprise $CO_2$ or another carbon containing source. The second precursor 532 may also be generated as an energy product on the wave energy harvesting system 501, or the second precursor 532 may be periodically replenished by a vessel, or the like (e.g., through the use of a conduit similar to embodiments described in greater detail herein). The energy product 531 may flow from the first storage container 523 into a reaction apparatus 521 through pipe 527, and the second precursor 532 may flow from the second storage container 524 into the reaction apparatus 521 through pipe 526. The reacted product 533 (e.g., a second energy product) may flow through pipe 528 into a third storage container 525. The reacted product 533 may be periodically removed from the third storage container 525 for transport to an alternative location (e.g., another storage location or use facility, either on the body of water 505 or on land). For example, the third storage container 525 may be fluidically coupled to the receiving port 520 for siphoning of the reacted product 533. While a simple reaction process is shown in FIG. 21, it is to be appreciated that any suitable conversion, filtering, compression, reaction, treatment, or the like may be implemented on the wave energy harvesting system 501.

Figure 22:
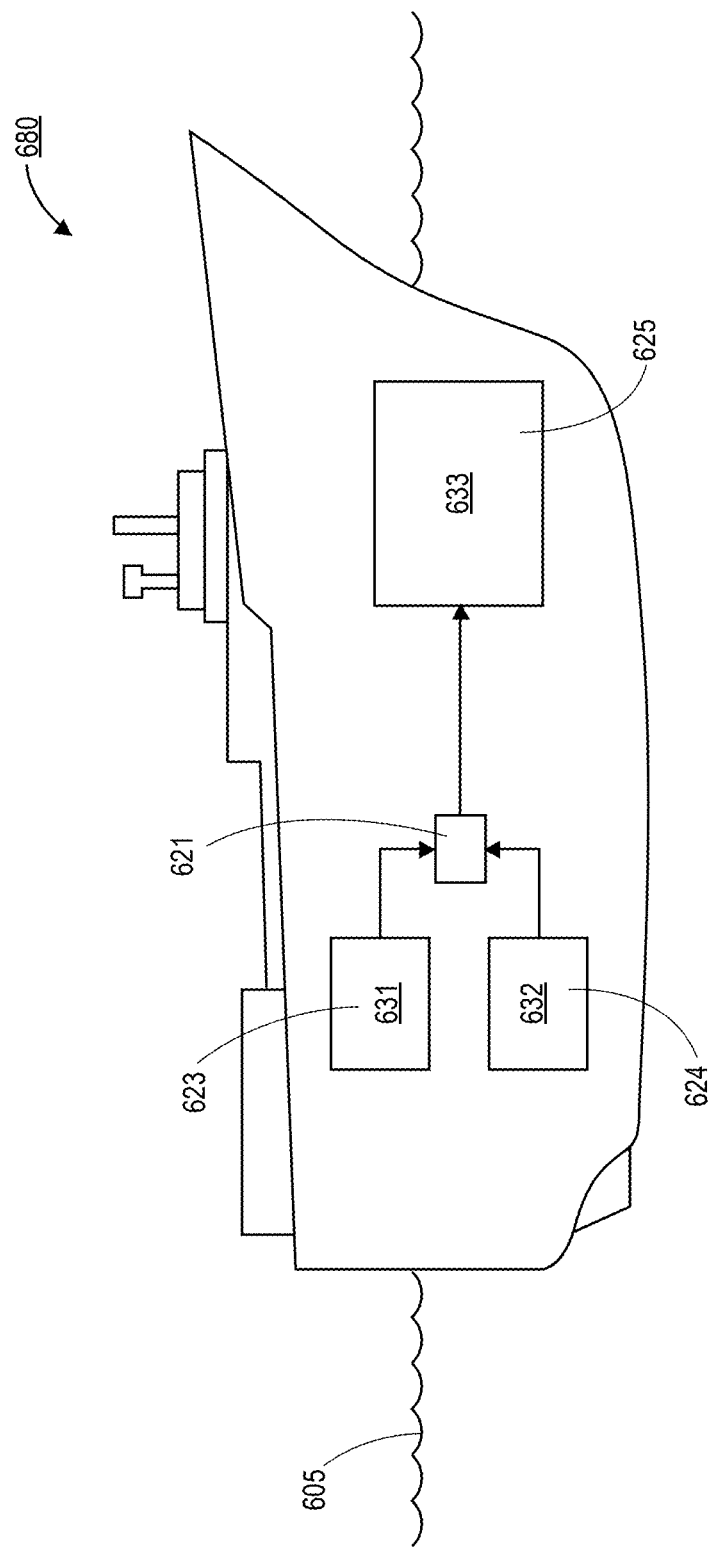
FIG. 22 shows a cross-sectional view of a transport vessel with a chemical processing system, in accordance with at least one embodiment.

Referring now to FIG. 22 a side view schematic of a vessel 680 that may be used to transport an energy product from a wave energy harvesting system (not shown) to land (not show) is shown. For example, vessel 680 may be similar to the second free-floating body 180 in FIG. 1. The vessel 680 may include a first storage container 623 for storing an energy product 631. The energy product 631 may be transported into the first storage container 623 from a wave energy harvesting system, or from another vessel (not shown) that obtained the energy product 631 from a wave energy harvesting system through the use of a conduit similar to any of the conduits described in greater detail herein. For example, the energy product 631 may comprise hydrogen or any other energy product described in greater detail herein. The vessel 680 may also comprise a second storage container 624 for storing an additional precursor 632. In the case of hydrogen to methanol conversion, the additional precursor 632 may comprise carbon (e.g., $CO_2$). In an embodiment, the energy product 631 and the precursor 632 are flown into a reaction apparatus 621. The combined energy product 631 and precursor 632 may react in the reaction apparatus 621 to form a reacted product 633 that is transported to a third storage container 625. The reacted product 633 may be transported by the vessel 680 to an alternative storage or use facility (either on land or on the water 605). While a simple reaction process is shown in FIG. 22, it is to be appreciated that any suitable conversion, filtering, compression, reaction, treatment, or the like may be implemented on the vessel 680.

Figure 23:
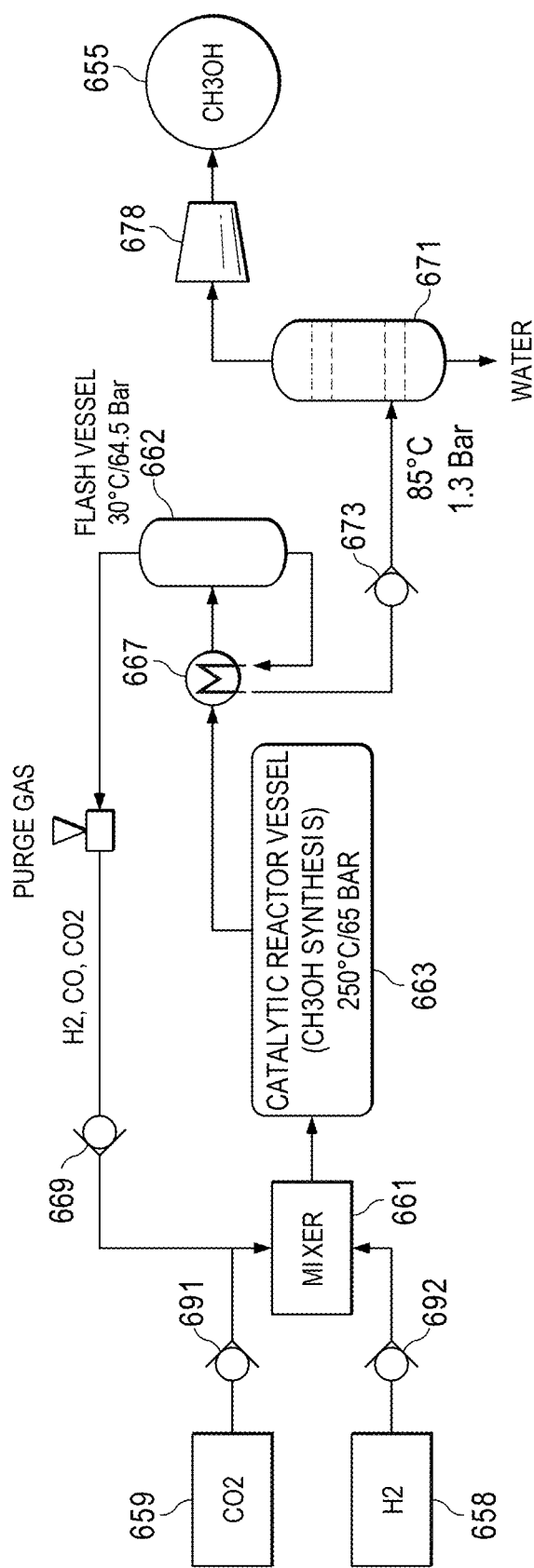
FIG. 23 shows a schematic of a chemical processing system for converting a first energy product into a second energy product, in accordance with at least one embodiment.

Referring now to FIG. 23 a diagram providing a more detailed explanation of a reaction process that may be used to convert a first energy product into a second energy product is shown, in accordance with an embodiment. The conversion depicted in FIG. 23 can be implemented on a wave energy harvesting system (e.g., similar to FIG. 21), on a transport vessel (e.g., similar to FIG. 22), partially on the wave energy harvesting system and partially on the transport vessel, or partially on a first transport vessel and partially on a second transport vessel. In the embodiment shown in FIG. 23, a detailed process by which methanol ($CH_3OH$) is synthesized from, by, and/or through, $CO_2$ hydrogenation is shown. In an embodiment, $CO_2$ is stored in $CO_2$ tank 659 and $H_2$ is stored in $H_2$ tank 658. One or both of the $CO_2$ and the $H_2$ may be energy products generated by a wave energy harvesting system. The $CO_2$ and $H_2$ are pumped with pump 691 and pump 692 and combined in a mixer 661 with a recirculated stream from flash vessel 662. The mixed stream (of $CO_2$ and $H_2$ gases) is pumped to a catalytic reactor vessel 663 where an exothermic reaction takes place, and the temperature and pressure can reach 250° C. and 65 bar, respectively, or higher. The post-reaction stream exits the catalytic reactor vessel 663 and passes through heat exchanger 667 and then enters flash vessel 662 where the temperature and pressure will be approximately 30.0° C. and 64.5 bar, respectively.

A stream of $H_2$, CO and $CO_2$ from flash vessel 662 is recirculated back to mixer 661 by pump 669 after being purged of a small amount of gas to further purify the stream. The liquid stream from flash vessel 662 enters heat exchanger 667 which is then pumped to distillation tower 671 by pump 673. The crude $CH_3OH$ stream entering distillation tower 671 can be at a temperature and pressure of 85° C. and 1.3 bar, respectively. A final separation of $CH_3OH$ and water takes place within distillation tower 671. Gaseous $CH_3OH$ is pumped to methanol ballast sphere 655 via a compressor pump 678 where the $CH_3OH$ is cooled to liquefaction. Water extracted from the crude aqueous $CH_3OH$ is released from a bottom of the distillation tower 671. Other processes for synthesizing methanol from $CO_2$ and $H_2$ are known in the prior art and can be used in place of the one shown. Embodiments utilizing, incorporating, and/or including, such other methanol synthesis processes and/or associated mechanism and equipment are included within the scope of the present disclosure. Further, while methanol synthesis is provided as one example, conversion or reaction of any energy products using any suitable chemical reactions, processes, treatments, filtering, or the like may be used.

Figure 24:
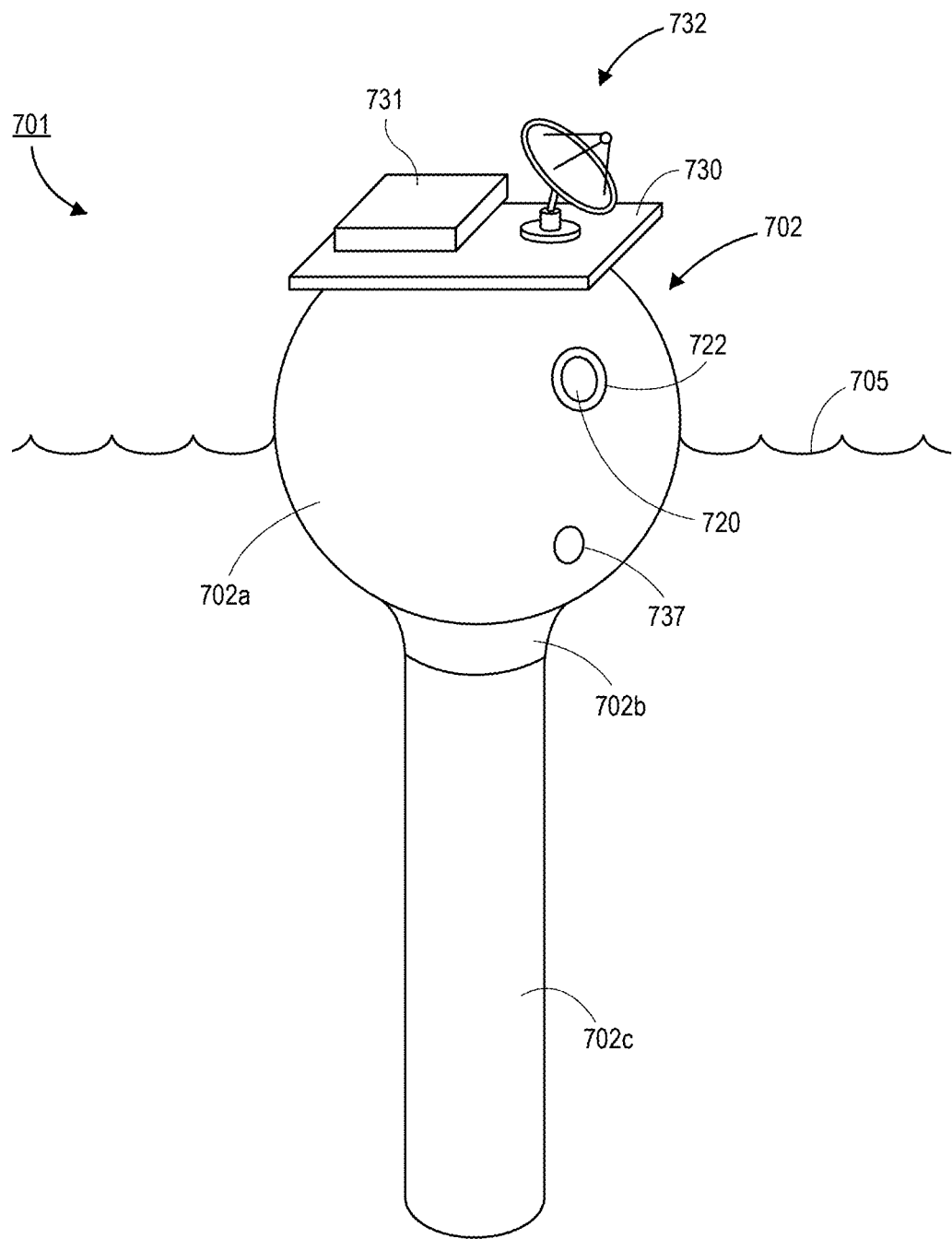
FIG. 24 shows a perspective view of a wave energy harvesting system with a receiving port and a computing system, in accordance with at least one embodiment.

Referring now to FIG. 24 a side perspective view of a wave energy harvesting system 701 that includes a receiving port 720 and coupling structure 722 for fluidic coupling with a conduit is shown, in accordance with an embodiment. In an embodiment, the wave energy harvesting system 701 may further comprise an integrated computing system 731 on a platform 730. The wave energy harvesting system 701 floats adjacent to an upper surface 705 of a body of water over which waves tend to pass. The wave energy harvesting system 701 comprises a housing 702. In an embodiment, the housing 702 comprises a buoyant chamber 702a, and a tube 702c that is coupled to the chamber 702a by an annular collar 702b. An aperture 737 may be provided through the chamber 702a for allowing water to exit the chamber 702a (e.g., for energy generation purposes, navigational purposes, or the like).

In an embodiment, the receiving port 720 and the coupling structure 722 may be similar to any of the receiving ports and coupling structures described in greater detail herein. For example, the receiving port 720 and coupling structure 722 may be configured to receive a conduit assembly that is attached to a conduit (both not shown). In an embodiment, the receiving port 720 may be above the water 705 or below the water 705. While a single receiving port 720 is shown, it is to be appreciated that any number of receiving ports may be provided, in accordance with an embodiment.

In an embodiment the wave energy harvesting system 701 may comprise an integrated computing system 731 on a platform 730 at the top of the wave energy harvesting system 701 is shown, in accordance with an embodiment. As described in other embodiments, an energy product may be generated by way of conversion of wave energy into electrical power. In some embodiments, the energy product may be a gas or other fluid, such as hydrogen gas. In some instances, the energy product may be stored in a chamber within the housing 702 or a chamber (not shown) outside of the housing 702.

In an embodiment, a platform 730 may be provided over a top of the buoyant chamber 702a. A computing system 731 may be provided on the platform 730 and include an enclosure to protect components from water and the elements. Any number of computational systems (e.g., processors, graphics processors, etc.), memories, and/or the like may be housed within the enclosure. The computing system 731 may be configured with a plurality of processing systems integrated with each other in order to perform complex computer processing operations. As noted above, the computing system 731 may be optimized and/or configured to implement one or more of data center hosting, implementing block-chain mining, training ML or AI algorithms, or the like. The outcome of the computational work (e.g., block-chain coins or tokens, trained algorithms, data center capacity, etc.) can be transmitted to external devices over a wireless network through one or more antennas 732, or other wireless systems. As noted above, the computing system may be powered by energy generated by the wave energy harvesting system 701 through conversion of wave energy into electrical power, or through conversion of the energy product stored in a chamber back into electrical power (e.g., through the use of a hydrogen fuel cell or the like).

Figure 25:
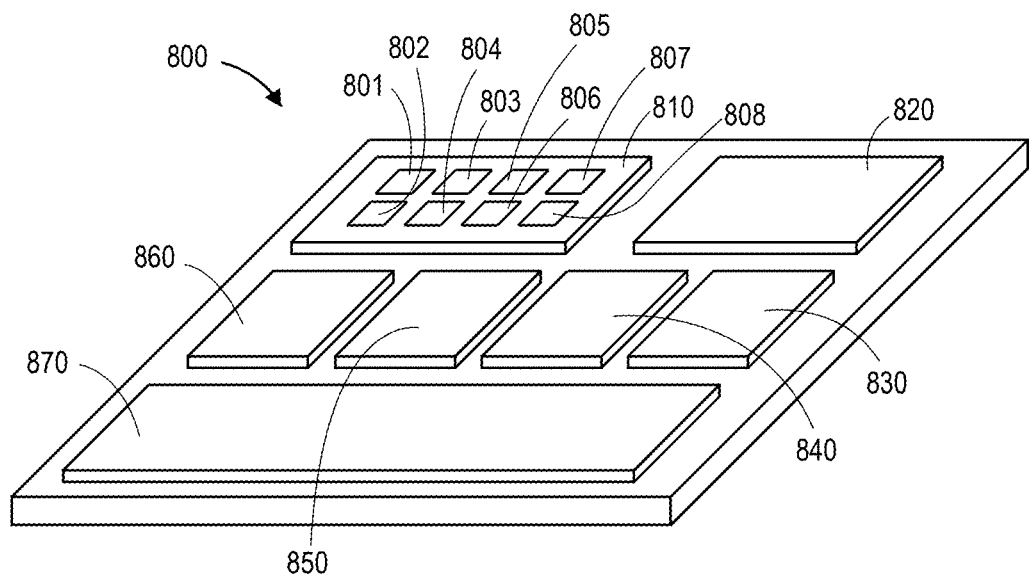
FIG. 25 shows a perspective view of a computing system that can be integrated into a wave energy harvesting system, in accordance with at least one embodiment.

Referring now to FIG. 25 a perspective view of an computing system 800 that may be integrated with a wave energy harvesting system, such as those described in greater detail herein, is shown, in accordance with an embodiment. The computing system 800 may comprise an array of electronics, hardware, and/or software that are configured to control one or more aspects of the wave-energy generation device. While the components illustrated in FIG. 25 are shown on a single board, it is to be appreciated that components may be on separate boards, structures, or the like. The computing system 800 may be housed within a water tight chamber or enclosure provided on the wave energy harvesting system.

Computing system 800 may comprise a computing device 810. The computing device 810 houses a board. The board may include a number of components, including but not limited to a processor 801. The processor 801 may include, but is not limited to, a central processing unit (CPU), a graphics processing unit (GPU), an application-specific integrated circuit (ASIC), a field programmable gate array (FPGA), and/or the like. The processor 801 is physically and electrically coupled to the board. Other components of computing device 810 include, but are not limited to, memory 802 or 803, such as volatile memory (e.g., DRAM), non-volatile memory (e.g., ROM), flash memory, a mass storage device (such as hard disk drive, compact disk (CD), digital versatile disk (DVD), and so forth). The computing device may comprise a communications chipset 804, a digital signal processor 805, a chipset 806, an antenna 807, and/or an input/out device 808.

Computing system 800 may comprise a communications device 820. The communications device 820 enables wireless communications for the transfer of data to and from the computing system 800. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communications device 820 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing system 800 may include a plurality of communications devices 820. For instance, a first communications device 820 may be dedicated to shorter range wireless communications such as Wi-Fi and Bluetooth and a second communications device 820 may be dedicated to longer range wireless communications such as GPS, EDGE, GPRS, CDMA, WiMAX, LTE, Ev-DO, and others. The communications device 820 may be communicatively coupled to one or more antennas, satellite dishes, or other device to broadcast and/or receive wireless communications. The antennas or the like may be external to the enclosure, or the antennas may be within the enclosure.

Computing system 800 may also comprise a server rack 830. The server rack 830 may comprise a plurality of processors with associated hardware and software. The server rack 830 may execute computational work in order to provide a revenue generating service. The server rack 830 may be powered through energy generated by the wave energy harvesting system, such as those described in greater detail herein. While a constant power supply may be desired, computing system 800 may still function with an intermittent or non-constant power supply provided by wave-energy generation. To deal with the variable power supply, server rack 830 may include controllers that adjust clock speed for the processors. This allows for power consumption to be directly controlled to coincide with available power. In some instances, the server rack 830 may perform data center operations or tasks. The server rack 830 may host and/or deliver content, or otherwise provide a link between consumers and centralized data storage. In some instances, the server rack 830 may perform services in conjunction with block-chain technologies, such as cryptocurrency mining. The server rack 830 may perform services such as ML or AI training as well.

Computing system 800 may include a positioning system 840. The positioning system 840 may include one or more modules, components, and/or apparatuses for determining a geolocation of the wave-energy generation device. In some instances, the positioning system 840 may comprise a GPS, a compass, an accelerometer, a gyroscope, and/or the like. The positioning system 840 may include a processor and/or controller to enable navigation for the wave-energy generation device. For example, actuators may be controlled in order to steer or direct the wave-energy generation device in a particular direction. Propulsion devices (e.g., propellers, water jet flows, etc.) on the wave energy harvesting system may also be powered and/or directed by components of the positioning system 840.

Computing system 800 may include a sensor module 860. The sensor module 860 may include processors, memory, and associated hardware and software to control and/or record data from one or more sensors that monitor various aspects of the wave energy harvesting system. Sensors may comprise, but are not limited to, a pressure sensor, a gas composition sensor, a water level sensor, a temperature sensor, a fluid flow rate sensor, an electrical current sensor, a power sensor, a camera, an optical sensor, or the like. The physical sensors may be distributed throughout the wave energy harvesting system, and the controlling circuitry/software may be provided in the sensor module 860 within the computing system 800.

Computing system 800 may include an interface module 850. The interface module 850 may comprise one or more components used to interface with the wave-energy generation device. The interface module 850 may include one or more input devices. For example, a keyboard, a mouse, a touchscreen display, or the like may be provided in the interface module 850. Output devices, such as a display screen, a speaker, or the like may also be provided in the interface module 850. The interface module 850 may further comprise a camera, a video camera, a biometric screening device, or the like.

Computing system 800 may include a battery module 870. The battery module 870 may include any type of battery. The battery may include a rechargeable battery, such as a lithium based battery (e.g., a lithium-ion battery). The battery of the battery module 870 may be charged by electricity generated by the wave energy harvesting system. The battery module 870 may be used as a store of power in order to power one or more electrical components of the computing system 800, or any other powered device of the wave-energy generation device. The battery module 870 may be used in order to normalize power delivery to electrical components. For example, the battery module may supply power in order to equalize total power delivery when the wave-energy generation device provides variable power over time.

Figure 26:
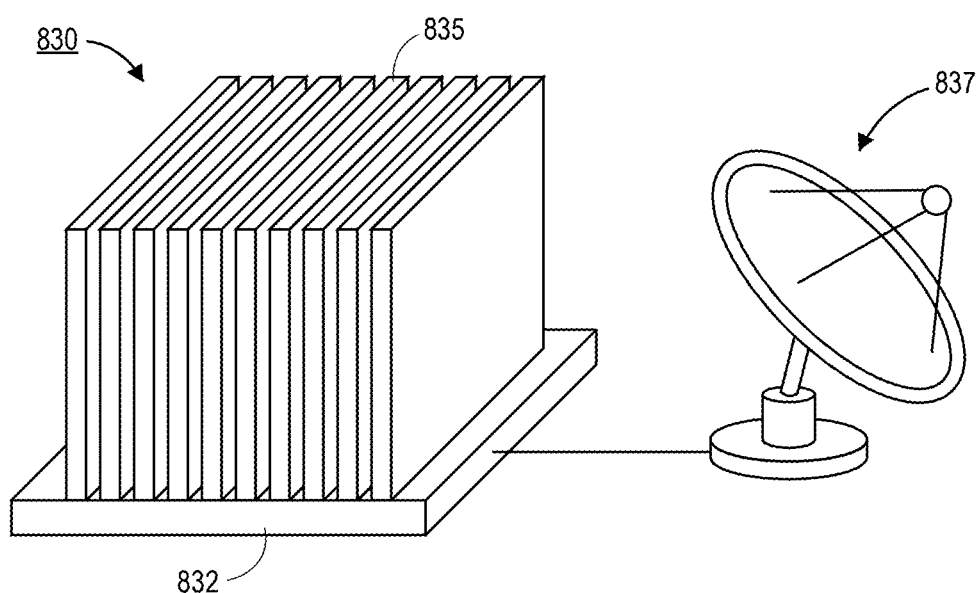
FIG. 26 shows a perspective view of a server rack that can be integrated into a wave energy harvesting system, in accordance with at least one embodiment.

Referring now to FIG. 26 a perspective view of a server rack 830 that may be integrated into a wave energy harvesting system, such as those described in greater detail herein. As shown, the server rack 830 may include a plurality of server blades 835 that are provided on a rack 832. The server blades 835 may be communicatively coupled to each other through the rack 832 and/or associated cabling, in order to provide enhanced processing power. The server blades 835 may include processors, such as, but not limited to, central processing units (CPUs), graphics processing units (GPUs), application-specific integrated circuits (ASICs), field programmable gate arrays (FPGAs), and/or the like.

In some instances the server rack 830 is communicatively coupled to an antenna 837 to enable wireless communication. The antenna 837 may include a parabolic dish antenna or any other antenna configuration. The ability to wirelessly transmit data from the server rack 830 allows for data to be processed remotely at the source of power generation (e.g., in the ocean) while still being useful to the end consumer. The data delivery, hosting, computation, and the like can be executed at lower energy costs using such wave-energy generation devices. Further, the server rack 830 can be passively cooled by the body of water surrounding the wave-energy generation device (e.g., the server rack 830 can be in a water tight enclosure that is submersed in water). In some instances, the server rack 830 functions as a cryptocurrency mining rig that is powered through the energy produced by the wave energy harvesting system.

Figure 27:
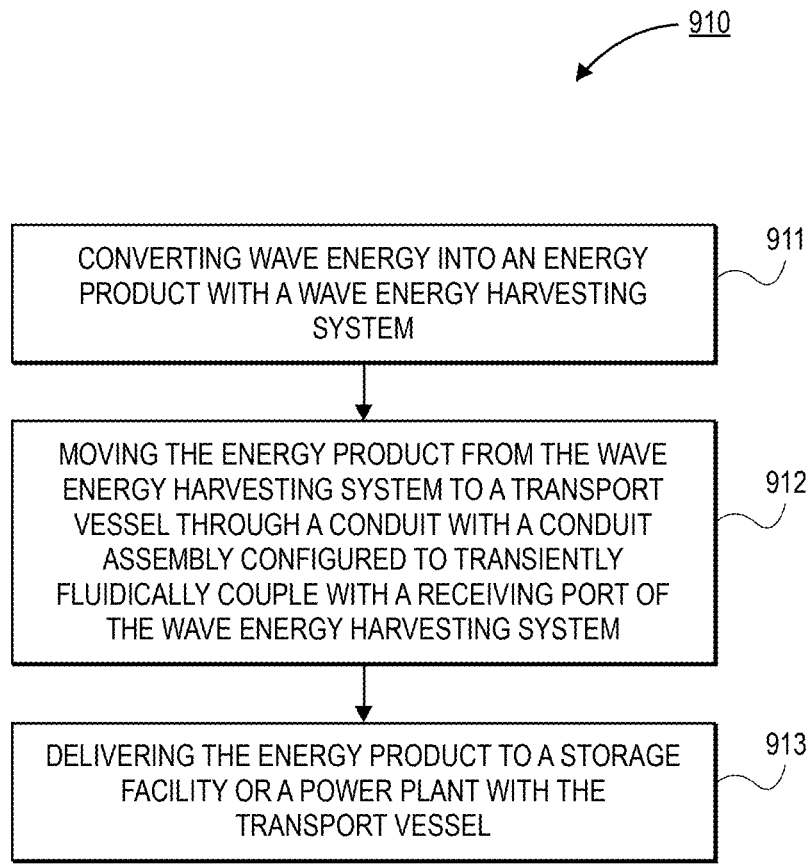
FIG. 27 is a process flow diagram of process for transporting an energy product from a wave energy harvesting system to a transport vessel, in accordance with at least one embodiment.

FIG. 27 is a process flow diagram of a process 910 for generating an energy product with a wave energy harvesting system and transporting the energy product to an alternative location in accordance with an embodiment. In an embodiment, the process 910 may begin with operation 911, which comprises converting wave energy into an energy product with a wave energy harvesting system. The wave energy harvesting system may be similar to any of the wave energy harvesting systems described in greater detail herein. The energy product may be similar to any of the energy products described in greater detail herein. For example, the energy product may be a liquid or gas fuel (e.g., hydrogen), a chemical (e.g., HCl), a biological product (e.g., algae, fish, or any other marine species), or the like. The generation of the energy product may be made using any process described herein. For example, electrical power generated by the wave energy harvesting system can be used in order to produce the energy product.

In an embodiment, the process 910 may continue with operation 912, which comprises moving the energy product from the wave energy harvesting system to a transport vessel through a conduit with a conduit assembly configured to transiently fluidically couple with a receiving port of the wave energy harvesting system. The conduit and the conduit assembly may be similar to any of the conduit or conduit assemblies described in greater detail herein. The transport vessel may be similar to any vessel described herein. For example, the transport vessel may comprise a boat, a submersible, an aerial vehicle, or any other vessel that is capable of controlled motion on, through, and/or over the body of water on which the wave energy harvesting system floats. The energy product may be delivered or moved (actively or passively) to the transport vessel through any mechanism, such as a hose, a pipe, a cable, or the like.

In an embodiment, the process 910 may continue with operation 913, which comprises moving the energy product to a storage facility or a power plant with the transport vessel. The storage facility or a power plant may be provided at a location that is different than an approximate location of the wave energy harvesting system. In one embodiment, the location is at land. Though, in other embodiments, the location is near land (e.g., up to 100 kilometers from land, up to 40 kilometers from land, up to 1 kilometer from land, up to 500 meters from land, or up to 50 meters from land). In other embodiments, the storage facility may be a second vessel. For example, the first vessel may take the energy product from the wave energy harvesting system and deliver it to the second vessel. The second vessel may then take the energy product towards shore.

Figure 28:
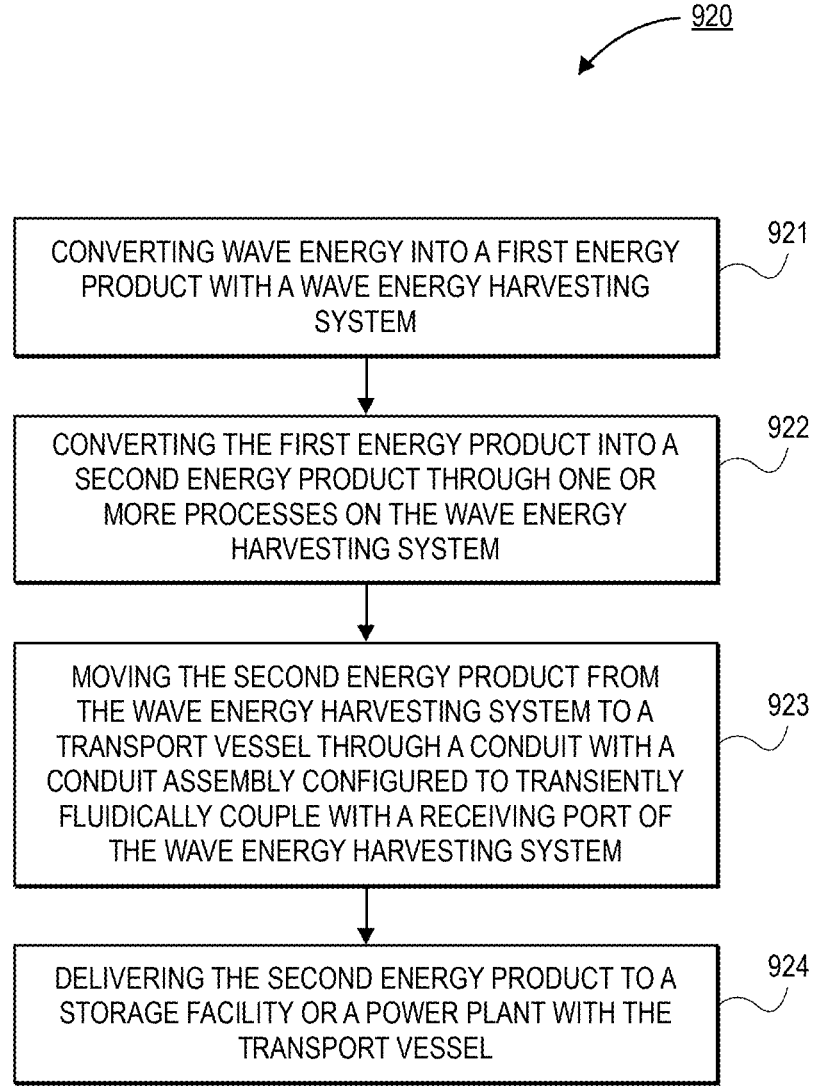
FIG. 28 is a process flow diagram of a process for converting a first energy product to a second energy product and then transporting the second energy product to a transport vessel, in accordance with at least one embodiment.

FIG. 28 is a process flow diagram of a process 920 for converting a first energy product into a second energy product and transporting the second energy product to a storage facility or power plant. In an embodiment, the process 920 may begin with operation 921, which comprises converting wave energy into a first energy product with a wave energy harvesting system. The wave energy harvesting system may be similar to any of the wave energy harvesting systems described in greater detail herein. The first energy product may be similar to any of the energy products described in greater detail herein. For example, the energy product may be a liquid or gas fuel (e.g., hydrogen), a chemical (e.g., HCl), a biological product (e.g., algae, fish, or any other marine species), or the like. The generation of the first energy product may be made using any process described herein. For example, electrical power generated by the wave energy harvesting system can be used in order to produce the energy product.

In an embodiment, the process 920 may continue with operation 922, which comprises converting the first energy product into a second energy product through one or more processes on the wave energy harvesting system. The conversion of the first energy product to the second energy product may include converting one type of fuel or chemical into another fuel or chemical. In one embodiment, the first energy product may comprise hydrogen, and the second energy product may comprise methanol. Additional precursors (e.g., $CO_2$) may be reacted with the first energy product in order to generate the second energy product. For example, a process similar to the process described with respect to FIG. 23 may be used in some embodiments. Other conversion processes may also be used, such as, but not limited to, filtering, compression (e.g., from a gas to a liquid), purification, or the like may be used. Conversions may also include processing biological products. For example, algae may be processed into algae oil, or fish may be processed into fish oil. The conversion process may be implemented on or within the vicinity of the wave energy harvesting system. For example, a processing plant may be provided on the wave energy harvesting system, similar to what is shown in FIG. 21.

In an embodiment, the process 920 may continue with operation 923, which comprises moving the second energy product from the wave energy harvesting system to a transport vessel through a conduit with a conduit assembly configured to transiently fluidically couple with a receiving port of the wave energy harvesting system. The conduit and the conduit assembly may be similar to any of the conduits or conduit assemblies described in greater detail herein. The transport vessel may be similar to any vessel described herein. For example, the transport vessel may comprise a boat, a submersible, an aerial vehicle, or any other vessel that is capable of controlled motion on, through, and/or over the body of water on which the wave energy harvesting system floats. The second energy product may be delivered or moved (actively or passively) to the transport vessel through any mechanism, such as a hose, a pipe, a cable, or the like.

In an embodiment, the process 920 may continue with operation 924, which comprises delivering the second energy product to a storage facility or a power plant with the transport vessel. The storage facility or a power plant may be provided at a location that is different than an approximate location of the wave energy harvesting system. In one embodiment, the location is at land. Though, in other embodiments, the location is near land (e.g., up to 100 kilometers from land, up to 40 kilometers from land, up to 1 kilometer from land, up to 500 meters from land, or up to 50 meters from land). In other embodiments, the storage facility may be a second vessel. For example, the first vessel may take the second energy product from the wave energy harvesting system and deliver it to the second vessel. The second vessel may then take the second energy product towards shore.

Figure 29:
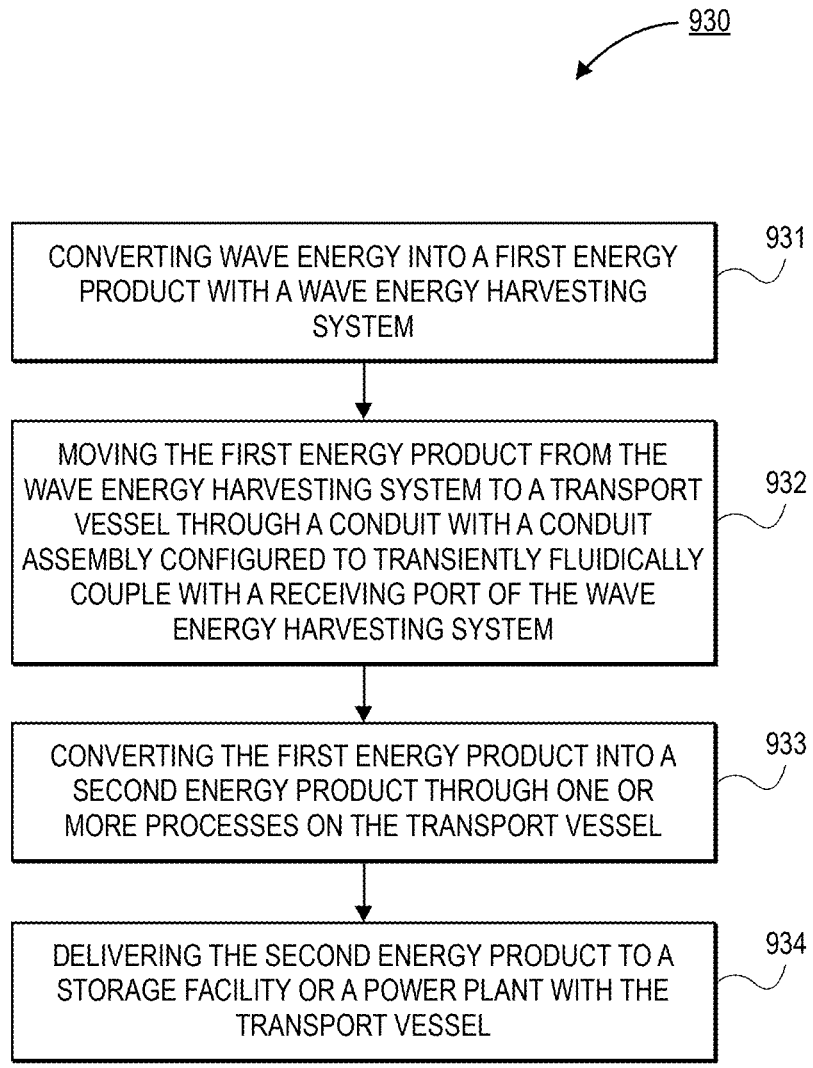
FIG. 29 is a process flow diagram of a process for transferring a first energy product to a transport vessel and converting the first energy product into a second energy product, in accordance with at least one embodiment.

FIG. 29 is a process flow diagram of a process 930 for converting a first energy product into a second energy product and transporting the second energy product to storage facility or power plant. In an embodiment, the process 930 may begin with operation 931, which comprises converting wave energy into a first energy product with a wave energy harvesting system. The wave energy harvesting system may be similar to any of the wave energy harvesting systems described in greater detail herein. The first energy product may be similar to any of the energy products described in greater detail herein. For example, the energy product may be a liquid or gas fuel (e.g., hydrogen), a chemical (e.g., HCl), a biological product (e.g., algae, fish, or any other marine species), or the like. The generation of the first energy product may be made using any process described herein. For example, electrical power generated by the wave energy harvesting system can be used in order to produce the energy product.

In an embodiment, the process 930 may continue with operation 932, which comprises moving the first energy product from the wave energy harvesting system to a transport vessel through a conduit with a conduit assembly configured to transiently fluidically couple with a receiving port of the wave energy harvesting system. The conduit and the conduit assembly may be similar to any of the conduits or conduit assemblies described in greater detail herein. The transport vessel may be similar to any vessel described herein. For example, the transport vessel may comprise a boat, a submersible, an aerial vehicle, or any other vessel that is capable of controlled motion on, through, or over the body of water on which the wave energy harvesting system floats. The first energy product may be delivered or moved (actively or passively) to the transport vessel through any mechanism, such as a hose, a pipe, a cable, or the like.

In an embodiment, the process 930 may continue with operation 933, which comprises converting the first energy product into a second energy product through one or more processes on the transport vessel. The conversion of the first energy product to the second energy product may include converting one type of fuel or chemical into another fuel or chemical. In one embodiment, the first energy product may comprise hydrogen, and the second energy product may comprise methanol. Additional precursors (e.g., $CO_2$) may be reacted with the first energy product in order to generate the second energy product. For example, a process similar to the process described with respect to FIG. 23 may be used in some embodiments. Other conversion processes may also be used, such as, but not limited to, filtering, compression (e.g., from a gas to a liquid), purification, or the like may be used. Conversions may also include processing biological products. For example, algae may be processed into algae oil, or fish may be processed into fish oil. The conversion process may be implemented on or within the vicinity of the transport vessel. For example, a processing plant may be provided on the transport vessel, similar to what is shown in FIG. 22.

In an embodiment, the process 930 may continue with operation 934, which comprises delivering the second energy product to a storage facility or a power plant with the transport vessel. The storage facility or a power plant may be provided at a location that is different than an approximate location of the wave energy harvesting system. In one embodiment, the location is at land. Though, in other embodiments, the location is near land (e.g., up to 100 kilometers from land, up to 40 kilometers from land, up to 1 kilometer from land, up to 500 meters from land, or up to 50 meters from land). In other embodiments, the storage facility may be a second vessel. For example, the first vessel may take the energy product from the wave energy harvesting system and deliver it to the second vessel. The second vessel may then take the energy product towards shore.

Figure 30:
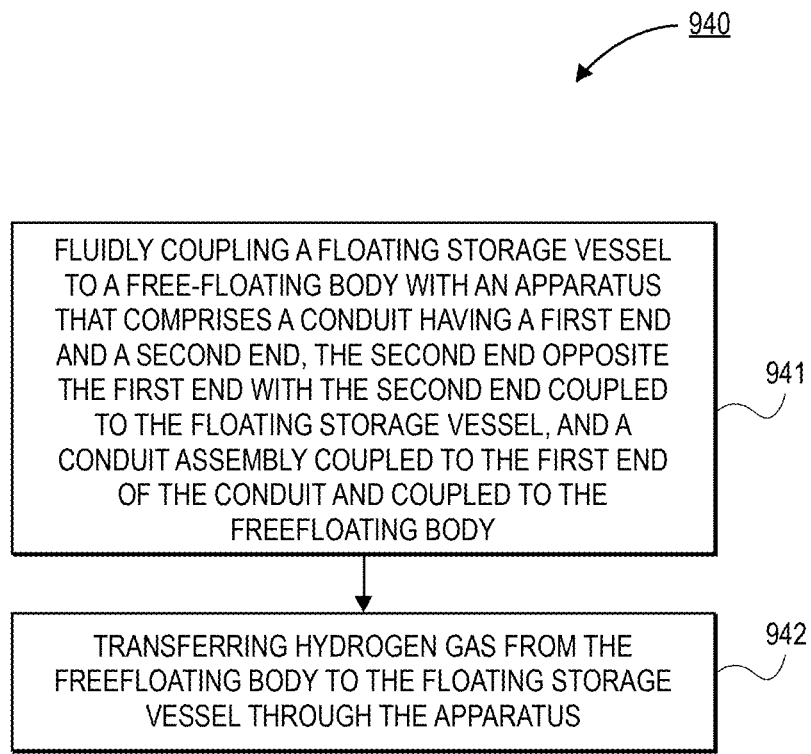
FIG. 30 is a process flow diagram of a process for transferring hydrogen from a free-floating vessel to a storage vessel with a conduit, in accordance with at least one embodiment.

FIG. 30 is a process flow diagram of a process 940 for transferring hydrogen from a free-floating body to a floating storage vessel. In an embodiment, the process 940 may begin with operation 941, which comprises fluidly coupling a floating storage vessel to a free-floating body with an apparatus. In an embodiment, the apparatus comprises a conduit having a first end and a second end, where the second end is opposite the first end. The second end may be coupled to the floating storage vessel, and a conduit assembly may be coupled to the first end of the conduit. In an embodiment, the conduit assembly may be similar to any of the conduit assemblies described in greater detail herein. For example, the conduit assembly may comprise a plurality of nozzles for releasing one or more fluid streams to direct the conduit assembly to or from a receiving port of the free-floating body. The conduit assembly may also comprise an internal passage for fluidly coupling the floating storage vessel to the receiving port of the free-floating body. That is, the internal passage may be along the conduit and extend through the conduit assembly.

In an embodiment, the process 940 may continue with operation 942, which comprises transferring hydrogen gas from the receiving port of the free-floating body to the floating storage vessel through the apparatus. While embodiments in accordance with process 940 may be directed to the transfer of hydrogen, other gasses and/or liquids may be transferred along the apparatus between the free-floating body and the floating storage vessel. Additionally, multiple internal passages may be provided in the apparatus in order to transfer multiple different fluids between the free-floating body and the floating storage vessel. For example, water may be delivered to the free-floating body (from the floating storage vessel) through a first internal passage, and hydrogen may be deliver to the floating storage vessel (from the free-floating body) through a second internal passage. The second internal passage may co-axially surround the second internal passage in some embodiments.

The specification and drawings are to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

Example 1: an apparatus for fluidly coupling to a free-floating body, the apparatus comprising: a conduit having a first end and a second end, the second end opposite the first end, and the second end for coupling to a floating storage vessel; a conduit assembly coupled to the first end of the conduit, the conduit assembly comprising a plurality of nozzles for releasing one or more fluid streams to direct the conduit assembly to or from a receiving port of the free-floating body; and an internal passage for fluidly coupling the floating storage vessel to the receiving port of the free-floating body, the internal passage along the conduit and extending through the conduit assembly.

Example 2: the apparatus of Example 1, wherein the plurality of nozzles comprises a first set of nozzles oriented to propel the conduit assembly along a first direction, a second set of nozzles oriented to propel the conduit assembly along a second direction opposite the first direction, and a third set of nozzles oriented to propel the conduit assembly along a third direction orthogonal to the first direction and the second direction.

Example 3: the apparatus of Example 1 or Example 2, wherein one or more of the plurality of nozzles is configured to be actuated to control a corresponding one of the one or more fluid streams.

Example 4: the apparatus of Examples 1-3, wherein the internal passage comprises a first internal fluid passage, and a second internal fluid passage co-axial around the first internal passage.

Example 5: the apparatus of Example 4, wherein the first internal fluid passage is configured to supply an energy product precursor from the floating storage vessel to the receiving port of the free-floating body, and wherein the second internal fluid passage is configured to siphon an energy product from the receiving port of the free-floating body to the floating storage vessel.

Example 6: the apparatus of Example 5, wherein the energy product precursor is deionized water, and wherein the energy product is hydrogen gas.

Example 7: the apparatus of Examples 4-6, wherein the internal passage further comprises a third internal fluid passage co-axially surrounding the first internal fluid passage and the second internal fluid passage, the third internal fluid passage configured to supply a fluid to the plurality of nozzles.

Example 8: the apparatus of Examples 1-7, further comprising: an intermediate lifting assembly interposed along the conduit between the first end and the second end of the conduit.

Example 9: the apparatus of Example 8, wherein the intermediate lifting assembly is configured to expel one or more auxiliary fluid streams to support suspension of the conduit within a surrounding environment.

Example 10: the apparatus of Examples 1-9, further comprising: an intermediate pump assembly interposed along the conduit between the first end and the second end of the conduit, the intermediate pump assembly configured to pump a fluid to the plurality of nozzles.

Example 11: a method of forming a stored hydrogen gas or a chemical, the method comprising: fluidly coupling a floating storage vessel to a free-floating body with an apparatus, the apparatus comprising a conduit having a first end and a second end, the second end opposite the first end, and the second end coupled to the floating storage vessel, a conduit assembly coupled to the first end of the conduit, the conduit assembly comprising a plurality of nozzles for releasing one or more fluid streams to direct the conduit assembly to or from a receiving port of the free-floating body, and an internal passage for fluidly coupling the floating storage vessel to the receiving port of the free-floating body, the internal passage along the conduit and extending through the conduit assembly; and transferring hydrogen gas from the receiving port of the free-floating body to the floating storage vessel through the apparatus.

Example 12: the method of Example 11, wherein the free-floating body is a wave engine, the method further comprising: forming the hydrogen gas in the wave engine by electrolyzing water with energy generated by the wave engine.

Example 13: the method of Example 12, further comprising: supplying water to the wave engine using the apparatus to replenish the water used to form the hydrogen gas.

Example 14: the method of Examples 11-13, further comprising: storing the hydrogen gas on the floating storage vessel to form a stored hydrogen gas.

Example 15: the method of Examples 11-14, further comprising: forming a chemical from the hydrogen gas.

Example 16: a wave engine, comprising: an upper chamber having a fluid reservoir and a storage tank; an injection tube fluidly coupled to the upper chamber, the injection tube to impel a fluid into the fluid reservoir when the upper chamber and the injection tube oscillate about a waterline with the upper chamber adjacent to the waterline and the injection tube below the waterline; and a receiving port on an exterior of the upper chamber, the receiving port fluidly coupled to the storage tank of the upper chamber, the receiving port comprising a first passage fluidly coupled to a lower portion of the storage tank, and the receiving port comprising a second passage fluidly coupled to an upper portion of the storage tank.

Example 17: the wave engine of Example 16, wherein the second passage co-axially surrounds the first passage.

Example 18: the wave engine of Example 16 or Example 17, wherein the receiving port is on the exterior of the upper chamber at a location above the waterline.

Example 19: the wave engine of Example 16 or Example 17, wherein the receiving port is on the exterior of the upper chamber at a location below the waterline.

Example 20: the wave engine of Examples 16-19, wherein the storage tank is for storing hydrogen gas.

Example 21: an apparatus, comprising: a conduit and a conduit assembly, the conduit assembly positioned at a distal end of the conduit, the conduit assembly configured to semi-autonomously or autonomously mechanically couple a first free-floating body to a second free-floating body, wherein the conduit assembly includes one or more fluid nozzles configured to expel one or more fluid streams which are timed and angled so as to guide the conduit assembly to a receiving port of the second free-floating body so as to mechanically and fluidly couple the conduit assembly to the receiving port.

Example 22: a method, comprising: directing a conduit assembly to a receiving port by releasing one or more fluid streams from the conduit assembly; and fluidly coupling an internal passage of the conduit assembly to the receiving port.

Example 23: the method of Example 22, further comprising detaching the conduit assembly from the receiving port such that the internal passage is no longer fluidly coupled to the receiving port.

Example 24: the method of Example 23, wherein detaching the conduit assembly from the receiving port comprises releasing one or more additional fluid streams from the conduit assembly.

Example 25: the method of Example 24, wherein: the one or more fluid streams is generated by actuating one or more first fluid nozzles of the conduit assembly to induce a first fluid flow in a first direction; and the one or more additional fluid streams is generated by actuating one or more second fluid nozzles to induce a second fluid flow in a second direction opposite to the first direction.

Example 26: the method of Examples 22-25, wherein directing the conduit assembly to the receiving port comprises adjusting one or more of a thrust of at least one fluid stream of the one or more fluid streams, a timing of the at least one fluid stream, a duration of the at least one fluid stream, or an angle of the at least one fluid stream.

Example 27: the method of Example 26, wherein adjusting the thrust of the at least one fluid stream comprises: responsive to the at least one fluid stream being released above a surface of a body of water, adjusting the thrust to a first value; and responsive to the at least one fluid stream being released below the surface of the body of water, adjusting the thrust to a second value less than the first value.

Example 28: the method of Examples 22-27, wherein: the internal passage comprises a first passage and a second passage coaxial with the first passage; and the method further comprises: supplying a first fluid, via the first passage, to the receiving port; and siphoning a second fluid, via the second passage, from the receiving port.

Example 29: the method of Examples 22-38, wherein directing the conduit assembly to the receiving port by releasing the one or more fluid streams comprises: receiving, from a remote land-based controller, an indication to fluidly couple the conduit assembly to the receiving port by releasing the one or more fluid streams; and directing the conduit assembly to the receiving port according to the received indication.

Example 30: a system, comprising: a first free-floating body comprising a receiving port; and a second free-floating body, comprising: a conduit comprising an internal passage configured to be fluidly coupled to the receiving port; and a conduit assembly positioned at a distal end of the conduit, the conduit assembly comprising one or more fluid nozzles, the one or more fluid nozzles respectively configured to expel one or more fluid streams which propels the conduit assembly through a surrounding environment so as to remotely direct the conduit assembly to the receiving port.

Example 31: the system of Example 30, wherein the first free-floating body further comprises a coupling structure in which the receiving port is recessed, the coupling structure configured to receive the conduit assembly therein.

Example 32: the system of Example 30 or Example 31, wherein the first free-floating body further comprises a receiving protrusion, the receiving port positioned at a distal end of the receiving protrusion, and wherein the conduit assembly comprises a recess configured to receive the receiving protrusion therein.

Example 33: the system of Examples 30-32, wherein the first free-floating body further comprises one or more guidance lights annularly distributed on the receiving port.

Example 34: the system of Examples 30-33, wherein the second free-floating body further comprises an intermediate lifting assembly interposed along the conduit between a proximal end of the conduit and the distal end of the conduit, the intermediate lifting assembly configured to expel an auxiliary fluid stream to support suspension of the conduit within the surrounding environment.

Example 35: the system of Examples 30-34, wherein the second free-floating body further comprises an intermediate pump assembly interposed along the conduit between the proximal end of the conduit and the distal end of the conduit, the intermediate pump assembly comprising: a fluid pump configured to induce fluid along the conduit, the fluid to be expelled as the one or more fluid streams; and one or more propulsors configured to support suspension of the intermediate pump assembly within the surrounding environment.

Example 36: the system of Examples 30-35, wherein: the first free-floating body further comprises one or more first coupling elements annularly distributed on the receiving port; the second free-floating body further comprises one or more second coupling elements annularly distributed on the conduit assembly, the one or more second coupling elements configured to be reversibly mated to the one or more first coupling elements, respectively; and the internal passage is configured to be fluidly coupled to the receiving port via mating of the one or more second coupling elements to the one or more first coupling elements.

Example 37: the system of Example 36, wherein the one or more first coupling elements and the one or more second coupling elements are reversibly mateable via a mechanical latching mechanism.

Example 38: the system of Examples 30-37, wherein the first free-floating body further comprises one or more electromagnets actuatable to reversibly couple to the receiving port via magnetic attraction.

Example 39: the system of Examples 30-38, wherein the conduit assembly further comprises one or more hydrophones configured to emit and receive audio signals from which a position of the receiving port is determined.

Example 40: the system of Examples 30-39, wherein the conduit assembly further comprises one or more cameras configured to receive images from which the position of the receiving port is determined.

Example 41: the system of Examples 30-40, further comprising one or more processors storing executable instructions in non-transitory memory which, if executed by the one or more processors, cause the system to fluidly couple the conduit assembly to the receiving port by selectively actuating the one or more fluid nozzles to expel at least one of the one or more fluid streams and thereby direct the conduit assembly to the receiving port, wherein the executable instructions to fluidly couple the conduit assembly to the receiving port are transmitted to the non-transitory memory from a remote land-based controller when the first free-floating body and the second free-floating body are floating on a surface of a body of water.

Example 42: a watercraft, comprising: a plurality of storage tanks comprising a first storage tank and a second storage tank; a water pump; a conduit, comprising: a first fluid passage fluidly coupled to the first storage tank; a second fluid passage fluidly coupled to the second storage tank; and a third fluid passage fluidly coupled to the water pump; a conduit assembly coupled to a distal end of the conduit, the conduit assembly comprising a plurality of jet nozzles fluidly coupled to the third fluid passage, the plurality of jet nozzles configured to expel a plurality of water streams; and a processor storing executable instructions in non-transitory memory which, if executed by the processor, cause the watercraft to: receive, from a land-based controller, an indication to direct the conduit assembly to a receiving port of a wave engine by selectively actuating at least one of the plurality of jet nozzles to expel at least one of the plurality of water streams; operate, according to the indication, the water pump to pump water to the at least one of the plurality of jet nozzles to be expelled therefrom as the at least one of the plurality of water streams; direct, according to the indication, the conduit assembly to the receiving port of the wave engine so as to fluidly couple each of the first fluid passage and the second fluid passage to the receiving port; supply an electrolysis reactant from the first storage tank to the wave engine via the first fluid passage; and siphon an electrolysis product from the wave engine to the second storage tank via the second fluid passage.

The invention claimed is:

1. A method of forming a stored hydrogen gas or a chemical, the method comprising:
fluidly coupling a floating storage vessel to a free-floating body with an apparatus, the apparatus comprising a conduit having a first end and a second end, the second end opposite the first end, and the second end coupled to the floating storage vessel, a conduit assembly coupled to the first end of the conduit, the conduit assembly comprising a plurality of nozzles for releasing one or more fluid streams to direct the conduit assembly to or from a receiving port of the free-floating body, and an internal passage for fluidly coupling the floating storage vessel to the receiving port of the free-floating body, the internal passage along the conduit and extending through the conduit assembly; and
transferring hydrogen gas from the receiving port of the free-floating body to the floating storage vessel through the apparatus.

2. The method of claim 1, wherein the free-floating body is a wave engine, the method further comprising:
forming the hydrogen gas in the wave engine by electrolyzing water with energy generated by the wave engine.

3. The method of claim 2, further comprising:
supplying water to the wave engine using the apparatus to replenish the water used to form the hydrogen gas.

4. The method of claim 1, further comprising:
storing the hydrogen gas on the floating storage vessel to form the stored hydrogen gas.

5. The method of claim 1, further comprising:
forming the chemical from the hydrogen gas.

6. A wave engine, comprising:
an upper chamber having a fluid reservoir and a storage tank;

an injection tube fluidly coupled to the upper chamber, the injection tube to impel a fluid into the fluid reservoir when the upper chamber and the injection tube oscillate about a waterline with the upper chamber adjacent to the waterline and the injection tube below the waterline; and a receiving port on an exterior of the upper chamber, the receiving port fluidly coupled to the storage tank of the upper chamber, the receiving port comprising a first passage fluidly coupled to a lower portion of the storage tank, and the receiving port comprising a second passage fluidly coupled to an upper portion of the storage tank.

7. The wave engine of claim 6, wherein the second passage co-axially surrounds the first passage.

8. The wave engine of claim 6, wherein the receiving port is on the exterior of the upper chamber at a location above the waterline.

9. The wave engine of claim 6, wherein the receiving port is on the exterior of the upper chamber at a location below the waterline.

10. The wave engine of claim 6, wherein the storage tank is for storing hydrogen gas.

* * * * *